(12) United States Patent
Shinkai et al.

(10) Patent No.: US 7,675,827 B2
(45) Date of Patent: Mar. 9, 2010

(54) INFORMATION PROCESSING APPARATUS, INFORMATION PROCESSING METHOD, AND PROGRAM

(75) Inventors: Mitsutoshi Shinkai, Kanagawa (JP); Fumihiro Nagasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 625 days.

(21) Appl. No.: 11/561,072

(22) Filed: Nov. 17, 2006

(65) Prior Publication Data
US 2007/0180283 A1     Aug. 2, 2007

(30) Foreign Application Priority Data
Nov. 29, 2005     (JP) ............................ 2005-343187

(51) Int. Cl.
*G11B 11/00* (2006.01)
(52) U.S. Cl. .................................. 369/53.12; 369/53.42
(58) Field of Classification Search .................. None
See application file for complete search history.

(56) References Cited

U.S. PATENT DOCUMENTS

| 7,343,506 B1 * | 3/2008 | Fenwick ...................... 713/340 |
| 2006/0057967 A1 * | 3/2006 | Shimada .................. 455/67.13 |

FOREIGN PATENT DOCUMENTS

| JP | 10-49261 | 2/1998 |
| JP | 2000-175092 | 6/2000 |
| JP | 2000-184324 | 6/2000 |
| JP | 2002-204408 | 7/2002 |
| JP | 2002-369120 | 12/2002 |
| JP | 2003-273800 | 9/2003 |
| JP | 2004-171719 | 6/2004 |
| JP | 2004-289619 | 10/2004 |
| JP | 2005-11200 | 1/2005 |

OTHER PUBLICATIONS

U.S. Appl. No. 11/560,636, filed Nov. 16, 2006, Shinkai.

* cited by examiner

*Primary Examiner*—Paul Huber
(74) *Attorney, Agent, or Firm*—Oblon, Spivak, McClelland, Maier & Neustadt, L.L.P.

(57) ABSTRACT

An information processing apparatus that transmits transmission data to another first information processing apparatus through an access point includes: a detection unit configured to detect the access point; a reproduction unit configured to reproduce the transmission data from a recording medium in which the transmission data is recorded; a transmission unit configured to transmit to the another first information processing apparatus the transmission data reproduced by the reproduction unit when the access point is detected by the detection unit; and a power control unit configured to control supply of power to the reproduction unit. The power control unit controls the supply of power such that power is supplied to the reproduction unit when the access point is detected by the detection unit and power is not supplied to the reproduction unit in other cases.

5 Claims, 42 Drawing Sheets

FIG. 6

1. GROUP TITLE
2. RECORD ID
3. CLASSIFICATION
4. ORIGINAL
5. GROUP CREATING DATE
6. DESTINATION
    (1) NAME
    (2) E-MAIL ADDRESS
    (3) WEBSITE URL
7. SHOOT DATE
    (1) PREARRANGEMENT
    (2) EXECUTION
8. SHOOT PLACE
    (1) PREARRANGEMENT
    (2) EXECUTION
9. PHOTOGRAPHER
    (1) PREARRANGEMENT
    (2) EXECUTION
10. DETAILS OF PHOTOGRAPHING
    (1) INSTRUCTION
    (2) ACTUAL (MEMO)
11. SHOOT MATERIAL (FILE)
    (1) TITLE
    (2) UMID
    (3) MEMO
    (4) TRANSMISSION HISTORY

FIG. 7 title, MT. FUJI VIEWED FROM LAKE YAMANAKA, category, RECORDING, original, Yes, date created, 2005/5/16, date directed, 2005/5/31, date carried out, 2005/5/31, place directed, LAKE YAMANAKA PLAIN, place carried out, LAKE YAMANAKA PLAIN, person directed, KAMEI, TAKEMURA, person carried out, KAMEI, TAKEMURA, description directed, xxxx, description occurred, xxxx, file title, xxxx, file ID, xxxx, memo, xxxx, file title, xxxx, file ID, xxxx, memo, xxxx, file title, xxxx, file ID, xxxx, memo, xxxx

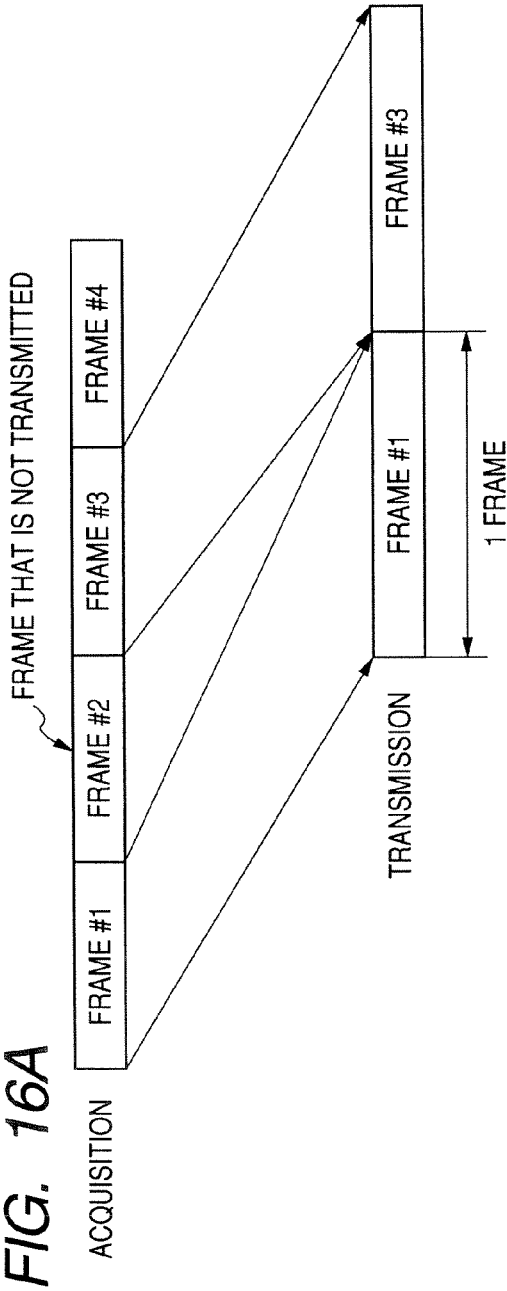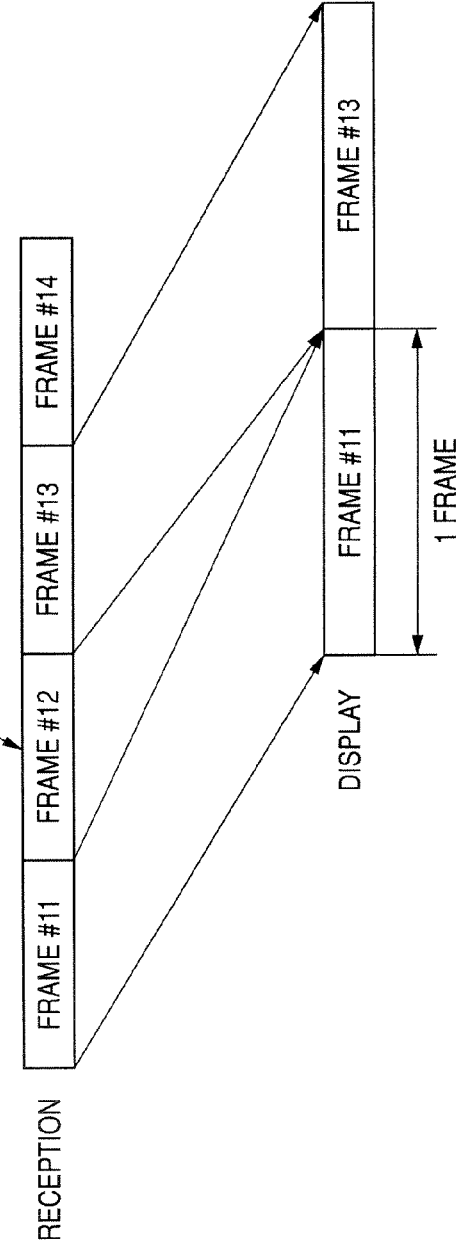

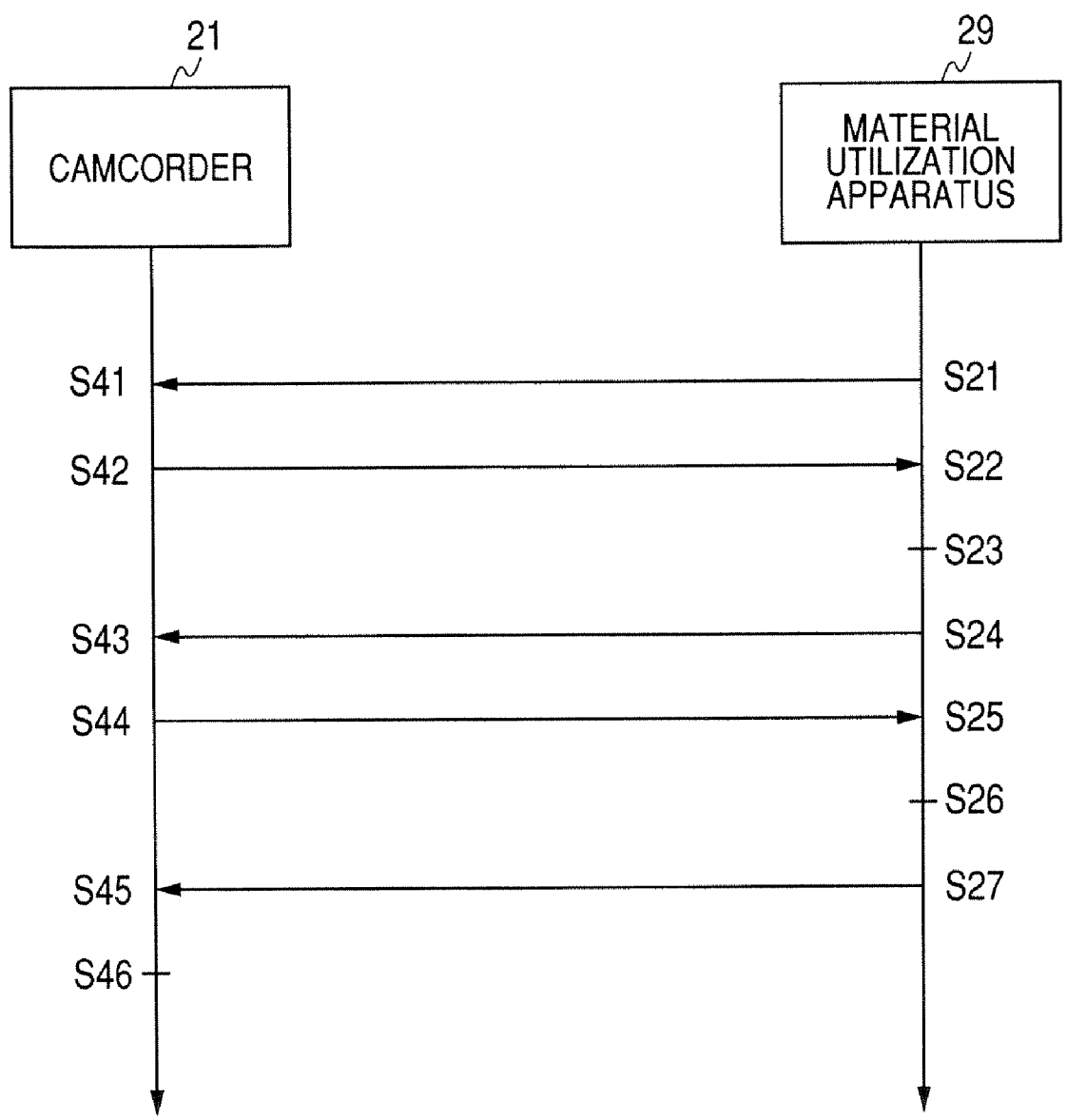

FIG. 25

TRANSMISSION MODE SETTING

DATE:
● LATEST DAY IS PRIORITIZED
 ORDER OF SHOOT DATE

ORDER OF SHOOT:
● NORMAL ASCENDING ORDER
 REVERSE ORDER

SHOOT APPARATUS:
 THIS CAMCORDER IS PRIORITIZED
● NO CONDITION

PREFERENTIAL CONDITION:
● AUTOMATIC
 MANUAL

HANDLING OF FILE BEING TRANSMITTED WHEN RECORDING STARTS:
● ADDING LATER
 TRANSMITTING LATER AS SEPARATE FILE
 DELETING FILE BEING TRANSMITTED
 COMPLETION OF TRANSMISSION

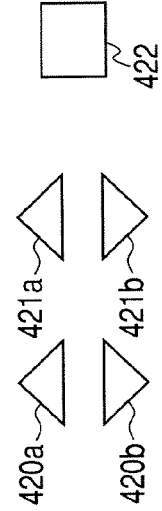

ITEM SELECTION  △ 420a
                ▽ 420b

SELECTED ITEM CHANGE  △ 421a
                      ▷ 421b

DETERMINATION  ☐ 422

FIG. 26

| UMID | SHOOT TIME | APPARATUS ID |
|---|---|---|
| UMID#1 | 9:50:15 | CID#2 |
| UMID#3 | 10:10:24 | CID#2 |
| UMID#4 | 10:25:30 | CID#1 |
| UMID#2 | 11:25:05 | CID#1 |

FIG. 27

| ORDER OF PRIORITY | UMID | SHOOT TIME | APPARATUS ID |
|---|---|---|---|
| 1 | UMID#1 | 9:50:15 | CID#2 |
| 2 | UMID#3 | 10:10:24 | CID#2 |
| 3 | UMID#4 | 10:25:30 | CID#1 |
| 4 | UMID#2 | 11:25:05 | CID#1 |

| ORDER OF PRIORITY | UMID | SHOOT TIME | APPARATUS ID |
|---|---|---|---|
| 1 | UMID#2 | 11:25:05 | CID#1 |
| 2 | UMID#4 | 10:25:30 | CID#1 |
| 3 | UMID#3 | 10:10:24 | CID#2 |
| 4 | UMID#1 | 9:50:15 | CID#2 |

| ORDER OF PRIORITY | UMID | SHOOT TIME | APPARATUS ID |
|---|---|---|---|
| 1 | UMID#4 | 10:25:30 | CID#1 |
| 2 | UMID#2 | 11:25:05 | CID#1 |
| 3 | UMID#1 | 9:50:15 | CID#2 |
| 4 | UMID#3 | 10:10:24 | CID#2 |

| ORDER OF PRIORITY | UMID | SHOOT TIME | APPARATUS ID | MANUAL INPUT |
|---|---|---|---|---|
| 1 | UMID#2 | 11:25:05 | CID#1 | 1 |
| 2 | UMID#1 | 9:50:15 | CID#2 | 2 |
| 3 | UMID#4 | 10:25:30 | CID#1 | 3 |
| 4 | UMID#3 | 10:10:24 | CID#2 | 4 |

FIG. 40 title, MT. FUJI, category, FreezeMix, original, No, date created, 2004/8/16, date directed, 2004/8/31, date carried out, 2004/8/31, place directed, LAKE YAMANAKA PLAIN, place carried out, LAKE YAMANAKA PLAIN, person directed, KOIZUMI, OKADA, person carried out, KOIZUMI, OKADA, description directed, xxxx, description occurred, xxxx, file title, MT. FUJI VIEWED FROM LAKE YAMANAKA, file ID, xxxx, memo, xxxx, file title, MT. FUJI VIEWED FROM LAKE KAWAGUCHI, file ID, xxxx, memo, xxxx ....

FIG. 41

GROUP NAME: MT. FUJI
CLIP LIST:
● 1. MT. FUJI VIEWED FROM LAKE YAMANAKA
2. MT. FUJI VIEWED FROM LAKE KAWAGUCHI
3. MT. FUJI VIEWED FROM LAKE SAI
4. MT. FUJI VIEWED FROM LAKE SHOJI
5. MT. FUJI VIEWED FROM LAKE MOTOSU
6. MT. FUJI VIEWED FROM LAKE OSEZAKI

541

CLIP PLAYBACK

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2005-343187 filed in the Japanese Patent Office on Nov. 29, 2005, the entire contents of which being incorporated herein by reference.

BACKGROUND OF THE INVENTION

1. Field of the Invention

The present invention relates to an information processing apparatus, an information processing method, and a program. In particular, the present invention relates to an information processing apparatus, an information processing method, and program capable of reducing power consumption when reproducing data recorded in a recording medium and transmitting the data to another apparatus.

2. Description of the Related Art

In recent years, there is a Camcorder (registered trademark) that reproduces back material data, such as image data or sound data, recorded in a recording medium and obtained by shoot or recording, and transmits the material data to another apparatus through a network.

For example, JP-A-2004-171719 discloses a camera integrated video tape recorder that reproduces image data recorded in a video tape and transmits the image data to a disc recorder.

SUMMARY OF THE INVENTION

However, in the camcorder described above, it is not considered to control the supply of power to respective units included in the camcorder according to the state of the camcorder.

For example, in the case when the camcorder is located at a place where the camcorder cannot be connected to the network, that is, located at a place out of service, power is still supplied to a unit that is included in the camcorder so as to perform a transmission function, even though it is not possible to transmit material data. Accordingly, power is uselessly consumed.

Therefore, it is desirable to reduce power consumption when reproducing data recorded in a recording medium and transmitting the data to another apparatus.

According to an embodiment of the present invention, an information processing apparatus that transmits transmission data to another first information processing apparatus through an access point includes: a detection unit configured to detect the access point; a reproduction unit configured to reproduce the transmission data from a recording medium in which the transmission data is recorded; a transmission unit configured to transmit to the another first information processing apparatus the transmission data reproduced by the reproduction unit when the access point is detected by the detection unit; and a power control unit configured to control supply of power to the reproduction unit. The power control unit controls the supply of power such that power is supplied to the reproduction unit when the access point is detected by the detection unit and power is not supplied to the reproduction unit in other cases.

When the access point is detected by the detection unit, the power control unit may make a control such that power is supplied to the reproduction unit while the transmission unit is transmitting the transmission data.

Furthermore, the information processing apparatus described above may further include: a receiving unit configured to receive reception data from another second information processing apparatus when the access point is detected by the detection unit; and a recording control unit configured to cause the reception data received by the receiving unit to be recorded. In addition, the power control unit may also control supply of power to the recording control unit, and when the access point is detected by the detection unit, the power control unit may make a control such that power is supplied to the recording control unit while the receiving unit is receiving the reception data.

According to another embodiment of the present invention, an information processing method of an information processing apparatus including a reproduction unit configured to reproduce transmission data from a recording medium in which the transmission data transmitted to another information processing apparatus through an access point is recorded includes the steps of: detecting the access point; transmitting to the another information processing apparatus the transmission data reproduced by the reproduction unit when the access point is detected; and controlling supply of power such that power is supplied to the reproduction unit when the access point is detected and power is not supplied to the reproduction unit in other cases.

In the embodiment of the present invention, the access point is detected, and when the access point is detected, the transmission data reproduced by the reproduction unit configured to reproduce the transmission data is transmitted to another information processing apparatus from the recording medium in which the transmission data transmitted to another information processing apparatus through the access point is recorded. In addition, the supply of power is controlled such that power is supplied to the reproduction unit when the access point is detected and power is not supplied to the reproduction unit in other cases.

As described above, according to the embodiment of the present invention, it is possible to record data that is acquired and recorded by another apparatus.

In addition, according to the embodiment of the present invention, it is possible to reduce the power consumption in the case of reproducing data recorded in a recording medium and transmitting the data to another apparatus.

BRIEF DESCRIPTION OF THE DRAWINGS

FIG. 6 is a view illustrating examples of items of contents of grouping metadata;

FIG. 7 is a view illustrating an example of grouping metadata;

FIG. 16A is a view explaining communication of material data of a clip currently being acquired;

FIG. 16B is a view explaining communication of material data of a clip currently being acquired;

FIG. 17 is a flow chart explaining a display process;

FIG. 25 is a view illustrating an example of a screen for setting a transmission mode;

FIG. 26 is a view illustrating an example of clips to be transmitted;

FIG. 27 is a view illustrating an example of a transmission list;

FIG. 40 is a view illustrating an example of FreezeMix data;

FIG. 41 is a view illustrating an example of a screen for designating a FreezeMix image;

DESCRIPTION OF THE PREFERRED EMBODIMENTS

Hereinafter, preferred embodiments of the present invention will be described. The relation between configuration requirements of the present invention and the embodiments described in the following specification or drawings are as follows. The description is made to confirm that the embodiments supporting the present invention are described in the specification or drawings. Therefore, even if an embodiment is described in the specification or drawings but not described in the following description as what corresponds to the configuration requirements of the present invention, the embodiment is not to be interpreted as an embodiment which does not correspond to the invention. In contrast, even if an embodiment is described in the following description as what corresponds to the configuration requirements of the present invention, the embodiment is not to be interpreted as an embodiment which does not correspond to a configuration requirement other than the configuration requirements.

Figure 3:
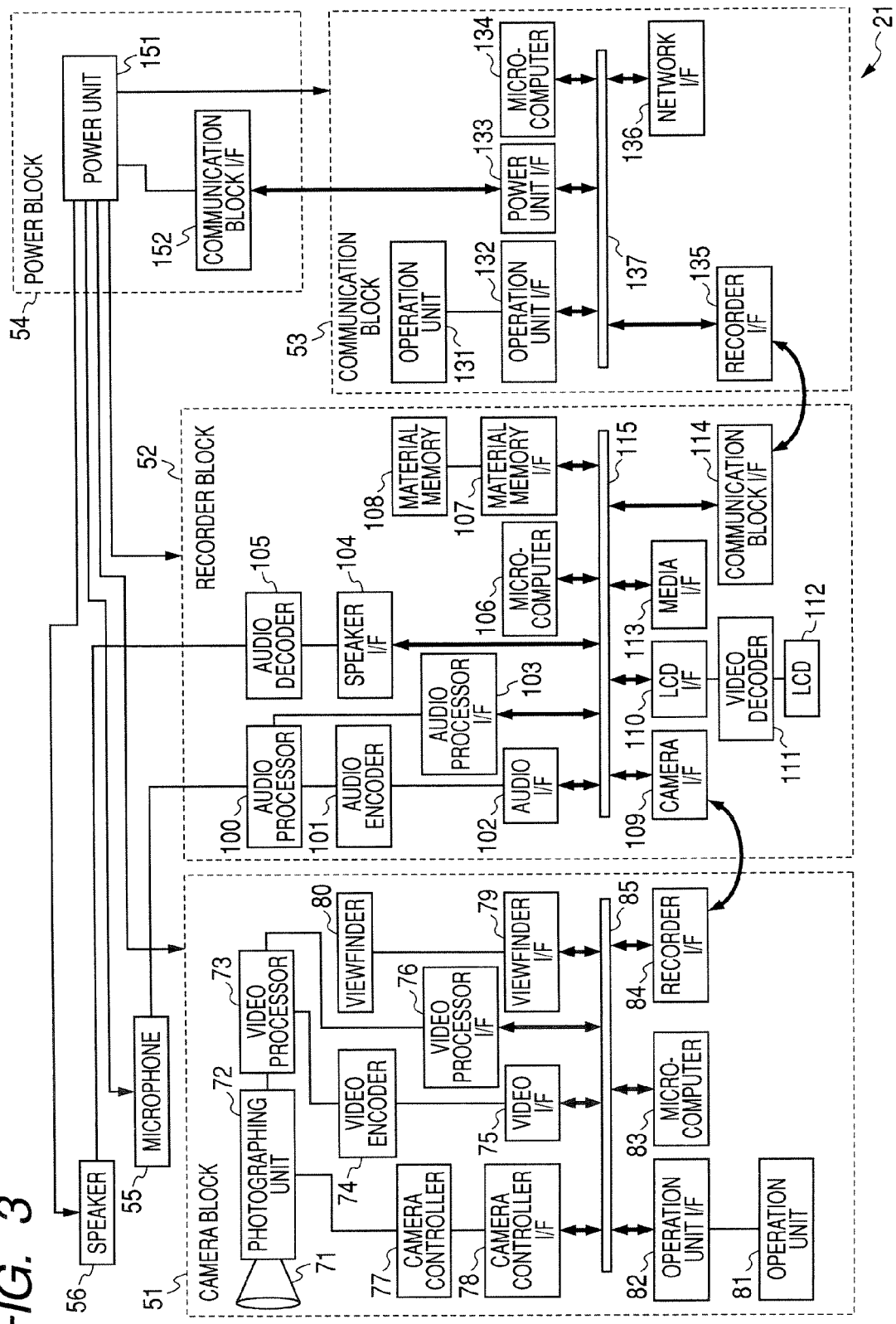
FIG. 3 is a block diagram illustrating an example of the configuration of hardware of a camcorder shown in FIG. 1.
Figure 19:
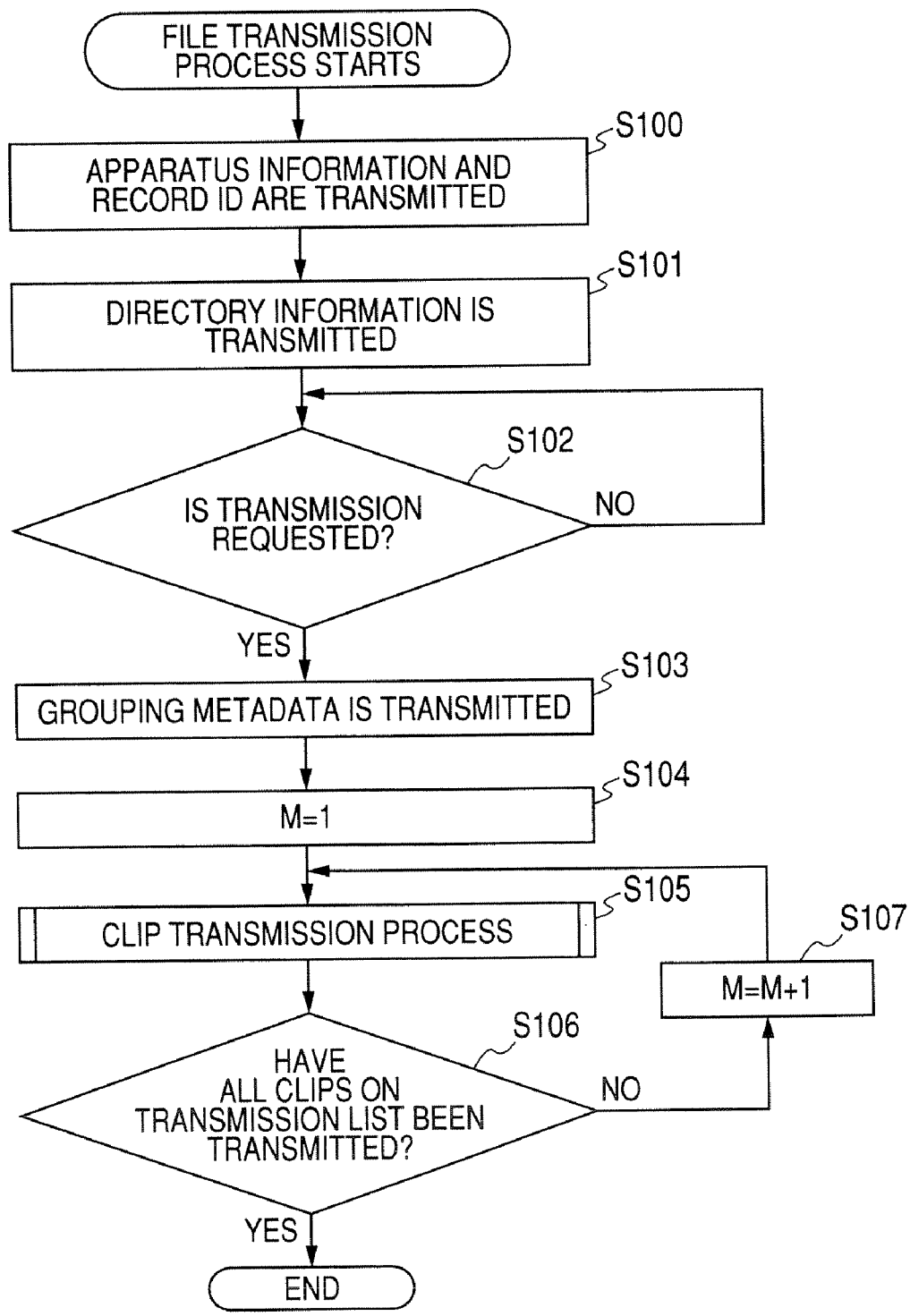
FIG. 19 is a flow chart explaining a file transmission process.

According to an embodiment of the present invention, an information processing apparatus (for example, a camcorder 21 shown in FIG. 1) that transmits transmission data to another first information processing apparatus (for example, a material utilization apparatus 29 shown in FIG. 1) through an access point (for example, an access point 23 shown in FIG. 1) includes: a detection unit (for example, a detection unit 601 shown in FIG. 49) configured to detect the access point; a reproduction unit (for example, a recorder block 52 that performs a process in step S100 shown in FIG. 19 and is shown in FIG. 3) configured to reproduce the transmission data from a recording medium (for example, a removable media 33 shown in FIG. 1) in which the transmission data is recorded; a transmission unit (for example, a transmission determining unit 602 shown in FIG. 49) configured to transmit to the another first information processing apparatus the transmission data reproduced by the reproduction unit when the access point is detected by the detection unit; and a power control unit (for example, a power control unit 604 shown in FIG. 49) configured to control supply of power to the reproduction unit. The power control unit controls (for example, a process in step S606 shown in FIG. 50) the supply of power such that power is supplied to the reproduction unit when the access point is detected by the detection unit, and the power control unit controls (for example, a process in step S611 shown in FIG. 50) the supply of power such that power is not supplied to the reproduction unit in other cases.

Figure 49:
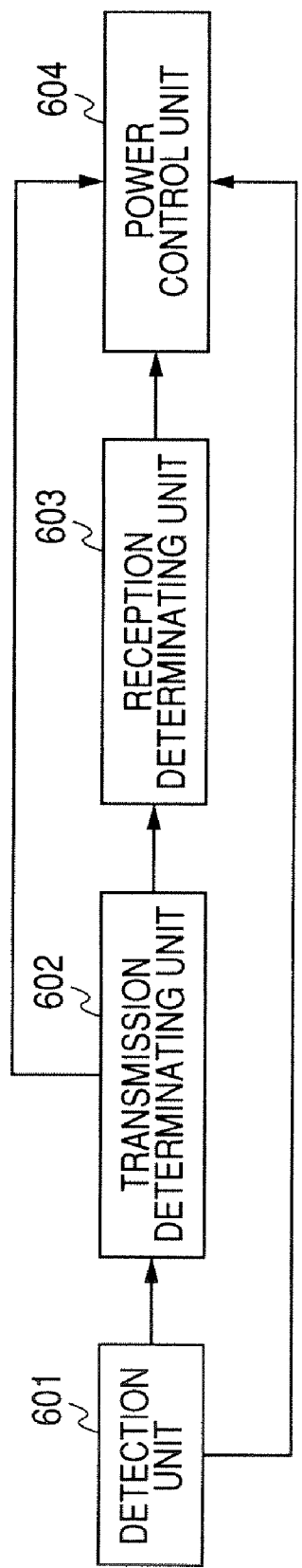
FIG. 49 is a block diagram illustrating an example of the configuration of a function of performing communication with a material utilization apparatus.

According to another embodiment of the present invention, the information processing apparatus described above further includes: a receiving unit (for example, a reception determining unit 603 shown in FIG. 49) configured to receive reception data from another second information processing apparatus when the access point is detected by the detection unit; and a recording control unit (for example, the recorder block 52 that performs a process in step S615 shown in FIG. 49 and is shown in FIG. 3) configured to cause the reception data received by the receiving unit to be recorded. The power control unit controls supply of power to the recording control unit, and when the access point is detected by the detection unit, the power control unit makes a control (for example, processes in steps S611 and S614 shown in FIG. 50) such that power is supplied to the recording control unit while the receiving unit is receiving the reception data.

Figure 50:
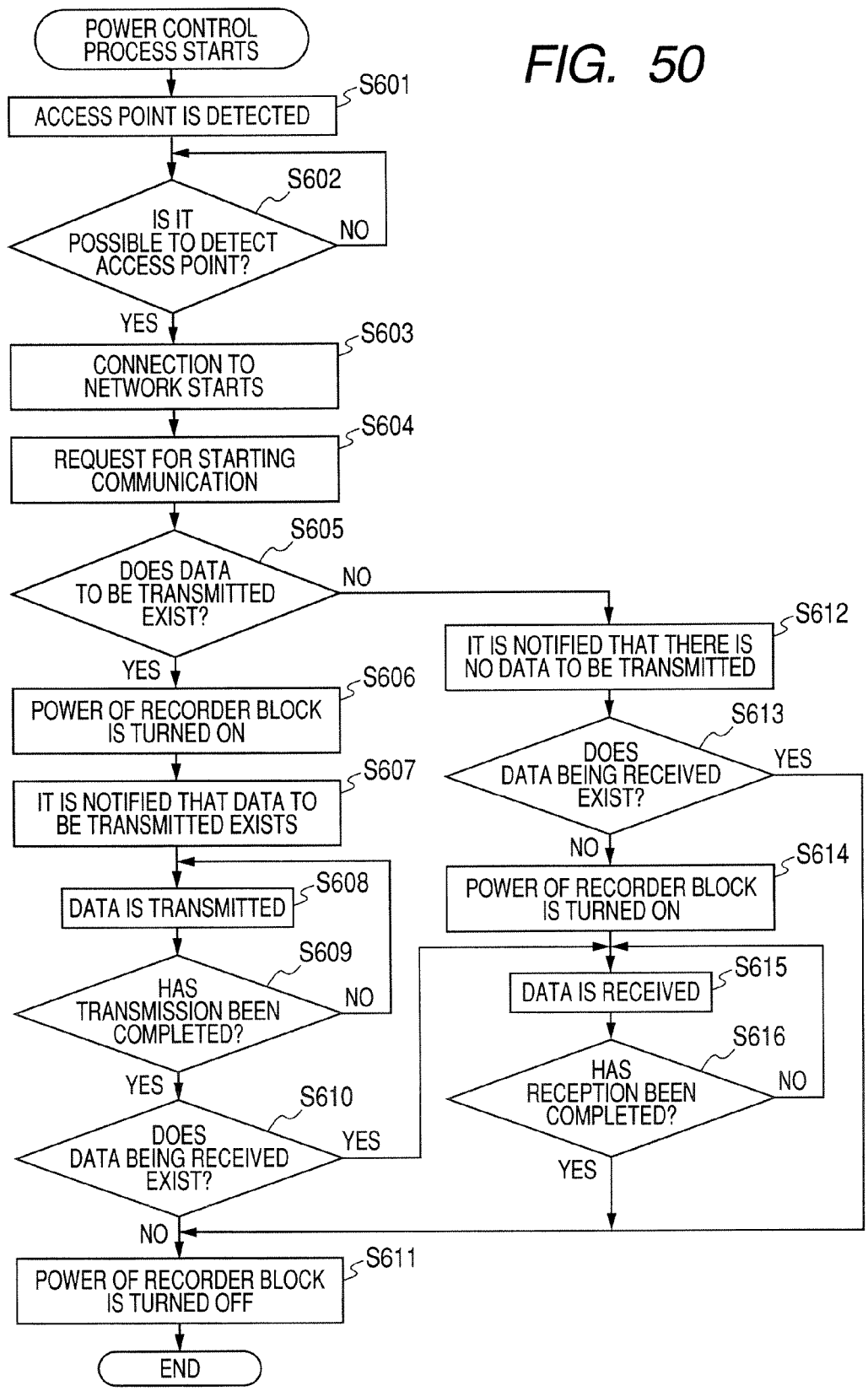
FIG. 50 is a flow chart explaining a power control process.

According to still another embodiment of the present invention, an information processing method of an information processing apparatus (for example, the camcorder 21 shown in FIG. 1) including a reproduction unit configured to reproduce transmission data from a recording medium in which the transmission data transmitted to another information processing apparatus (for example, the material utilization apparatus 29 shown in FIG. 1) through an access point (for example, an access point 23 shown in FIG. 1) is recorded includes the steps of: detecting the access point (for example, step S601 shown in FIG. 50); transmitting to the another information processing apparatus the transmission data reproduced by the reproduction unit when the access point is detected (for example, step S608 shown in FIG. 50); and controlling supply of power such that power is supplied to the reproduction unit when the access point is detected (for example, step S606 shown in FIG. 50) and controlling supply of power such that power is not supplied to the reproduction unit in other cases (for example, step S611 shown in FIG. 50).

According to still another embodiment of the present invention, there is provided a program causing a computer, which controls an information processing apparatus (for example, the camcorder 21 shown in FIG. 1) including a reproduction unit configured to reproduce transmission data from a recording medium in which the transmission data transmitted to another information processing apparatus (for example, the material utilization apparatus 29 shown in FIG. 1) through an access point (for example, the access point 23 shown in FIG. 1) is recorded, to execute: detecting the access point (for example, the step S601 shown in FIG. 50); transmitting to the another information processing apparatus the transmission data reproduced by the reproduction unit when the access point is detected (for example, the step S608 shown in FIG. 50); and controlling supply of power such that power is supplied to the reproduction unit when the access point is detected and controlling supply of power such that power is not supplied to the reproduction unit in other cases (for example, the step S611 shown in FIG. 50).

Hereinafter, specific embodiments to which the present invention is applied will be described in detail with reference to the accompanying drawings.

Figure 1:
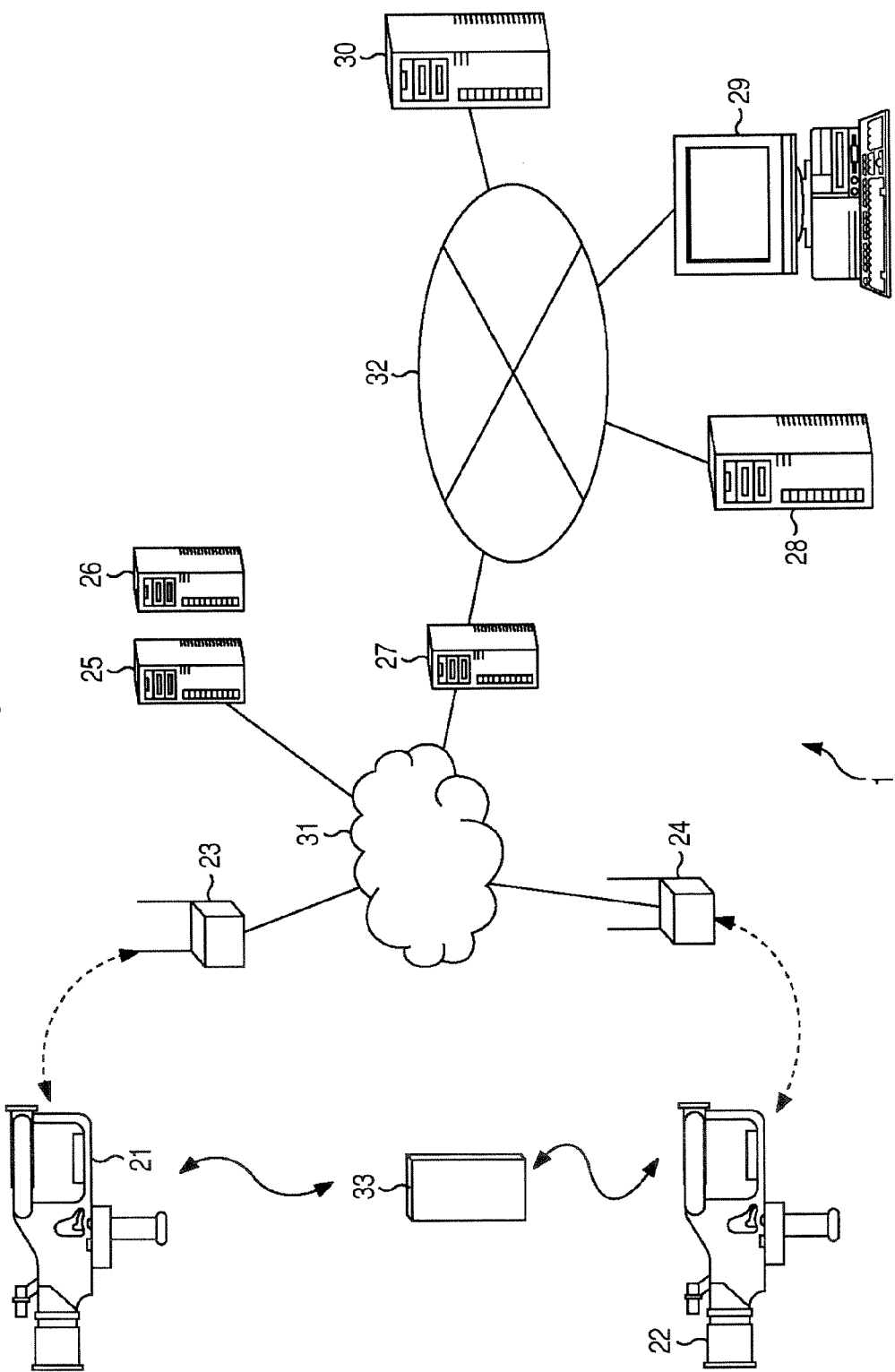
FIG. 1 is a view illustrating an example of the configuration of a network system according to an embodiment of the present invention.

FIG. 1 is a view illustrating an example of the configuration of a network system 1 according to an embodiment of the present invention.

The network system 1 shown in FIG. 1 is, for example, a program production support system used to produce a television program or the like. A process of producing the television program is basically divided into planning (framework), recording, and editing (producing). The planning (framework) is a process of generalizing overall production of the television program. Specifically, the planning (framework) is a process of making a plan and an idea on the television program to be produced and writing a scenario (plot) of the television program.

The recording is a process of performing an actual recording at the producing location in accordance with, for example, a production instruction or a scenario. Specifically, the recording is a process of acquiring material data, such as image data or sound data, corresponding to each scene included in the television program and recording the state of shoot (including acquisition of sounds). In the editing (producing), on the basis of the production instruction or the scenario, the material data obtained by the recording may be edited or other information (CG/SI (computer graphics/superimpose), narration, a material image or music, or the like) that is not obtained by the recording may be added to the material data obtained by the recording or material data (edited result) after the editing, thereby creating a complete package that is data (material data) completed as a television program.

The network system 1 shown in FIG. 1 is a program production support system that supports works in the processes described above. The network system 1 is configured to include camcorders 21 and 22, access points 23 and 24, servers 25 and 26, a firewall 27, a material server 28, a material utilization apparatus 29, a complete package server 30, a network 31, and an intranet 32.

The camcorders 21 and 22 are apparatuses used to record a news program, which is a television program, or shoot (including acquisition of sounds) a sports game, a movie, or the like. The camcorders 21 and 22 records material data or the like, which is obtained by shooting a photographic subject, in a material memory 108 (which will be described later in FIG. 3) or a removable media 33, such as a magnetic disc, an optical disc including a DVD (digital versatile disc), a magneto-optical disc, a memory card, or a removable hard disc drive. In addition, the camcorders 21 and 22 are wirelessly connected to the access points 23 or 24 and transmit material data to another apparatus (for example, the material utilization apparatus 29) through the network 31, such as Internet, connected to the access points 23 and 24.

In addition, the camcorders 21 and 22 reproduce the material data from the removable media 33 mounted therein and transmit the material data to another apparatus In addition, the camcorders 21 and 22 create information that is useful for a subsequent editing process, such as information on the recording, on the basis of an input from a user, and the created information is associated, as metadata, with the material data obtained by the camcorders 21 and 22.

The camcorder 21 is connected to the server 25 through the access point 23 and the network 31, and the camcorder 22 is connected to the server 26 through the access point 24 and the network 31. The material data obtained by the camcorders 21 and 22 is supplied to the servers 25 and 26 and is then recorded therein as necessary.

The intranet 32 is connected to the network 31 through the firewall 27, and the firewall 27 prohibits an unauthorized access to the intranet 32 through the network 31.

Furthermore, the material server 28, the material utilization apparatus 29, and the complete package server 30 are connected to the intranet 32.

The material server 28 stores material data that is supplied from the material utilization apparatus 29 through the intranet 32. The material utilization apparatus 29 records the material data that is transmitted (uploaded) from the camcorders 21 and 22 through the access points 23 and 24, the network 31, the firewall 27, and the intranet 32. In addition, the material utilization apparatus 29 supplies the recorded material data to the material server 28.

In addition, the material utilization apparatus 29 reads out material data stored therein or material data stored in the material server 28 and then creates a complete package. Then, the material utilization apparatus 29 supplies the complete package to the complete package server 30 through the intranet 32. The complete package server 30 stores the complete package supplied from the material utilization apparatus 29.

Hereinafter, if it is not necessary to distinguish the camcorders 21 and 22 from each other, the camcorders 21 and 22 will be collectively referred to as a camcorder 21. In addition, if it is not necessary to distinguish the access points 23 and 24 from each other, the access points 23 and 24 will be collectively referred to as an access point 23.

Next, referring to FIG. 2, it will be described in detail about a workflow of workers that produce a television program in the network system 1 shown in FIG. 1. Further, in FIG. 2, it is assumed that a worker creates a news program.

Figure 2:
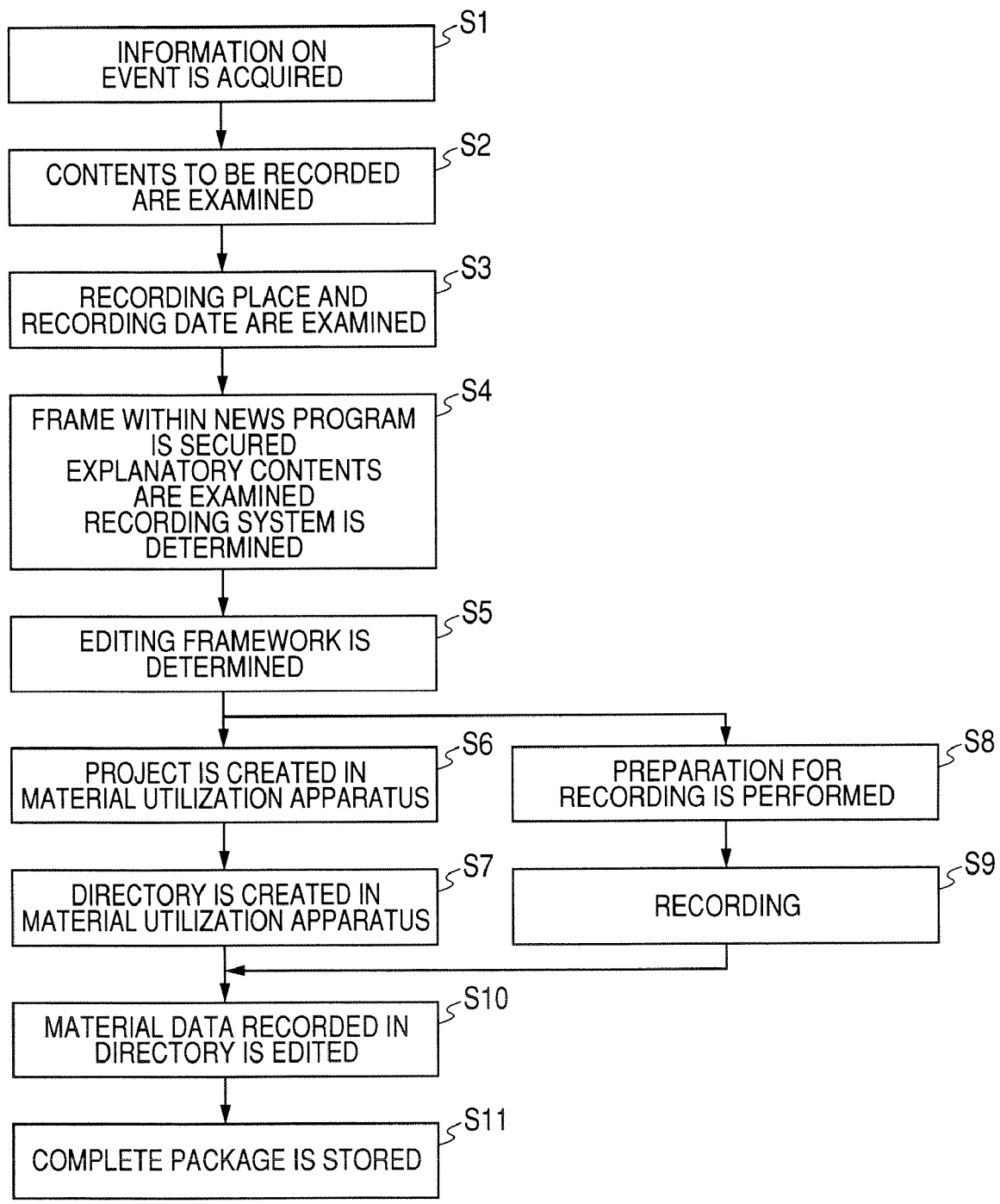
FIG. 2 is a view explaining a detailed workflow of workers that produce a television program.

As shown in FIG. 2, in step S1, a planning worker that performs a planning process acquires information on an event to make news, proceeding to step S2. In step S2, the planning worker examines (determines) contents to be recorded on the basis of the information acquired in step S1.

In addition, the contents to be recorded are different for each event (topic). Here, it is assumed that there are some contents to be recorded, which have been determined in step S2. The planning worker acquires a record ID, which is an ID unique to the contents to be recorded, from a NRC (news room computer; not shown) that manages television programs for each of the contents to be recorded.

After the step S2, the process proceeds to step S3 in which the planning worker examines a recording place (shoot place) and a recording date (shoot date). After the step S3, the process proceeds to step S4 in which the planning worker inputs a frame (time frame) for broadcasting the contents to be recorded, which have been examined in the step S2, in a news program schedule that the NRC manages (stores), thereby securing a time frame within a news program. Moreover, the planning worker examines explanatory contents that explain the contents to be recorded and makes note of the explanatory contents to be stored in the NRC. In addition, the planning worker determines a recording system including a man in charge of recording (camera man), an ID (hereinafter, referred to as an 'apparatus ID) of the recording camcorder 21, a recording plan (time table within contents to be recorded), and the like.

After the step S4, the process proceeds to step S5 in which the planning worker determines an editing framework indicating a broadcast order of the contents to be recorded, within a time range secured in the step S2. After the step S5, the planning worker that performs the editing process creates a project (unit of an editing work) in the material utilization apparatus 29 on the basis of the time frame secured in the step S4 and stores the note of the explanatory contents, which has been created in the step S4, in the material utilization apparatus 29.

After the step S6, the process proceeds to step S7 in which the planning worker creates a directory (folder) or the like for each record ID in the material utilization apparatus 29. The record ID corresponds to the directory. After the step S5, the process proceeds to step S8 in which a recording worker that performs a recording process prepares the recording process. Specifically, the recording worker records the record ID, which has been acquired from the NRC, in the camcorder 21 that records contents to be recorded corresponding to the record ID. In addition, the recording worker stores metadata (hereinafter, referred to as 'grouping metadata') corresponding to a group for each record ID, which will be described later, in the camcorder 21 on the basis of the editing framework determined in the step S5.

After the step S8, the process proceeds to step S9 in which, for example, the recording worker finds the recording date and recording place examined in step S3 and records the record contents examined in step S2 by using the camcorder 21. Then, the recording worker transmits the material data and the record ID, which have been obtained as a result of the recording, from the camcorder 21 to the material utilization apparatus 29 through the access point 23 and the network 31. As a result, in the material utilization apparatus 29, the material data is recorded in a directory corresponding to the record ID.

After the steps S7 and S9, the process proceeds to step S10 in which an editing worker edits the material data stored in the directory of the material utilization apparatus 29, and then the process proceeds to step S11. In step S11, the editing worker stores (records), as a complete package, the material data obtained as a result of the editing in the complete package server 30 through the intranet 32 from the material utilization apparatus 29.

FIG. 3 is a block diagram illustrating an example of the configuration of hardware of the camcorder 21 shown in FIG. 1.

The camcorder 21 shown in FIG. 3 is configured to include a camera block 51, a recorder block 52, a communication block 53, a power block 54, a microphone 55, and a speaker 56.

The camera block 51 includes a lens unit 71, a photographing unit 72, a video processor 73, a video encoder 74, a video I/F (interface) 75, a video processor I/F 76, a camera controller 77, a camera controller I/F 78, a viewfinder I/F 79, a viewfinder 80, an operation unit 81, an operation unit I/F 82, a microcomputer 83, a recorder I/F 84, and a bus 85. The camera block 51 serves to photographs a subject and supply image data (video data), which is obtained as a result of the photographing, to the recorder block 52.

The photograph unit 72 is configured to include, for example, a CCD (charge couple device) and photographs the subject by receiving light, which is reflected from the subject, through the lens unit 71. The photographing unit 72 supplies the image signal, which is an analog signal obtained as a result of the photographing, to the video processor 73. The video processor 73 performs an A/D (analog/digital) conversion process, an image adjustment process, or the like with respect to the image signal from the photographing unit 72. The video processor 73 supplies image data, which is digital data obtained as a result of the process, to the video encoder 74 or the video processor I/F 76.

The video encoder 74 compresses and encodes the image data from the video processor 73 on the basis of, for example, an MPEG (moving picture experts group) 2 format and then supplies the image data, which is obtained as a result of the process, to the video I/F 75.

The video I/F 75, the video processor I/F 76, the camera controller I/F 78, the viewfinder I/F 79, the operation unit I/F 82, the microcomputer 83, and the recorder I/F 84 are connected to one another through the bus 85.

The video I/F 75 supplies the image data, which has been supplied from the video encoder 74, to the record I/F 84 through the bus 85. The video processor I/F 76 supplies the image data, which has been supplied from the video processor 73, to the viewfinder I/F 79 through the bus 85.

The camera controller 77 performs an aperture or zoom control by controlling the photographing unit 72 on the basis of a control signal supplied from the camera controller I/F 78. The camera controller I/F 78 supplies the control signal, which is supplied from the microcomputer 83 through the bus, to the camera controller 77.

The viewfinder I/F 79 supplies the image data, which is supplied from the video processor I/F 76 or the recorder I/F 84, or a variety of metadata, which is supplied from the recorder I/F 84, to the viewfinder 80. The viewfinder 80 displays an image corresponding to the image data from the viewfinder I/F 79 or the metadata.

The operation unit 81 receives an operation (for example, a photographing instruction) on the camera block 51 from a user and supplies a camera operation signal, which indicates the operation, to the operation unit I/F 82. The operation unit I/F 82 supplies the camera operation signal, which is supplied from the operation unit 81, to the microcomputer 83 and the recorder I/F 84 through the bus 85.

The microcomputer 83 is configured to include a CPU (central processing unit), a ROM (read only memory), and a RAM (random access memory), for example. The CPU of the microcomputer 83 causes a program stored in the ROM to be executed such that each unit of the camera block 51 can be controlled on the basis of the camera operation signal from the operation unit 81. For example, the CPU supplies a control signal to the camera controller 77 through the bus 85 and the camera controller I/F 78 and performs an aperture or zoom control.

In addition, data or a program executed by the CPU is properly stored in the RAM of the microcomputer 83. For example, set values (for example, white balance, gain, filter, aperture, shutter speed, zoom, or focus; hereinafter, referred to as a 'camera set value') related to photographing in the camera block 51 are stored in the RAM of the microcomputer 83. The CPU of the microcomputer 83 supplies the control signal to the camera controller 77 on the basis of the camera set value. The CPU of the microcomputer 83 supplies the camera set value, which is stored in the RAM, to the recorder I/F 84.

The recorder I/F 84 transmits/receives data to/from the recorder block 52. For example, the recorder I/F 84 supplies image data or metadata, which has been supplied from a camera I/F 109 of the recorder block 52, to the viewfinder I/F 79 through the bus 85. In addition, the recorder I/F 84 supplies the image data supplied from the video I/F 75, the camera operation signal supplied from the operation unit I/F 82, and the camera set value supplied from the microcomputer 83 to the recorder block 52.

The recorder block 52 is configured to include an audio processor 100, an audio encoder 101, an audio I/F 102, an audio processor I/F 103, a speaker I/F 104, an audio decoder 105, a microcomputer 106, a material memory I/F 107, a material memory 108, a camera I/F 109, an LCD (liquid crystal display) I/F 110, a video decoder 111, an LCD 112, a media I/F 113, a communication block I/F 114, and a bus 115. The recorder block 52 serves to record material data such as the image data, which is acquired in the camera block 51, or sound data corresponding to a sound signal which is an analog signal acquired by the microphone 55.

The audio processor 100 performs an A/D conversion process, a sound adjustment process, or the like with respect to the sound signal supplied from the microphone 55. The audio processor 100 supplies sound data, which is digital data obtained as a result of the above process, to the audio encoder 101 and the audio processor I/F 103. The audio encoder 101 encodes the sound data from the audio processor 100 on the basis of, for example, a linear PCM (pulse code modulation) method and then supplies the sound data, which is obtained as a result of the encoding process, to the audio I/F 102.

The audio I/F 102, the audio processor I/F 103, the speaker I/F 104, the microcomputer 106, the material memory I/F 107, the camera I/F 109, the LCD I/F 110, the media I/F 113, and the communication block I/F 114 are connected to one another through the bus 115.

The audio I/F 102 supplies the sound data, which has been supplied from the audio encoder 101, to the material memory 108 or the media I/F 113 through the bus 115. The audio processor I/F 103 supplies the sound data, which has been supplied from the audio processor 100, to the speaker I/F 104 through the bus 115.

The speaker I/F 104 supplies to the audio decoder 105 the sound data supplied from the audio processor I/F 103, the material memory I/F 107, or the media I/F 113. The audio decoder 105 decodes the sound data as necessary. The audio decoder 105 supplies the sound data, which is obtained as a result of the decoding process, to the speaker 56 and then sound corresponding to the sound data is output from the speaker 56.

The microcomputer 106 is configured to include, for example, a CPU, a ROM, and a RAM. The CPU of the microcomputer 106 causes a program stored in the ROM to be executed such that each unit of the recorder block 52 can be controlled on the basis of a communication operation signal that is supplied from the communication block I/F 114 and indicates an operation of an operation unit 131 performed by a user.

For example, the CPU of the microcomputer 106 creates metadata (grouping metadata or non-real-time metadata to be described later) of material data on the basis of information on the recording or various set values or the like supplied from the media I/F 113.

Further, the CPU of the microcomputer 106 creates, for example, disc metadata, which is metadata with respect to the entire data recorded in the removable media 33. Furthermore, on the basis of image data supplied from the camera I/F 109, the CPU of the microcomputer 106 creates proxy image data having low resolution as compared with the image data.

Furthermore, the CPU of the microcomputer 106 samples (extracts with predetermined distances) the image data supplied from the camera I/F 109 if needed, and creates thumbnail image data (image data of a still image) as sampling thumbnail image data on the basis of the sampled image data.

In addition, the CPU of the microcomputer 106 controls the recording or reproduction on the material memory 108 and the removable media 33.

Alternatively, the microcomputer 106 performs the recording and the reproduction on the material memory 108 or the removable media 33 at the same time as necessary. At this time, the microcomputer 106 may reproduce data, for which the recording process has been completed, of files recorded in the material memory 108 or the removable media 33.

In addition, the CPU of the microcomputer 106 creates image data used to display various screens and supplies the image data to the LCD I/F 110. In addition, the CPU of the microcomputer 106 determines an operation state (for example, recording, reproduction, low-speed reproduction, high-speed reproduction, or stop) of the camcorder 21 on the basis of the camera operation signal supplied from the camera I/F 109 and the communication operation signal supplied from the communication block I/F 114 and then creates data indicating the operation state. In addition, the CPU of the microcomputer 106 supplies the data (hereinafter, referred to as an 'operation state data') and the camera set value supplied from the recorder I/F 84 to a communication block I/F 136 through the bus 115. In addition, data or a program executed by the CPU is properly stored in the RAM of the microcomputer 106.

The material memory I/F 107 accesses, for example, the material memory 108 at high speed and performs recording or reproduction of data with respect to the material memory 108.

For example, the material memory I/F 107 supplies the material data to the material memory 108 so as to be stored as a file, according to the control of the microcomputer 106. Furthermore, the material memory I/F 107 supplies the proxy image data to the material memory 108 so as to be stored as a file, according to the control of the microcomputer 106. Furthermore, the material memory I/F 107 supplies metadata (for example, sampling thumbnail image data, disc metadata, and metadata of material data) to the material memory 108 so as to be stored as a file, according to the control of the microcomputer 106.

Moreover, the material memory I/F 107 reproduces the material data from the material memory 108 and supplies sound data of the material data to the speaker I/F 104 and image data of the material data to the LCD I/F 110. Moreover, the material memory I/F 107 reproduces proxy image data, metadata, and the material data from the material memory 108 and supplies the reproduction data to the communication block I/F 114.

The camera I/F 109 is connected to the recorder I/F 84 of the camera block 51 and receives, for example, the image data, the camera operation signal, and the camera set value from the recorder I/F 84. The camera I/F 109 supplies the image data, the camera operation signal, and the camera set value to the microcomputer 106 through the bus 115 and supplies the image data to the material memory I/F 107 or the media I/F 113. The LCD I/F 110 supplies to the video decoder 111 the image data supplied from the material memory I/F 107 or the media I/F 113.

The video decoder 111 decodes the image data from the LCD I/F 110 as necessary and then supplies image data, which is obtained as a result of the decoding process, to the LCD 112. The LCD 112 displays an image corresponding to the image data from the video decoder 111.

The media I/F 113 supplies the material data to the removable media 33 so as to be stored as a file, according to the control of the microcomputer 106. In addition, the media I/F 113 supplies the proxy image data to the removable media 33 so as to be stored as a file, according to the control of the microcomputer 106. Furthermore, the media I/F 113 supplies metadata (for example, sampling thumbnail image data, disc metadata, and metadata of material data) to the removable media 33 so as to be stored as a file, according to the control of the microcomputer 106.

In addition, the media I/F 113 reads out various set values or information on the recording, which is recorded in the removable media 33 mounted in the camcorder 21, and supplies the read information or set values to the microcomputer 106.

Moreover, even though the information on the recording or the various set values are input from the removable media 33 to the microcomputer 106 through the media I/F 113 in the present embodiment, a user may operate the operation unit 131 so as to input the information on the recording or the various set values to the microcomputer 106.

Moreover, the media I/F 113 reproduces the material data from the removable media 33 and supplies sound data of the material data to the speaker I/F 104 and image data of the material data to the LCD I/F 110. Moreover, the media I/F 113 reproduces material data, proxy image data, metadata, and the like from the removable media 33 and supplies the reproduction data to the communication block I/F 114.

The communication block I/F 114 is connected to a recorder I/F 135 (will be described later) of the communication block 53 so as to transmit/receive data to/from the communication block 53. For example, the communication block I/F 114 supplies, for example, image data of an image to be freeze-mixed (hereinafter, referred to as a 'FreezeMix image') which is supplied from the recorder I/F 135 of the communication block 53, to the material memory I/F 107 or the media I/F 113 so as to be stored in the material memory 108 or the removable media 33.

Here, the FreezeMix refers to a process of translucently displaying a previously photographed image, as a sample image used as a sample at a time of photographing, on the viewfinder 80. That is, the image to be freeze-mixed is a sample image in the FreezeMix.

Furthermore, the communication block I/F 114 supplies the communication operation signal, which is supplied from the recorder I/F 135, to the microcomputer 106 through the bus 115.

In addition, the communication block I/F 114 supplies the material data, the proxy image data, and the metadata, which are supplied from the material memory I/F 107 or the media I/F 113, to the recorder I/F 135 or supplies to the recorder I/F 135 operation state data and camera set values supplied from the microcomputer 106.

The communication block 53 is configured to include the operation unit 131, the operation unit I/F 132, a power unit I/F 133, a microcomputer 134, the recorder I/F 135, a network I/F 136, and a bus 137. The communication block 53 performs data communication with another apparatus through the access point 23 and the network 31, which are shown in FIG. 1, and controls power of the recorder block 52.

The operation unit 131 receives an operation (for example, a reproduction instruction) on the recorder block 52 and the communication block 53 and supplies a communication operation signal indicating the operation to the operation unit I/F 132. The operation unit I/F 132, the power unit I/F 133, the microcomputer 134, the recorder I/F 135, and the network I/F 136 are connected to one another through the bus 137.

The operation unit I/F 132 supplies the communication operation signal, which is supplied from the operation unit 131, to the microcomputer 134 or the recorder I/F 135 through the bus 137. The power unit I/F 133 supplies a power control signal, which is supplied from the microcomputer 134 through the bus 137 so as to control the supply of power to the recorder block 52, to a communication block I/F 152 of the power block 54.

The microcomputer 134 is configured to include, for example, a CPU, a ROM, and a RAM. The CPU of the microcomputer 134 causes a program stored in the ROM to be executed such that each unit of the communication block 53 can be controlled on the basis of the communication operation signal supplied from the operation unit 13. Further, the CPU of the microcomputer 134 creates a power control signal on the basis of a detection signal, which is supplied from the network I/F 136 and indicates a detection result of the access point 23, and supplies the power control signal to the power unit I/F 133.

In addition, data or a program executed by the CPU is stored in the RAM of the microcomputer 134. For example, material data, proxy image data, or metadata, which is supplied through the recorder I/F 135 and transmitted through the network I/F 136, is temporarily stored in the RAM. For this reason, even in the case when the reproduction speed at which the removable media 33 reproduces the data is faster than the transmission speed, the data can be reliably transmitted.

The recorder I/F 135 is connected to the communication block I/F 114 of the recorder block 52 and supplies to the communication block I/F 114, for example, image data of the FreezeMix image supplied from the network I/F 136 or the communication operation signal supplied from the operation unit I/F 132.

In addition, the recorder I/F 135 supplies the material data, the proxy image data, the metadata, the operation state data, and the camera set value, which are supplied from the communication block I/F 114, to the microcomputer 134 through the bus 137.

The network I/F 136 performs a communication with another apparatus (for example, the material utilization apparatus 29) through the access point 23, the network 31, or the like on the basis of FTP (file transfer protocol), UDP (user datagram protocol), or the like. For example, the network I/F 136 supplies the material data, the proxy image data, the metadata, and the like, which are supplied from the recorder I/F 135, to the material utilization apparatus 29 through the access point 23, the network 31, the firewall 27, and the intranet 32 in the order of the metadata, the proxy image data, and the material data. That is, the network I/F 136 transmits data, such as the metadata or the proxy image data, associated with the material data and having an amount of data smaller than the material data, before transmitting the material data.

Furthermore, the network I/F 136 transmits the operation state data, the camera set value, and the like, which are supplied from the microcomputer 134, to the material utilization apparatus 29.

Moreover, for example, the network I/F 136 receives the image data of the FreezeMix image, which is transmitted from the material utilization apparatus 29 through the intranet 32, the firewall 27, the network 31, and the access point 23, and then supplies the received image data to the recorder I/F 135 through the bus 137. In addition, the network I/F 136 detects the access point 23 and supplies a detection signal indicating the detection result to the microcomputer 134.

The power block 54 is configured to include a power unit 151 and the communication block I/F 152 and serves to supply power to the camera block 51, the recorder block 52, the communication block 53, the microphone 55, and the speaker 56.

The power unit 151 controls the supply of power to the recorder block 52 on the basis of the power control signal supplied from the communication block I/F 152. The communication block I/F 152 supplies the power control signal, which is supplied from the power unit I/F 133 of the communication block 53, to the power unit 151.

Moreover, for the convenience of explanation, it is assumed hereinbelow that data including the material data, the proxy image data, and the metadata is recorded in the removable media 33.

Figure 4:
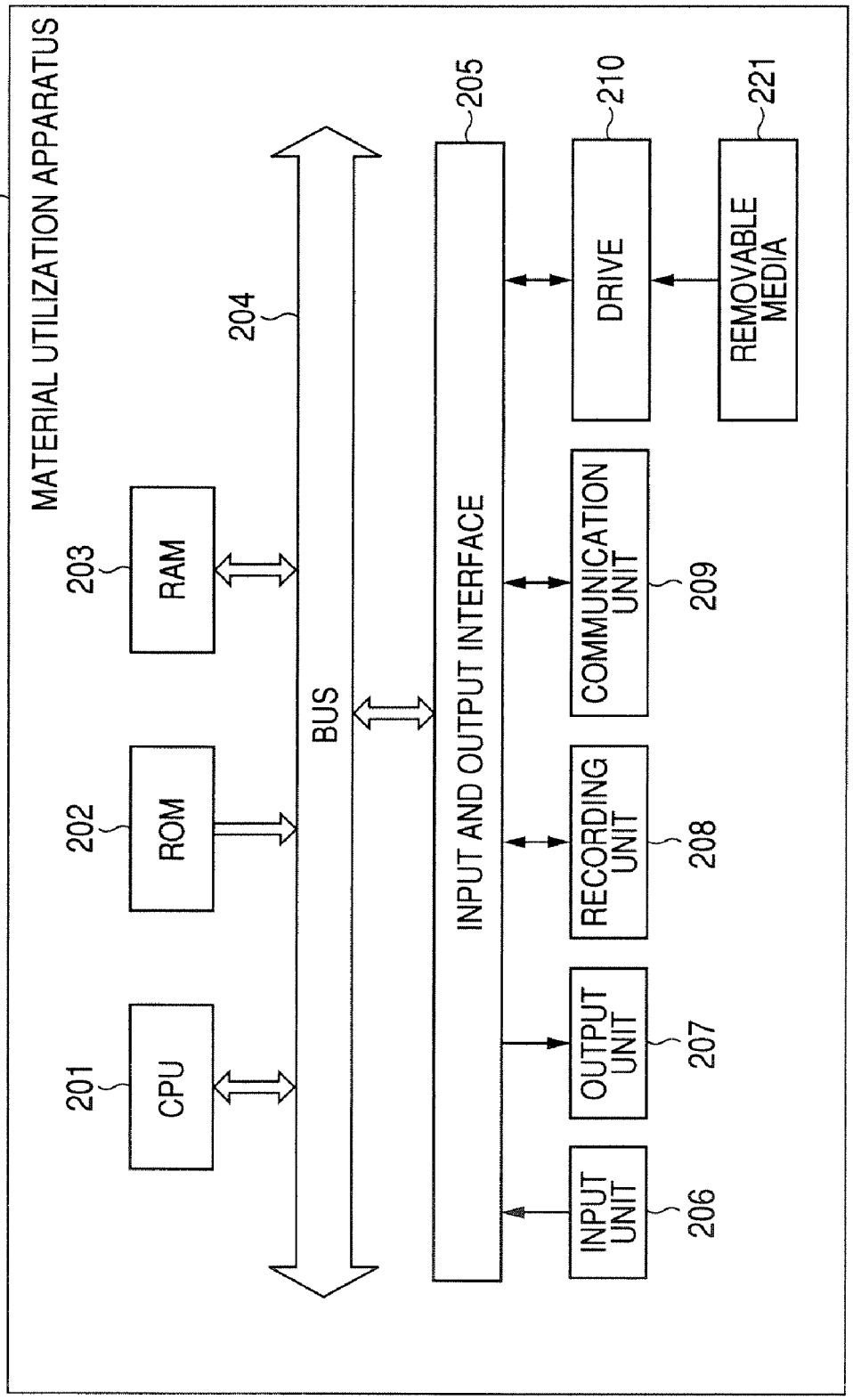
FIG. 4 is a block diagram illustrating an example of the configuration of hardware of a material utilization apparatus shown in FIG. 1.

FIG. 4 is a block diagram illustrating an example of the configuration of hardware of the material utilization apparatus 29 shown in FIG. 1.

A CPU 201 performs various processes according to a program stored in a ROM 202 or a recording unit 208. Data or a program executed by the CPU 201 is properly stored in the RAM 203. These CPU 201, ROM 202, and RAM 203 are connected to one another through a bus 204.

In addition, an input and output interface 205 is connected to the CPU 201 through the bus 204. The input and output interface 205 is connected with an input unit 206, which includes a keyboard, a mouse, a microphone, and a receiving unit that receives an instruction transmitted from a remote controller (not shown), and an output unit 207 which includes a display and a speaker. The CPU 201 performs various processes in response to an instruction input from the input unit 206. In addition, the CPU 201 outputs a result of the process to the output unit 207. For example, the CPU 201 creates image data used to display various screens and then causes the created image data to be displayed on the output unit 207.

The recording unit 208 connected to the input and output interface 205 is, for example, a hard disc and serves to record various data or programs executed by the CPU 201. A communication unit 209 communicates with an external apparatus through the intranet 32. In addition, the communication unit 209 may acquire a program through the intranet 32 and record the acquired program in the recording unit 208.

A drive 210 connected to the input and output interface 205 serves to drive a removable media 211, such as a magnetic disc, an optical disc, a magneto-optical disc, or a semiconductor memory, when the removable media 211 is mounted and acquires a program or data recorded in the removable media 211. The acquire program or data is transmitted to the recording unit 208 and is then recorded in the recording unit 208 as needed.

Figure 5:
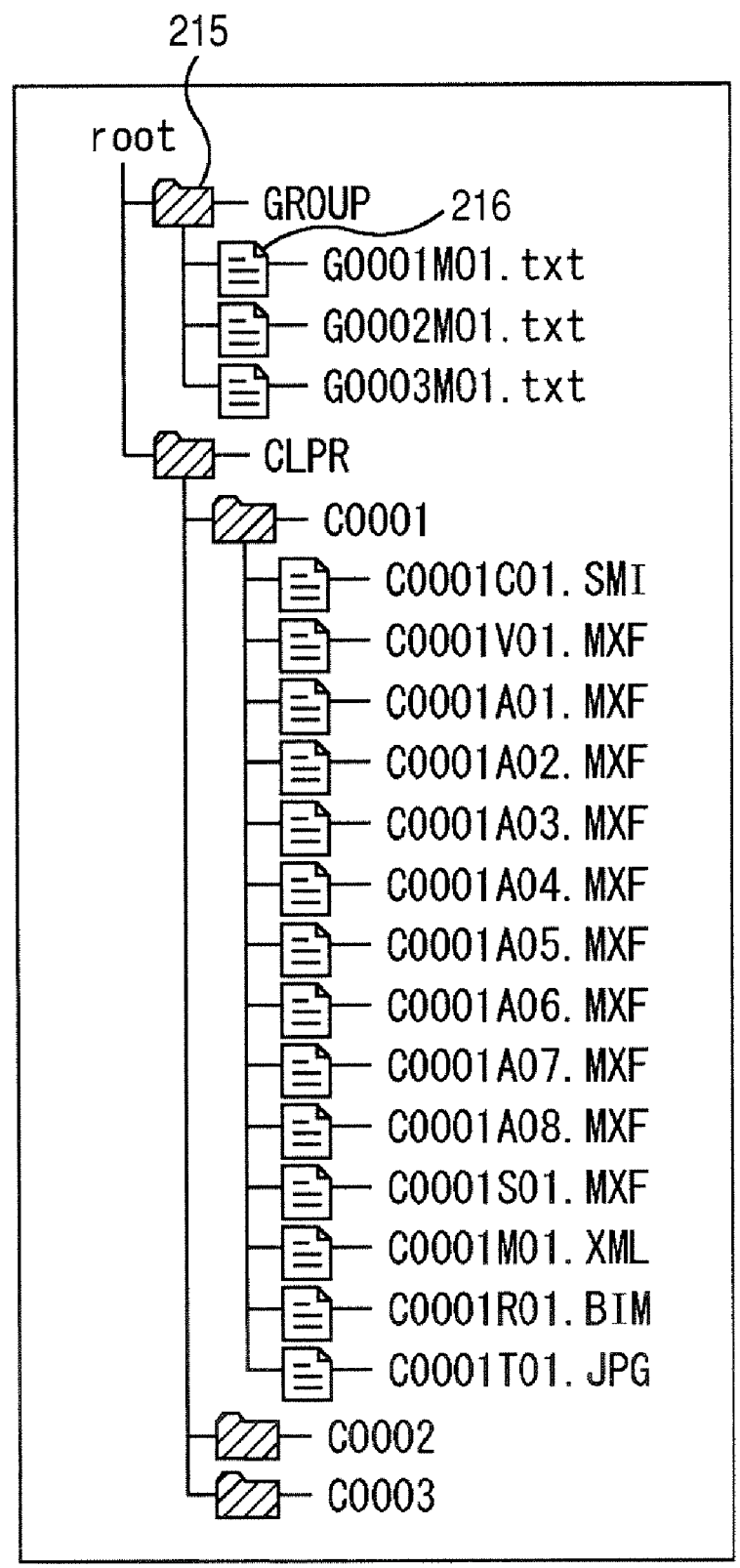
FIG. 5 is a view illustrating an example of a screen on which a directory structure of files recorded in a removable media is displayed.

FIG. 5 is a view illustrating an example of a screen which is displayed on the LCD 112 in FIG. 3 and on which a directory structure of files recorded in the removable media 33 shown in FIG. 1 is displayed.

In FIG. 5, a symbol 215 indicates a directory. In addition, each of the other symbols equal to the symbol (directory) 215 also indicates a directory, even though reference numeral is not attached thereto. Moreover, a symbol 216 indicates a file. In addition, each of the other symbols equal to the symbol (file) 216 also indicates a file, even though reference numeral is not attached thereto.

In addition, if not otherwise specified, an explanation will be made hereinbelow assuming that a directory and a symbol of the directory are equal to each other. Similarly, an explanation will be made assuming that a file and a symbol of the file are equal to each other. In addition, in order to easily distinguish among directories and files, a name corresponding to each of the directories and files is described in parenthesis located behind a file or a directory.

In the example shown in FIG. 5, the removable media 33 includes a GROUP directory 215 and a clip root directory (CLPR).

As for the GROUP directory 215, a grouping metadata file 216 (G0001M01.txt to G0003M01.txt), which is a file corresponding to a grouping metadata (shown in FIG. 6 or 7 to be described later) of a group, is prepared for each record ID of all clips (details of clips will be described later) recorded in the removable media 33.

Specifically, FIG. 5 illustrates an example of a case in which data of clips corresponding to three record IDs is recorded in the removable media 33. The grouping metadata of a group corresponding to the three record IDs is divided into three files of a first grouping metadata file (G0001M01.txt), a second grouping metadata file (G0002M01.txt), and a third grouping metadata file (G0003M01.txt) so as to be recorded.

Furthermore, in the clip root directory (CLPR), data of clips recorded in the removable media 33 is divided to different directories for each clip so as to be managed.

Here, the clip refers to a unit representing a number of photographing times of the camcorder 21. In addition, the clip also refers to a unit representing a time from the start of a photographing process to the end of the photograph process, a unit representing the length of various data obtained by the photographing process, or a unit representing the amount of data with respect to various data obtained by the photographing process. In addition, the clip may refer to a group of various data itself.

Here, the clip indicates, for example, a group of image data and sound data corresponding to the image data, which are obtained by a photographing process (photographing process from the start of the photographing to the end of the photographing), and metadata.

Specifically, for example, FIG. 5 illustrates an example of a case in which data of three clips is recorded in the removable media 33. The data of the three clips is managed by using three files of a first clip directory (C0001), a second clip directory (C0002), and a third clip directory (C0003), which are files separate from each other.

That is, for example, each data of a first clip recorded in the removable media 33 is managed as a file subordinate to a first clip directory (C0001).

Specifically, for example, as shown in FIG. 5, the first clip directory (C0001) includes: a master file (C0001C01.SMI) serving to manage the clip; an image file (C0001V01.MXF) which is a file including image data of the clip; eight sound files (C0001A01.MXF to C0001A08.MXF) including sound data corresponding to respective channels of the clip; a proxy image data file (C0001S01.MXF) which is a file including proxy image data of the clip; a non-real-time metadata file (C0001M01.XML) which is a file including metadata (hereinafter, referred to as 'non-real-time metadata') for which real time is not requested, such as the type (for example, a camcorder) of an apparatus that has acquired the clip or an ID of the apparatus and a camera set value and a shoot date when photographing (acquiring) the clip; a real-time metadata file (C0001R01.BIM) which is a file including metadata (hereinafter, referred to as 'real-time metadata') for which real time is requested, and a sampling thumbnail image file (C0001T01.JPG) which is a file including sampling thumbnail image data.

As described above, in the example shown in FIG. 5, each of the image data, the proxy image data, and the real-time metadata, for which real time is requested at the time of reproduction, is managed as one file such that a reading time does not increase when the image data, the proxy image data, and the real-time metadata are separately needed.

Further, as described above, the real time is also requested to sound data at the time of reproduction. In addition, the sound data is prepared in correspondence with eight channels so as to correspond to multi channels, such as 7.1 channels, of sound and is managed as different files. Even though it has been described that the sound data is managed as eight files, the invention is not limited thereto. For example, the number of files corresponding to sound data may be seven or less or nine or more.

In the same manner, the image data, the proxy image data, and the real-time metadata may also be managed by the use of two or more files.

Furthermore, in the example shown in FIG. 5, the non-real time metadata file (C0001M01.XML) is described in an XML format so as to be widely used, but the real-time metadata file (C0001R01.BIM) is described as a file based on a BIM (binary format for MPEG-7 data) format, which is obtained by compiling a file based on the XML format, in order to alleviate processing time for reproduction or a load necessary for the process.

The file configuration example of the first clip directory (C0001) described above may be applied to all kinds of clip directories. That is, in the example shown in FIG. 5, the same configuration example as described for the first clip directory (C0001) may be applied to the second clip directory (C0002) and the third clip directory (C0003). Accordingly, an explanation thereof will be omitted. In addition, the sampling thumbnail image file (C0001T01.JPG) which is a file including the sampling thumbnail image data may not be recorded.

Next, grouping metadata will be described with reference to FIGS. 6 and 7.

FIG. 6 illustrates examples of items of contents of the grouping metadata.

In the example shown in FIG. 6, the items of the contents of the grouping metadata include 'group title', 'record ID', 'classification', 'original', 'group creating date', 'destination', 'shoot date', 'shoot place', 'photographer', 'details of photographing', and 'shoot material (file)'.

The item 'group title' is a title indicating recorded contents or the like of a group, and the item 'record ID' is a record ID acquired from the NRC in the step S2 shown in FIG. 2. The item 'classification' indicates types (for example, FreezeMix or recording) of clips classified into groups. The item 'original' is information indicating whether clips classified into the group are original data including data of clips classified into the group or data processed after the recording. The item 'group creating date' is information on date when grouping metadata is created.

The item 'destination' includes an item 'name', an item 'E-mail address', and an item 'website URL (uniform resource locator)'. The item 'name' indicates a name of the destination of each of the clips classified into groups. The item 'E-mail address' indicates an E-mail address of the destination. The item 'website URL' indicates a 'website URL of the destination.

In addition, a plurality of E-mail addresses may be described as contents of the item 'E-mail address'. In addition, a plurality of website URLs may be described as contents of the item 'website URL'.

The item 'shoot date' includes an item 'prearrangement' and an item 'execution'. The item 'prearrangement' is information on recording date examined in the step S3 shown in FIG. 2, and the item 'execution' is information on actual recording date. The item 'shoot date' includes an item 'prearrangement' and an item 'execution'. The item 'prearrangement' is information on recording place examined in the step S3, and the item 'execution' is information on actual recording place. For example, the actual recording place is location information indicating the current location of the camcorder 21, which has been acquired by a GPS (global positioning system; not shown) provided in the camcorder 21 at the time of recording.

The item 'photographer' includes an item 'prearrangement' and an item 'execution'. The item 'prearrangement' indicates a name of a recording man determined in the step S4. The item 'execution' indicates a name of an actual recording man. The item 'details of photographing' includes an item 'instruction' and an item 'actual (memo)'. The item 'instruction' is information on recording contents, such as recording plan. The item 'actual (memo)' is information on actual recording contents.

The item 'shoot material' includes an item 'title', an item 'UMID (unique material identifier), an item 'memo', and an item 'transmission history'. The item 'title' indicates a name (title) of each of the clip directories (C0001 to C0003) of clips classified into groups, and the item 'UMID' is an UMID (will be described in detail later) of a clip. The item 'memo' indicates predetermined information input from a user, and the item 'transmission history' is information indicating whether or not each of the clips classified into groups has been transmitted.

Moreover, the UMID is an identifier unique to each clip, which is used to identify each of the clip in a globally unique manner and indicates an identifier defined by SMPTE (society of motion picture and television engineers). For example, the UMID is included in an image file or a non-real-time metadata.

FIG. 7 illustrates an example of grouping metadata described in a text format.

In the grouping metadata shown in FIG. 7, subsequent to an item, contents of the item are described, and the item and the contents of the item are separated from each other by using ', (comma)'.

Specifically, in the example shown in FIG. 7, subsequent to a 'title' indicating the item 'group title', 'Mt. Fuji viewed from Lake Yamanaka' that is contents of the item 'group title' is described. Subsequently, 'category' indicating the item 'classification', 'recording' that is contents of the item 'classification', 'original' indicating the item 'original', and 'Yes', which is contents of the item 'original', indicating original data are sequentially described in this order.

Subsequently, in the same manner, 'date created' indicating the item 'group creating date', '2005/5/16' that is contents of the item 'group creating date', 'date directed' indicating the item 'prearrangement' of the item 'shoot date', '2005/5/31' that is contents of the item 'prearrangement', 'date carried out' indicating the item 'execution' of the item 'shoot date', '2005/5/31' that is contents of the item 'execution', 'place directed' indicating the item 'prearrangement' of the item 'shoot place', 'Lake Yamanaka plain' that is contents of the item 'prearrangement', 'place carried out' indicating the item 'execution' of the item 'shoot place', and 'Lake Yamanaka plain' that is contents of the item 'execution' are sequentially described in this order.

In addition, subsequently, 'person directed' indicating the item 'prearrangement' of the item 'photographer', 'Kamei, Takemura' that is contents of the item 'prearrangement', 'person carried out' indicating the item 'execution' of the item 'photographer', 'Kamei, Takemura' that is contents of the item 'execution', 'description directed' indicating the item 'instruction' of the item 'details of photographing', 'XXX' that is contents of the item 'instruction', 'description occurred' indicating the item 'actual (memo)' of the item 'details of photographing', and 'XXXX' that is contents of the item 'actual (memo)' are sequentially described in this order.

In addition, subsequently, 'file title' indicating the item 'title' of the item 'shoot material (file)', 'XXXX' that is a title of a first file of a clip classified as a group among contents of the item 'title', 'file ID' indicating the item 'UMID' of the item 'shoot material', 'XXXX' that is a UMID of a first file among contents of the item 'UMID', 'memo' indicating the item 'memo' of the item 'shoot material', and 'XXXX' that is contents of the item 'memo' are sequentially described in this order.

In addition, subsequently, in the same manner as for the first file, items 'title', 'UMID', 'memo', and contents thereof corresponding to second and third files are described.

Figure 8:
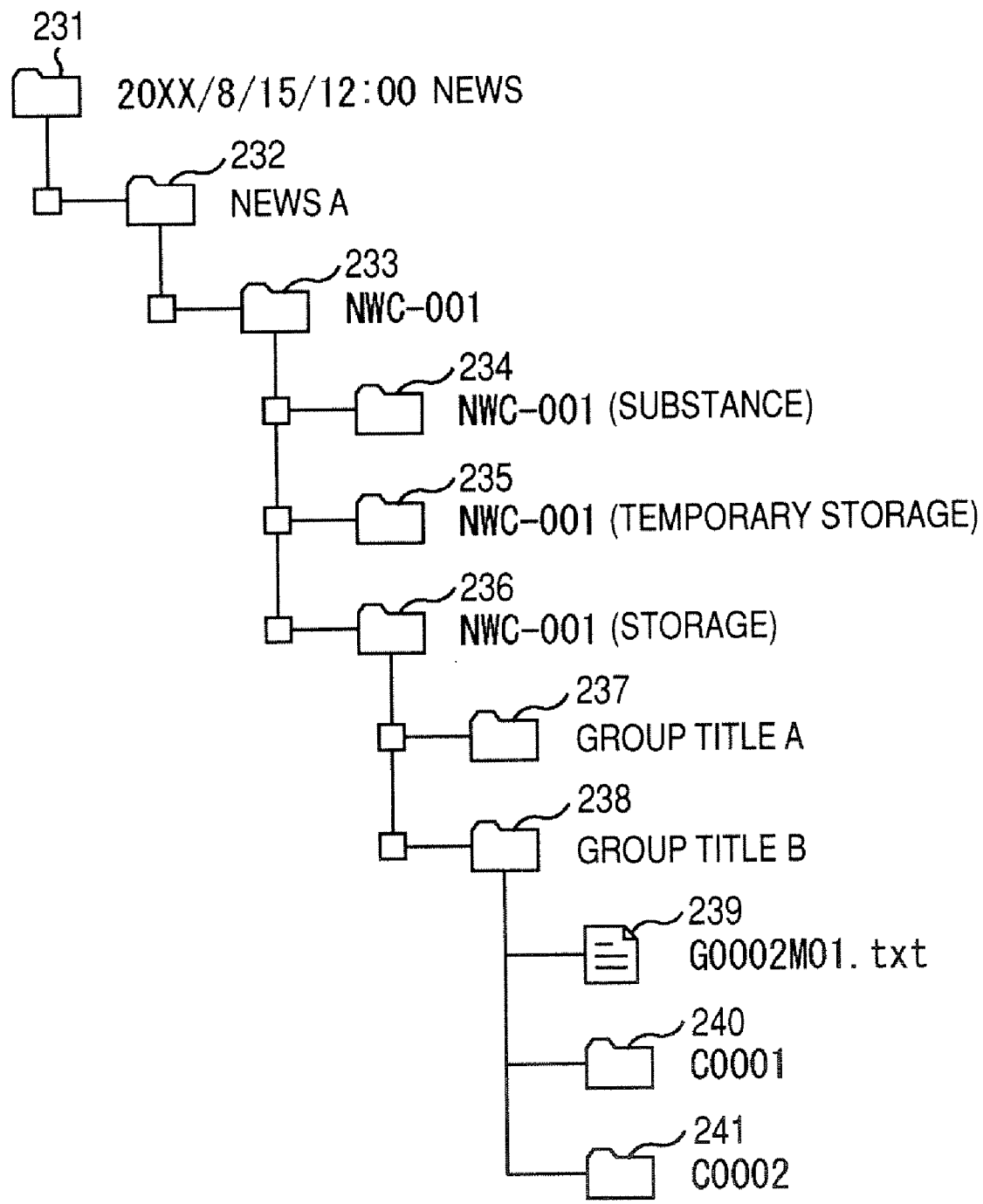
FIG. 8 is a view illustrating an example of a screen on which a directory structure of files recorded in a recording unit is displayed.

FIG. 8 is a view illustrating an example of a screen which is displayed on the output unit 207 of the material utilization apparatus 29 and on which a directory structure of files recorded in the recording unit 208 shown in FIG. 4 are displayed.

Further, the directory shown in FIG. 8 is created by performing a creating work by means of an editing worker in the step S7 shown in FIG. 2.

As shown in FIG. 8, the recording unit 208 is provided with a program directory 231. In the program directory 231, files of clips included in a television program are provided in a subdirectory. In the example shown in FIG. 8, in the program directory 231, files of clips included in a news program broadcasted at noon, Aug. 15, 20XX are provided in a subdirectory.

In the program directory 231, a news A directory 232 corresponding to a frame within the news program is provided, and in the subdirectory of the news A directory 232, a directory of the camcorder 21 that records recording contents included in the news A is provided.

In the example shown in FIG. 8, one camcorder directory 233 (NWC-001) is provided. A substantial directory 234, a temporary storage directory 235, and a storage directory 236 are provided as subdirectories of the camcorder directory 233.

In the substantial directory 234, a file indicating the current (real-time) state of the camcorder 21 is provided so as to be subordinate thereto.

Specifically, in the substantial directory 234, files (virtual files) corresponding to data indicating the current state of the camcorder 21, a current camera block set value of the camcorder 21, material data of a clip that is being currently acquired or reproduced in the camcorder 21, display of contents of a file currently recorded in the removable media 33 mounted in the camcorder 21, and control (for example, recording, reproduction, low-speed reproduction, high-speed reproduction, or stop) of the camcorder 21 are provided so as to be subordinate thereto.

As described above, since the files indicating the real-time state of the camcorder 21, a user that uses the material utilization apparatus 29 can see the current recording state of the camcorder 21 through the substantial directory 234.

In addition, the substantial directory 234 is displayed when the material utilization apparatus 29 can communicate with the camcorder 21. Accordingly, a user that uses the material utilization apparatus 29 can see if the material utilization apparatus 29 can communicate with the camcorder 21 or not.

Here, preferably, a symbol of the substantial directory 234 is displayed such that it can be seen whether the material utilization apparatus 29 can communicate with the camcorder 21 or not, and a display method is not limited to the above-described method. For example, it may be possible to display the symbol of the substantial directory 234 such that a color of the symbol of the substantial directory 234 switches between a case when the material utilization apparatus 29 can communicate with the camcorder 21 and a case when the material utilization apparatus 29 cannot communicate with the camcorder 21.

In the temporary storage directory 235, a file of the operation state data, a file of the camera set value of the camcorder 21, and a file of the clip recorded in the removable media 33 are temporarily provided so as to be subordinate thereto. In addition, the file of the clip recorded in the temporary storage directory 235 is the same as a file of a clip recorded in the storage directory 236.

Thus, in the case when the camcorder 21 and the material utilization apparatus 29 are disconnected from each other and a clip is transmitted from the camcorder 21 to the material utilization apparatus 29, a user may read the temporary storage directory 235 so as to recognize the clip recorded in the camcorder 21 at the time of the disconnection.

In the storage directory 236, clips recorded in the removable media 33 are divided to directories of a group for each of the recording contents, thereby being managed.

In the example shown in FIG. 8, the storage directory 236 is recorded with two groups of clips. That is, the storage directory 236 is provided with a clip group directory 237, which is a first-group directory, and a clip group directory 238, which is a second-group directory. Furthermore, as names of the clip group directories 237 and 238, for example, contents (in the example shown in FIG. 8, group titles A and B) of item 'group title' (refer to FIG. 6) of grouping metadata of first and second corresponding groups are used.

Grouping metadata files of first and second corresponding groups and directories of clips classified into first and second groups are provided so as to be subordinate to the clip group directories 237 and 238. In the example shown in FIG. 8, a grouping metadata file 239 of the second group and clip directories 240 and 241 are provided as to be subordinate to the clip group directory 238.

The grouping metadata file (G0002M01.txt) recorded in the removable media 33, which is shown in FIG. 5, is transmitted to the material utilization apparatus 29 and is then recorded, thereby creating the grouping metadata file 239 In addition, clips of the clip directories (C0001 and C0002) recorded in the removable media 33, which are shown in FIG. 5, are transmitted to the material utilization apparatus 29 and are then recorded, thereby creating the clip group directories 237 and 238.

Hereinafter, if it is not necessary to distinguish the clip group directories 237 and 238 from each other, the clip group directories 237 and 238 will be collectively referred to as the clip group directory 238. In addition, if it is not necessary to distinguish the clip directories 240 and 241 from each other, the clip directories 240 and 241 will be collectively referred to as the clip directory 240.

In addition, even though the clip directory 240 is recorded by being classified into the clip group directory 237 for each record ID in the example shown in FIG. 8, the clip directory 240 may be recorded by being classified into directories for keywords (for example, interview or field shooting) of a cameraman or a recording instruction. In this case, the clip directory 240 is classified on the basis of the contents of the item 'execution' of the item 'photographer' of the grouping metadata (refer to FIG. 6) of a group into which a clip of the clip directory 240 is classified or the contents of the item 'instruction' of the item 'details of photographing'.

Next, details of the substantial directory 234 shown in FIG. 8 will be described with reference to FIG. 9.

Figure 9:
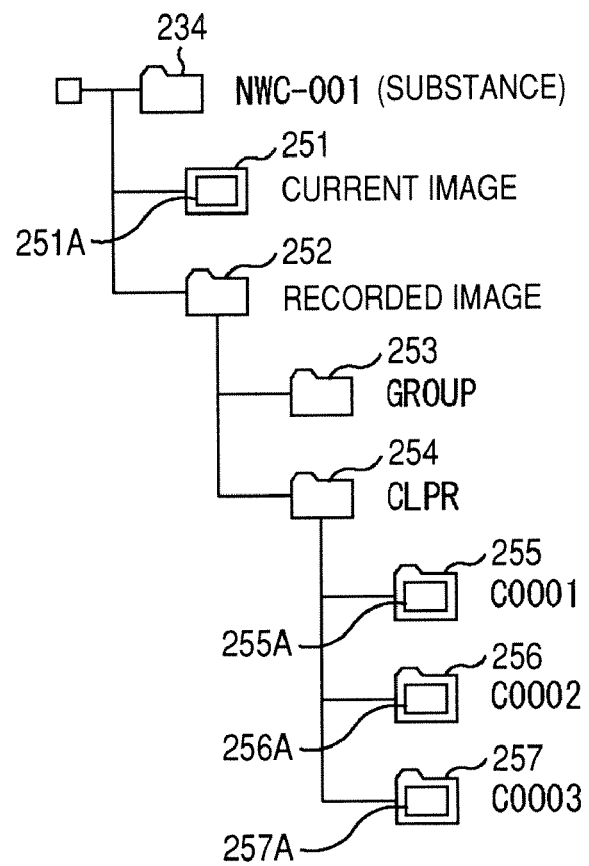
FIG. 9 is a view illustrating the configuration of a substantial directory shown in FIG. 8.

Referring to FIG. 9, a current image file 251 and a record image directory 252 are provided so as to be subordinate to the substantial directory 234.

The current image file 251 is a file (virtual file) corresponding to material data that is currently being acquired (photographed) in the camera block 51. Furthermore, a thumbnail image, which is a still image corresponding to image data for a predetermined time, of image data that is currently being acquired in the camera block 51 is displayed on a display region 251A within a symbol of the current image file 251.

The record image directory 252 is a directory corresponding to a directory of a file recorded in the removable media 33. That is, a group directory 253 corresponding to the GROUP directory 215 provided in the removable media 33 and a clip root directory 254 corresponding to the clip root directory (CLPR) shown in FIG. 5 are provided as subdirectories of the record image directory 252.

Clip directories 255 to 257 corresponding to the clip directories (C0001 to C0003) shown in FIG. 5 are provided as subdirectories of the clip root directory 254. Thumbnail images of predetermined frames of image data of clips of the clip directories 255 to 257 are respectively displayed on the display regions 255A to 257A within symbols of the clip directories 255 to 257.

Figure 10:
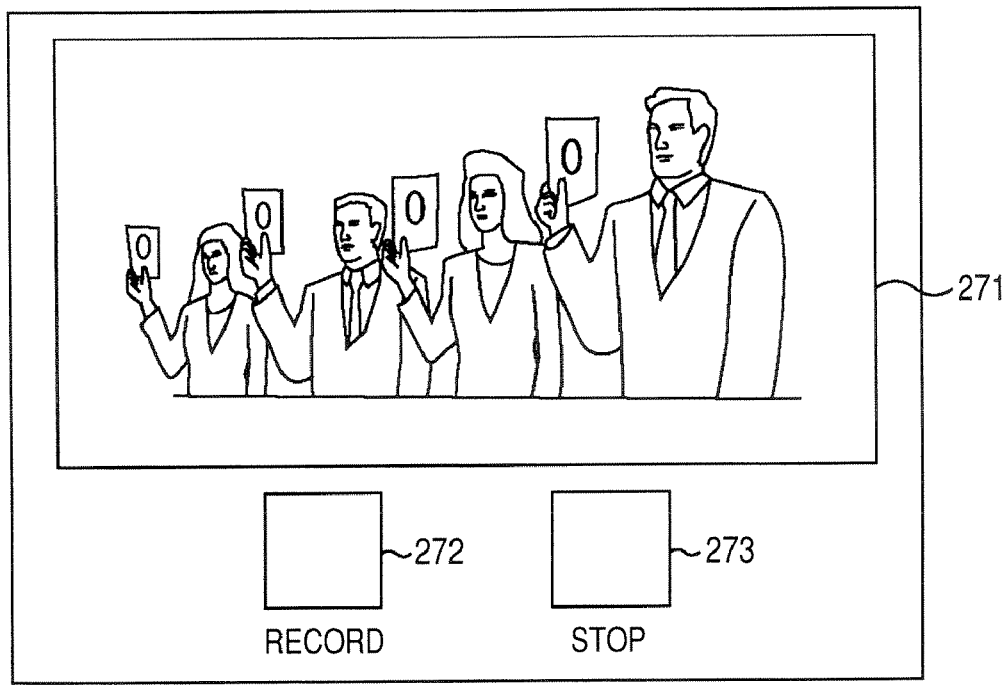
FIG. 10 is a view illustrating an example of a screen displayed when opening a current image file.

Here, when the current image file 251 is double clicked by operating the input unit 206 shown in FIG. 4, a screen shown in FIG. 10 is displayed (presented) on the output unit 207.

That is, as shown in FIG. 10, a display unit 271, a recording button 272, and a stop button 273 are displayed on the output unit 207. In addition, an image corresponding to the image data that is currently being acquired in the camera block 51 is displayed on the display unit 271. The recording button 272 is operated to instruct the recording of material data, which corresponds to the image displayed on the display unit 271, onto the removable media 33. The stop button 273 is operated to instruct the stop of the recording.

Figure 11:
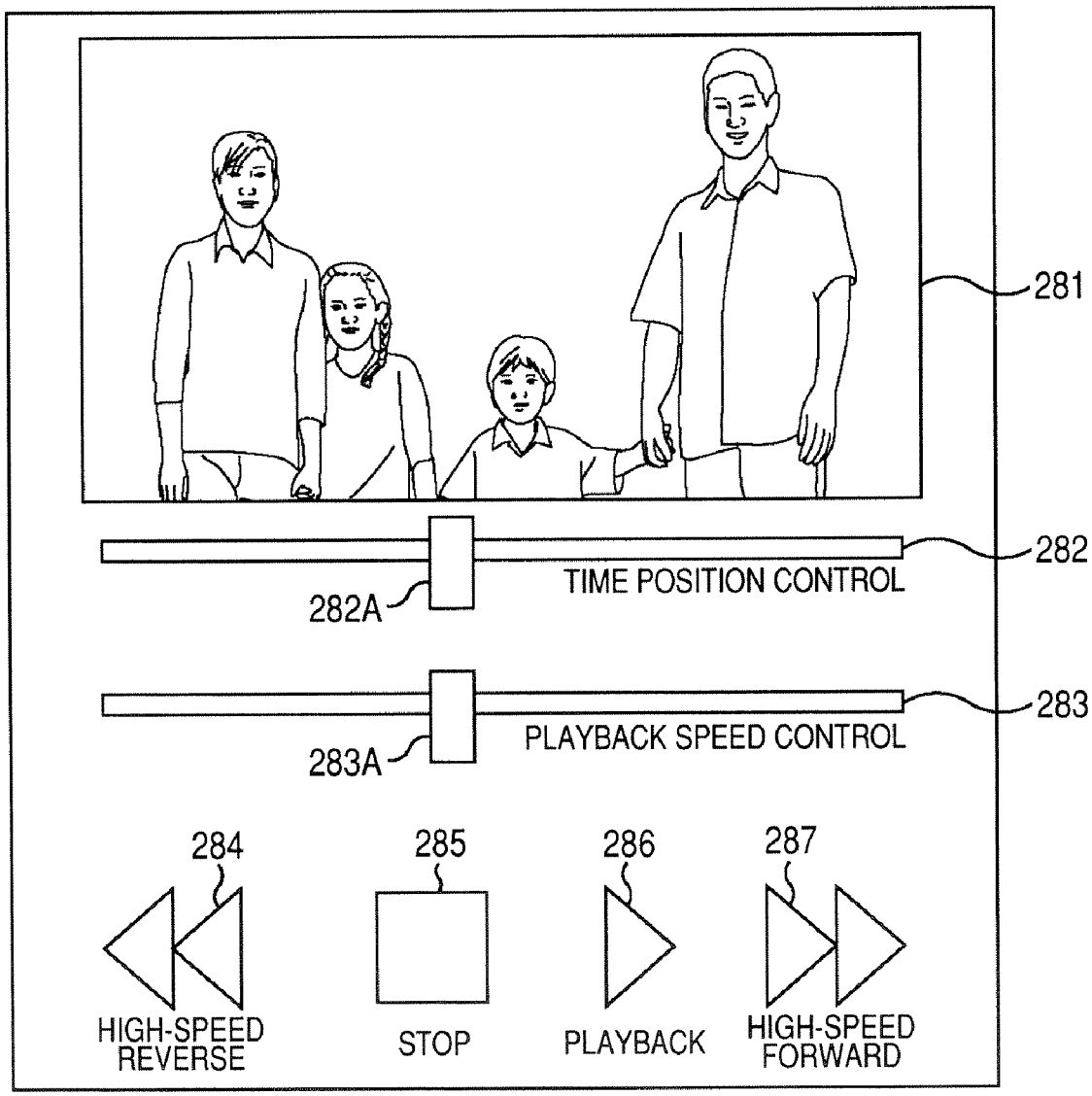
FIG. 11 is a view illustrating an example of a screen displayed when opening a clip directory.

In addition, when a user double clicks the clip directories 255 to 257 shown in FIG. 9 by operating the input unit 206, a screen shown in FIG. 11 is displayed on the output unit 207.

That is, as shown in FIG. 11, a display unit 281, a time position control bar 282, a reproduction speed limiting bar 283, a high-speed reverse button 284, a stop button 285, a reproduction button 286, and a high-speed forward button 287 are displayed on the output unit 207.

On the display unit 281, an image based on the image file (C0001V01.MXF or C0002V02.MXF) corresponding to the clip directories 255 to 257, which is recorded in the removable media 33, is displayed. The time position control bar 282 is operated to instruct time stamp of image data corresponding to the image displayed on the display unit 281. Specifically, a user moves a tab 282A, which is provided in the time position control bar 282, so as to instruct (change) the time stamp of image data corresponding to the image displayed on the display unit 281.

Further, the reproduction speed limiting bar 283 is operated to instruct the reproduction speed at which the image data from the removable media 33 is reproduced. Specifically, the user moves a tab 283A, which is provided in the reproduction speed limiting bar 283, so as to instruct (change) the reproduction speed. For example, the user instructs the reproduction speed to be zero, that is, instructs the stop by moving the tab 283A to the center of the reproduction speed limiting bar 283. Moreover, the user instructs the reproduction speed of forward reproduction by moving the tab 283A in the right direction and the reproduction speed of reverse reproduction by moving the tab 283A in the left direction.

The high-speed reverse button 284 is operated to reversely reproduce the image data from the removable media 33 at high speed and display an image corresponding to the image data, which has been reversely reproduced, on the display unit 281. The stop button 285 is operated to stop reproduction of the image data from the removable media 33. The reproduction button 296 is operated to reproduce the image data from the removable media 33 at normal speed and display an image corresponding to the image data, which has been reproduced, on the display unit 281.

The high-speed forward button 285 is operated to reproduce the image data from the removable media 33 at high speed and display an image corresponding to the image data, which has been reproduced, on the display unit 281.

Figure 12:
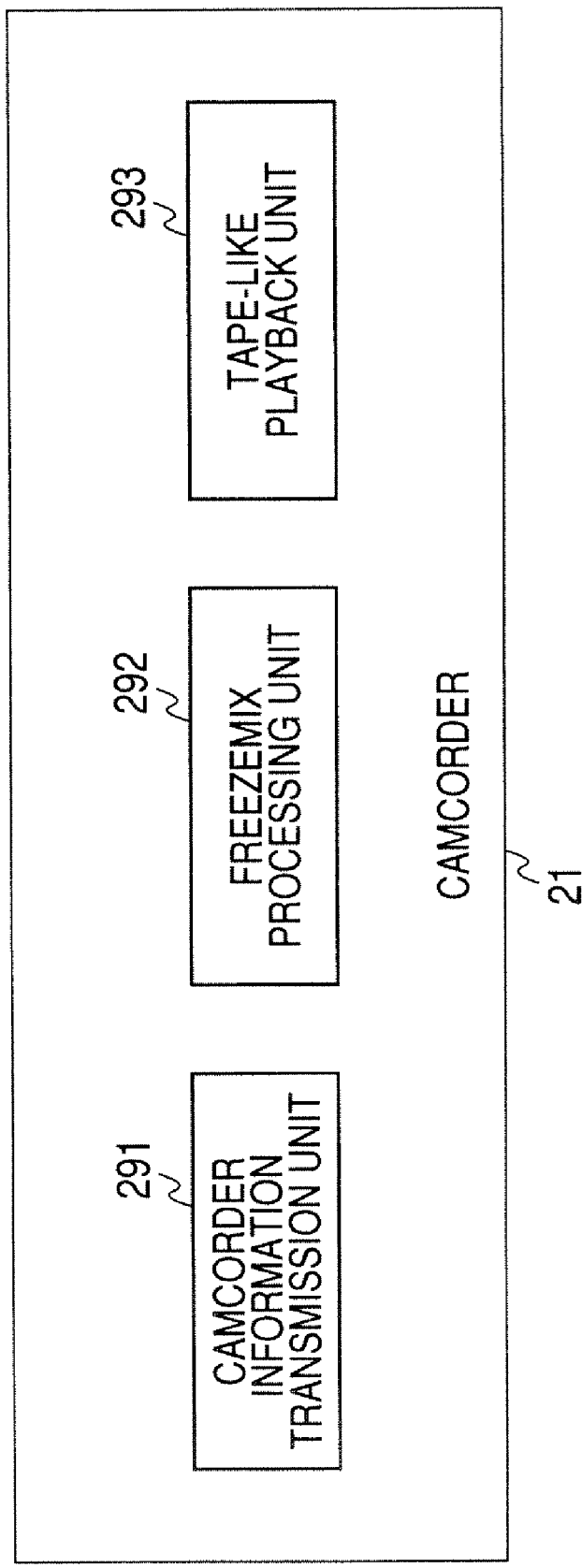
FIG. 12 is a block diagram illustrating an example of the functional configuration of a camcorder.

FIG. 12 is a block diagram illustrating an example of the functional configuration of the camcorder 21 shown in FIG. 3.

The camcorder 21 shown in FIG. 12 is configured to include a camcorder information transmission unit 291, a FreezeMix processing unit 292, and a tape-like reproduction unit 293.

The camcorder information transmission unit 291 transmits a file, which is recorded in the removable media 33, and state information, which is information indicating a real-time state of the camcorder 21.

The FreezeMix processing unit 292 performs a FreezeMix on the basis of a FreezeMix image transmitted from the material utilization apparatus 29.

The tape-like reproduction unit 293 performs tape-like reproduction with respect to a clip recorded in the removable media 33. In addition, the tape-like reproduction refers to reproduction in the order of being recorded in the removable media 33.

Figure 13:
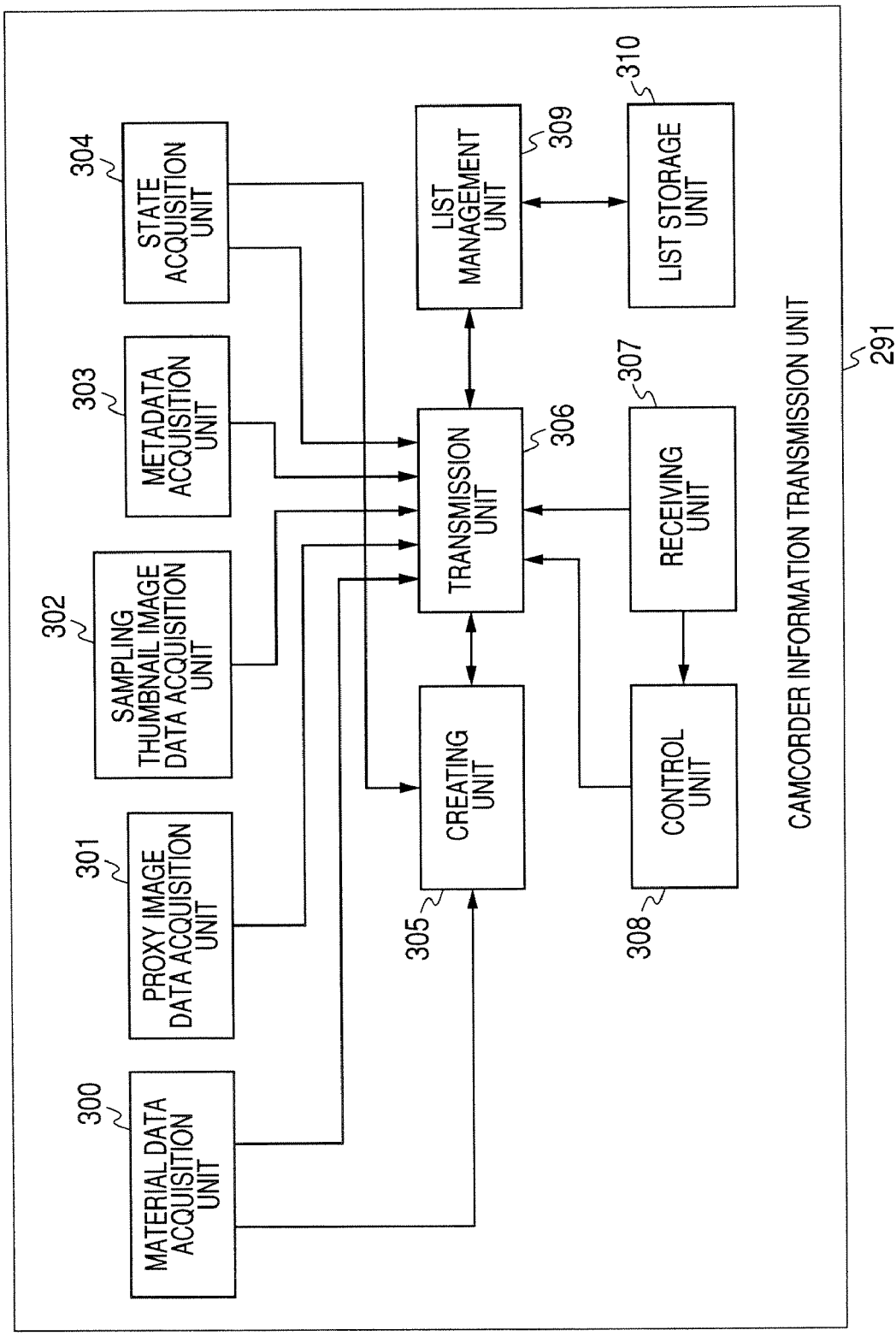
FIG. 13 is a block diagram illustrating an example of the specific configuration of a camcorder information transmission unit.

FIG. 13 is a block diagram illustrating an example of the specific configuration of the camcorder information transmission unit 291 shown in FIG. 12.

The camcorder information transmission unit 291 shown in FIG. 13 is configured to include a material data acquisition unit 300, a proxy image data acquisition unit 301, a sampling thumbnail image data acquisition unit 302, a metadata acquisition unit 303, a state acquisition unit 304, a creating unit 305, a transmission unit 306, a receiving unit 307, a control unit 308, a list management unit 309, and a list storage unit 310.

In addition, the material data acquisition unit 300, the proxy image data acquisition unit 301, the sampling thumbnail image data acquisition unit 302, the metadata acquisition unit 303, the state acquisition unit 304, the creating unit 305, the control unit 308, the list management unit 309, and the list storage unit 310 correspond to, for example, the microcomputer 106 shown in FIG. 3 and the transmission unit 306 and the receiving unit 307 correspond to, for example, the communication block 53.

The material data acquisition unit 300 reproduces files of (C0001V01.MXF to 0001A08.MXF) of material data of clips and acquires the material data of the clip from the removable media 33. In addition, the material data acquisition unit 300 supplies the material data of the clip to the transmission unit 306 and supplies representative image data of the clip to the creating unit 305. Here, the representative image data refers to, for example, front image data, image data of a frame of an essence mark (electronic mark) added to the image data, or image data for a predetermined time.

The proxy image data acquisition unit 301 reproduces a proxy image data file (C0001S01.MXF) and acquires the proxy image data from the removable media 33. In addition, the proxy image data acquisition unit 301 supplies the proxy image data to the transmission unit 306.

The sampling thumbnail image data acquisition unit 302 reproduces a sampling thumbnail image file (C0001T01.JPG) and acquires the sampling thumbnail image data from the removable media 33. In addition, the sampling thumbnail image data acquisition unit 302 supplies the sampling thumbnail image data to the transmission unit 306.

The metadata acquisition unit 303 reproduces grouping metadata files (G0001M01.txt to G0003M01.txt), a non-real-time metadata files (C0001M01.XML), and a real-time metadata file (C0001R01.BIM) and acquires grouping metadata, non-real-time metadata, and real-time metadata from the removable media 33. The metadata acquisition unit 303 supplies the grouping metadata to the transmission unit 306 and supplies the non-real-time metadata and real-time metadata, as clip metadata, to the transmission unit 306. In addition, the metadata acquisition unit 303 reproduces and acquires directory information, which represents the directory structure (refer to FIG. 5) of files recorded in the removable media 33, from the removable media 33, and then supplies the directory information to the transmission unit 306.

The state acquisition unit 304 reads out and acquires a camera set value from the RAM of the microcomputer 83 of the camera block 51. In addition, the state acquisition unit 304 creates operation state data on the basis of the camera operation signal from the operation unit 81 and the communication operation signal from the operation unit 131. In addition, the state acquisition unit 304 acquires material data of a clip that is currently being acquired or reproduced. In addition, the state acquisition unit 304 supplies to the transmission unit 306 the camera set value, the operation state data, and the material data of the clip that is currently being acquired or reproduced. In addition, the state acquisition unit 304 supplies to the creating unit 305 representative image data of the material data of the clip that is currently being acquired or reproduced.

The creating unit 305 creates thumbnail image data of the image data on the basis of a result of determination on whether or not the transmission time necessary for transmission of the proxy image data supplied from the transmission unit 306 is equal to or larger than a predetermined time, a request from the transmission unit 306, and image data from the material data acquisition unit 300 and then supplies the created thumbnail image data to the transmission unit 306. In addition, the creating unit 305 creates thumbnail image data of image data of the clip, which is currently being acquired or reproduced and has been supplied from the state acquisition unit 304, in response to the request from the transmission unit 306 and then supplies the created thumbnail image data to the transmission unit 306.

The transmission unit 306 calculates the transmission time, which is required for transmission of the proxy image data to the material utilization apparatus 29, on the basis of the proxy image data from the proxy image data acquisition unit 301 and determines whether or not the transmission time is equal to or larger than the predetermined time. Moreover, the transmission unit 306 supplies a result of the determination to the creating unit 305.

Furthermore, the transmission unit 306 extracts the type of an apparatus and an apparatus ID, as apparatus information, from the non-real-time metadata of the clip metadata supplied from the metadata acquisition unit 303 and extracts a record ID from the grouping metadata.

Furthermore, the transmission unit 306 transmits to the material utilization apparatus 29 apparatus information, directory information, metadata, proxy image data, and material data of clips to be transmitted in this order on the basis of a transmission list, which is a list of clips that are supplied from the list management unit 309 and are to be transmitted, according to FTP. In addition, the transmission unit 306 transmits the thumbnail image data supplied from the creating unit 305, instead of the proxy image data, according to the result of the determination on the transmission time. In addition, the transmission unit 306 updates contents, which correspond to a clip that has been completely transmitted, of the item 'transmission history' of grouping metadata of the clip to 'transmitted'. Further, the transmission unit 306 notifies the list management unit 309 that clips to be transmitted has been completely transmitted.

Furthermore, in response to an acquisition request supplied from the receiving unit 307, the transmission unit 306 transmits to the material utilization apparatus 29 the camera set value, the operation state data, the material data of a clip that is currently being acquired or reproduced, or data of a clip recorded in the removable media 33, as state information.

In addition, in response to the acquisition request from the receiving unit 307, the transmission unit 306 requests the creating unit 305 to create the thumbnail image data of the clip recorded in the removable media 33 and the thumbnail image data of the clip that is currently being acquired or reproduced. In addition, the transmission unit 306 transmits to the material utilization apparatus 29 the thumbnail image data and directory information supplied from the creating unit 305 according to the request.

In addition, the transmission unit 306 may separately transmit data (including apparatus information, record ID, and directory information) of clips to be transmitted, state information, and thumbnail image data, such that the transmission speed can be increased.

The receiving unit 307 supplies to the control unit 308 a control signal, which is transmitted from the material utilization apparatus 29 so as to control the camcorder 21. Furthermore, the receiving unit 307 receives state information acquisition request transmitted from the material utilization apparatus 29 and then supplies the request to the transmission unit 306. In addition, the receiving unit 307 receives the directory information and thumbnail image data acquisition request and then supplies the directory information and the request to the transmission unit 306.

The control unit 308 controls shooting, recording, deleting, or reproduction on the basis of the control signal from the receiving unit 307. For example, the control unit 308 controls the shooting by changing a camera set value held in the RAM of the microcomputer 83 on the basis of the control signal. Moreover, the control unit 308 deletes clips recorded in the removable media 33 according to the control signal. If necessary, the control unit 308 transmits to the material utilization apparatus 29 through the transmission unit 306 that a process (for example, a process of controlling the shooting, recording, deleting, or reproduction) corresponding to the control signal has been completed.

The list management unit 309 extracts clips, which have not been transmitted, on the basis of contents of the item 'transmission history' (refer to FIG. 6) of the item 'shoot material' of grouping metadata of clips, creates a transmission list with the clips as objects to be transmitted, and then supplies the transmission list to the list storage unit 310.

In addition, the list management unit 309 reads out the transmission list from the list storage unit 310 and supplies the read list to the transmission unit 306. In addition, the list management unit 309 deletes the transmission list stored in the list storage unit 310 according to the notification that clips to be transmitted have been completely transmitted from the transmission unit 306. The list storage unit 310 stores the transmission list from the list management unit 309.

Figure 14:
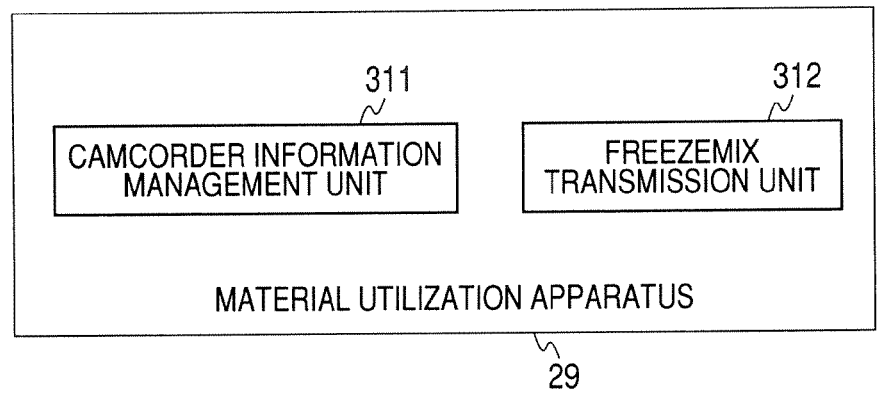
FIG. 14 is a block diagram illustrating an example of the functional configuration of a material utilization apparatus.

FIG. 14 is a block diagram illustrating an example of the functional configuration of the material utilization apparatus 29 shown in FIG. 4.

The material utilization apparatus 29 shown in FIG. 14 is configured to include a camcorder information management unit 311 and a FreezeMix transmission unit 312.

The camcorder information management unit 311 manages files and state information that are recorded in the removable media 33 and have been transmitted from the camcorder information transmission unit 291 (transmission unit 306 of the camcorder information transmission unit 291) shown in FIG. 12.

The FreezeMix transmission unit 312 transmits to the FreezeMix processing unit 292 of the camcorder 21 an image, which is designated by a user, of images (data) recorded in the recording unit 208 shown in FIG. 4, as a FreezeMix image.

Figure 15:
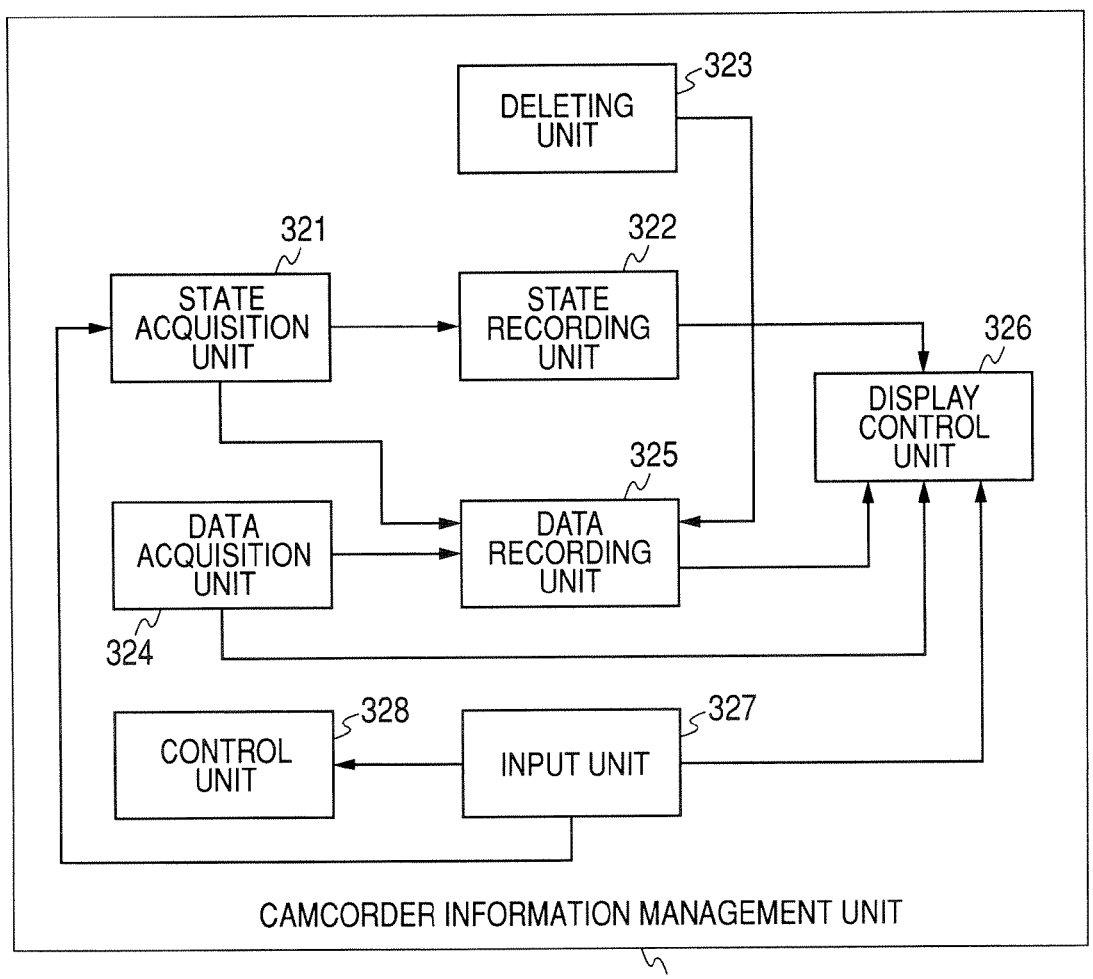
FIG. 15 is a block diagram illustrating an example of the specific configuration of a camcorder information management unit.

FIG. 15 is a block diagram illustrating an example of the specific configuration of the camcorder information management unit 311 shown in FIG. 14.

The camcorder information management unit 311 shown in FIG. 15 includes a state acquisition unit 321, a state recording unit 322, a deleting unit 323, a data acquisition unit 324, a data recording unit 325, a display control unit 326, an input unit 327, and a control unit 328. Further, the state acquisition unit 321, the deleting unit 323, the data acquisition unit 324, the display control unit 326, and the control unit 328 correspond to, for example, the CPU 201 shown in FIG. 4, and the state recording unit 322 corresponds to, for example, the RAM 203. In addition, the data recording unit 325 corresponds to, for example, the recording unit 208, and the input unit 327 corresponds to, for example, the input unit 206.

The state acquisition unit 321 transmits the state information acquisition request to the receiving unit 307 of the camcorder 21 according to an instruction from the input unit 327. In addition, the state acquisition unit 321 transmits to the receiving unit 307 of the camcorder 21 an acquisition request of directory information and thumbnail image data.

In addition, the state acquisition unit 321 acquires (receives) thumbnail image data of a clip that is currently being acquired or reproduced, thumbnail image data of a clip recorded in the removable media 33, the state information, and the directory information which have been transmitted from the transmission unit 306 shown in FIG. 13 and then supplies the acquired information and data to the state recording unit 322. In addition, the state acquisition unit 321 supplies a camera set value and operation state data of the state information to the data recording unit 325.

The state recording unit 322 records the thumbnail image data of the clip that is currently being acquired or reproduced, the thumbnail image data of the clip recorded in the removable media 33, the state information, and the directory information which have been transmitted from the state acquisition unit 321.

The deleting unit 323 deletes data of clips, which have been deleted from the removable media 33 and are recorded in the temporary storage directory 235 of the data recording unit 325, according to a delete completion notification transmitted from the transmission unit 306. The data acquisition unit 324 acquires the data of the clips supplied from the transmission unit 306 and supplies the acquired data to the data recording unit 325.

The data recording unit 325 records the data of the clips from the data acquisition unit 324 in the temporary storage directory 235 and the storage directory 236 shown in FIG. 8. In addition, the data recording unit 325 records the camera set value and the operation state data from the state acquisition unit 321 in the temporary storage directory 235.

Furthermore, in the case when an amount of data that can be recorded in the storage directory 236 is predetermined, the data acquisition unit 324 may read a part of the clip directory 240 recorded in the storage directory 236 and transmit the part to the material server 28 shown in FIG. 1 so as to be recorded in the material server 28, a predetermined number of days having passed since the part was acquired (shot) by the camcorder 21. For example, if the predetermined number of days corresponds to the day, only the clip directory 240 of a clip that is acquired on the day (current date) is recorded in the storage directory 236. As a result, only the clip directory 240 of the clip that is acquired on the day can be arranged to be displayed on the screen shown in FIG. 8.

In addition, the data acquisition unit 324 controls the display control unit 326 according to the acquisition state (receiving state) of data of each clip and notifies a user of the receiving state of the clip.

In response to an instruction from the input unit 327, the display control unit 326 reads out the state information recorded in the state recording unit 322 or the material data of the clip that is currently acquired or reproduced and causes an image to be displayed on the output unit 207 (refer to FIG. 4) on the basis of the read state information or the material data. In addition, in response to the instruction from the input unit 327, the display control unit 326 reads out the data of each clip recorded in the data recording unit 325 and causes an image to be displayed on the output unit 207 on the basis of the read data.

The input unit 327 receives an operation of a user and then supplies an instruction corresponding to the operation to the state acquisition unit 321, the display control unit 326, or the control unit 328. According to the instruction from the input unit 327, the control unit 328 creates a control signal used to control the camcorder 21 and transmits the created control signal to the camcorder 21 (receiving unit 307 of the camcorder 21).

Next, communication of material data of a clip, which is currently being acquired, of the state information will be described with reference to FIGS. 16A and 16B.

FIG. 16A is a view explaining the transmission of material data of a 'clip currently being acquired' in the transmission unit 306 of the camcorder 21. In FIG. 16A, it is assumed that frame #1 to frame #4 of the material data are sequentially acquired. Here, frame #i indicates a frame that is acquired in the i-th order.

As shown in FIG. 16A, the transmission unit 306 provides an error correction code for each frame of image data of clips currently being acquired and transmits material data in a unit of frame. Alternatively, in the case when the image data is encoded in the MPEG format, the error correction code may be provided for each GOP.

As shown in FIG. 16A, when the frame #1 of the material data is acquired, the transmission unit 306 starts transmitting the frame #1 according to UDP. Until the transmission of the frame #1 is completed, the frame #2 and frame #3 of the material data are acquired. Then, when acquisition of the frame #4 starts, the transmission unit 306 starts transmitting a frame (in the example shown in FIG. 16A, frame #3), which has been acquired immediately before the transmission of the frame #1 is completed, according to UDP, after the transmission of the frame #1 is completed. That is, the transmission unit 306 does not transmit the frame #2.

As described above, the transmission unit 306 does not transmit all of the material data, as material data of the clip currently being acquired, in the order of acquisition, but transmits only frames acquired immediately before transmission of a new frame starts (transmission of a previous frame is completed). As a result, even when the communication speed in the network 31 is slow and a plurality of frames are acquired until transmission of a frame of material data is completed, it is possible to transmit a frame that has been recently acquired. That is, acquired material data can be transmitted in a real-time manner.

Further, since the transmission unit 306 transmits the frame according to UDP, it is possible to alleviate a load in a transmission process and to transmit the frame quickly.

FIG. 16B is a view explaining the reception (acquisition) of material data of a clip, which is currently being acquired, in the state acquisition unit 321 of the material utilization apparatus 29. In FIG. 16B, it is assumed that frame #11 to frame #14 of the material data are sequentially acquired. Here, frame #j indicates a frame that is acquired from the camcorder 21 in the j-th order.

As shown in FIG. 16B, the state acquisition unit 321 supplies the material data, which has been received from the camcorder 21, to the display control unit 326 through the state recording unit 322. On the basis of image data of the material data supplied from the state acquisition unit 321, the display control unit 326 causes an image corresponding to the image data to be displayed on the display unit 271 shown in FIG. 10 for a predetermined period of time (for example, period of time corresponding to a frame or 1 GOP).

Specifically, as shown in FIG. 16B, when a frame #11 of material data is received as material data of a clip currently being acquired from the state acquisition unit 321, the display control unit 326 starts the display of an image corresponding to the frame #11. Until the display of the frame #11 is completed, the frame #12 and frame #13 of the material data are received in the state acquisition unit 321. Then, when reception of the frame #14 starts, the display control unit 326 starts display of an image corresponding to a frame (in the example shown in FIG. 16B, frame #13), which has been received immediately before the display of an image corresponding to the frame #11 is completed, after the display of the image corresponding to the frame #11 is completed. That is, the display control unit 326 does not display the image corresponding to the frame #12.

As described above, the display control unit 326 does not display images corresponding to all frames received as material data of the clip currently being acquired, in the order of reception of the frames, but displays only images received immediately before display of an image corresponding to a new frame starts (display of an image corresponding to a previous frame is completed). As a result, even when the communication speed in the network 31 is fast and a plurality of frames are received until display of a frame of material data is completed, it is possible to display an image corresponding to a frame that has been recently received. That is, the image corresponding to the received material data can be displayed in a real-time manner.

Moreover, in FIGS. 16A and 16B, it has been described about the communication of material data being currently acquired; however, the same is true for communication of material data being currently reproduced.

Next, referring to FIG. 17, it will be described about a display process in which the material utilization apparatus 29 displays the current image file 251 shown in FIG. 9. For example, the display process starts when a user designates (clicks) the substantial directory 234 shown in FIG. 8.

In step S21, the state acquisition unit 321 of the material utilization apparatus 29 requests the camcorder 21 to acquire directory information and thumbnail image data of a clip recorded in the removable media 33 and thumbnail image data of a clip that is currently being acquired or reproduced, proceeding to step S22.

In step S41, the receiving unit 307 of the camcorder 21 receives the acquisition request from the state acquisition unit 321 and supplies the acquisition request to the creating unit 305 through the transmission unit 306. The creating unit 305 creates thumbnail image data of the clip recorded in the removable media 33 and thumbnail image data of the clip that is currently being acquired or reproduced on the basis of the acquisition request, the image data from the material data acquisition unit 300, and the image data from the state acquisition unit 304, and then supplies the created thumbnail image data to the transmission unit 306.

After the step S41, the process proceeds to step S42 in which the transmission unit 306 transmits the thumbnail image data of the clip recorded in the removable media 33 and the thumbnail image data of the clip that is currently being acquired or reproduced, which have been supplied from the creating unit 305, to the material utilization apparatus 29, proceeding to step S43.

In step S22, the state acquisition unit 321 of the material utilization apparatus 29 receives the directory information, the thumbnail image data of the clip recorded in the removable media 33, and the thumbnail image data of the clip that is currently being acquired or reproduced and supplies the received directory information and thumbnail image data to the state recording unit 322 so as to be stored in the state recording unit 322. After the step S22, the process proceeds to step S23 in which the display control unit 326 reads out the directory information, the thumbnail image data of the clip recorded in the removable media 33, and the thumbnail image data of the clip that is currently being acquired or reproduced, which are stored in the step S22, and displays the screen shown in FIG. 9 on the output unit 207 on the basis of the read directory information and the thumbnail image data.

At this time, the user operates the input unit 327 (206) to double click a desired symbol of symbols of the clip directories 255 to 257 and a symbol of the current image file 251. Here, it is assumed that the user double clicks the current image file 251.

After the step S23, the process proceeds to step S24 in which the state acquisition unit 321 requests the camcorder 21 to acquire material data of the clip, which is currently being acquired, according to an instruction corresponding to a user's operation on the input unit 327, proceeding to step S25.

In step S43, the receiving unit 307 receives the acquisition request of the material data of the clip, which is currently being acquired, from the state acquisition unit 321 and then supplies the received acquisition request to the transmission unit 306, proceeding to step S44. In the step S44, the transmission unit 306 transmits to the material utilization apparatus 29 the material data of the clip currently being acquired of state information, which has been supplied from the state acquisition unit 304, proceeding to step S45.

In step S25, the state acquisition unit 321 receives the material data of the clip currently being acquired, which has been transmitted from the transmission unit 306 and then supplies the received material data to the state recording unit 322, proceeding to step S26. In the step S26, the display control unit 326 displays the screen shown in FIG. 10 on the basis of the material data stored in the step S25. Accordingly, on the display unit 271 shown in FIG. 10, an image corresponding to the material data stored in the step S25 is displayed.

Here, the user operates the input unit 327 to select a desired button of the recording button 272 and the stop button 273. Here, it is assumed that the user selects the recording button 272.

After the step S26, the process proceeds to step S27 in which the control unit 328 transmits to the camcorder 21 a control signal, which is used to record data of the clip currently being acquired in the camcorder 21, in response to the instruction from the input unit 327, and then the process is completed.

In step S45, the receiving unit 307 supplies the control signal, which is transmitted from the control unit 328, to the control unit 308, proceeding to step S46. In the step S46, the control unit 308 causes each data of the clip currently being acquired to be recorded in the removable media 33 according to the control signal, and then the process is completed.

Moreover, in FIG. 17, it has been assumed that the current image file 251 is double clicked. However, in the case when the clip directories 255 to 257 are double clicked, the state acquisition unit 321 requests the acquisition of material data of the clip directory (C0001 to C0003) corresponding to the clip directories 255 to 257 recorded in the removable media 33, and the display control unit 326 causes the screen shown in FIG. 11 to be displayed on the basis of image data of the material data transmitted in response to the request. On this screen, when the user operates the tab 282A or 283B, the high-speed reverse button 284, the stop button 285, the reproduction button 286, or the high-speed forward button 287 by operating the input unit 327, the control unit 328 transmits to the camcorder 21 a control signal corresponding to the instruction from the input unit 327. According to the control signal, the control unit 308 controls the reproduction of the clip directory.

In addition, in FIG. 17, it has been assumed that the recording button 272 is selected; however, the same processes are performed in the case when the stop button 273 is selected. That is, the control unit 308 transmits the control signal, which is used to stop recording of data of each clip currently being acquired, to the camcorder 21, and the control unit 328 of the camcorder 21 stops recording of the data of each clip, which is currently being acquired, onto the removable media 33 in response to the control signal.

Next, referring to FIG. 18, it will be described about a file transmission process in which the camcorder 21 transmits a file recorded in the removable media 33.

In step S61, the transmission unit 306 of the camcorder 21 extracts apparatus information from non-real-time metadata of a clip to be transmitted, which has been supplied from the metadata acquisition unit 303, and extracts an record ID from the clip metadata, and then transmits the apparatus information and the record ID to the material utilization apparatus 29 together with a file reception request.

In step S62, the data acquisition unit 324 of the material utilization apparatus 29 receives the apparatus information, the record ID, and a file transmission request transmitted from the transmission unit 306, proceeding to step S82. In the step S82, the data acquisition unit 324 determines a recording destination of a clip to be transmitted on the basis of the received apparatus information and the record ID. For example, the data acquisition unit 324 determines, as the recording destination of the clip to be transmitted, the clip group directory 238, which corresponds to the record ID, of the camcorder directory 233 (refer to FIG. 8) corresponding to the apparatus ID of the apparatus information.

After the step S82, the process proceeds to step S83 in which the data acquisition unit 324 of the material utilization apparatus 29 requests the camcorder 21 of the transmission of a file, proceeding to step S84.

After the step S61, the process proceeds to step S62 in which the receiving unit 307 of the camcorder 21 receives the file transmission request transmitted from the data acquisition unit 324, proceeding to step S63. In the step S63, the transmission unit 306 transmits material data, proxy image data or thumbnail image data, grouping metadata, and clip metadata (including sampling thumbnail image data) in the order of the grouping metadata, the clip metadata, the proxy image data or the thumbnail image data, and the material data.

In step S84, the data acquisition unit 324 of the material utilization apparatus 29 acquires the grouping metadata, the clip metadata (including sampling thumbnail image data), the proxy image data or the thumbnail image data, and the material data and then causes those data to be recorded, as the clip directory 240, in the recording destination determined in the step S82.

After the step S84, the process proceeds to step S85 in which the data acquisition unit 324 determines whether or not the reception has been completed, that is, all clips to be transmitted, which are transmitted from the transmission unit 306 has been received. If it is determined that the reception has not been completed, the process returns to step S84 in which the reception is repeated. In the step S85, if it is determined that the reception is completed, the process is completed.

Figure 18:
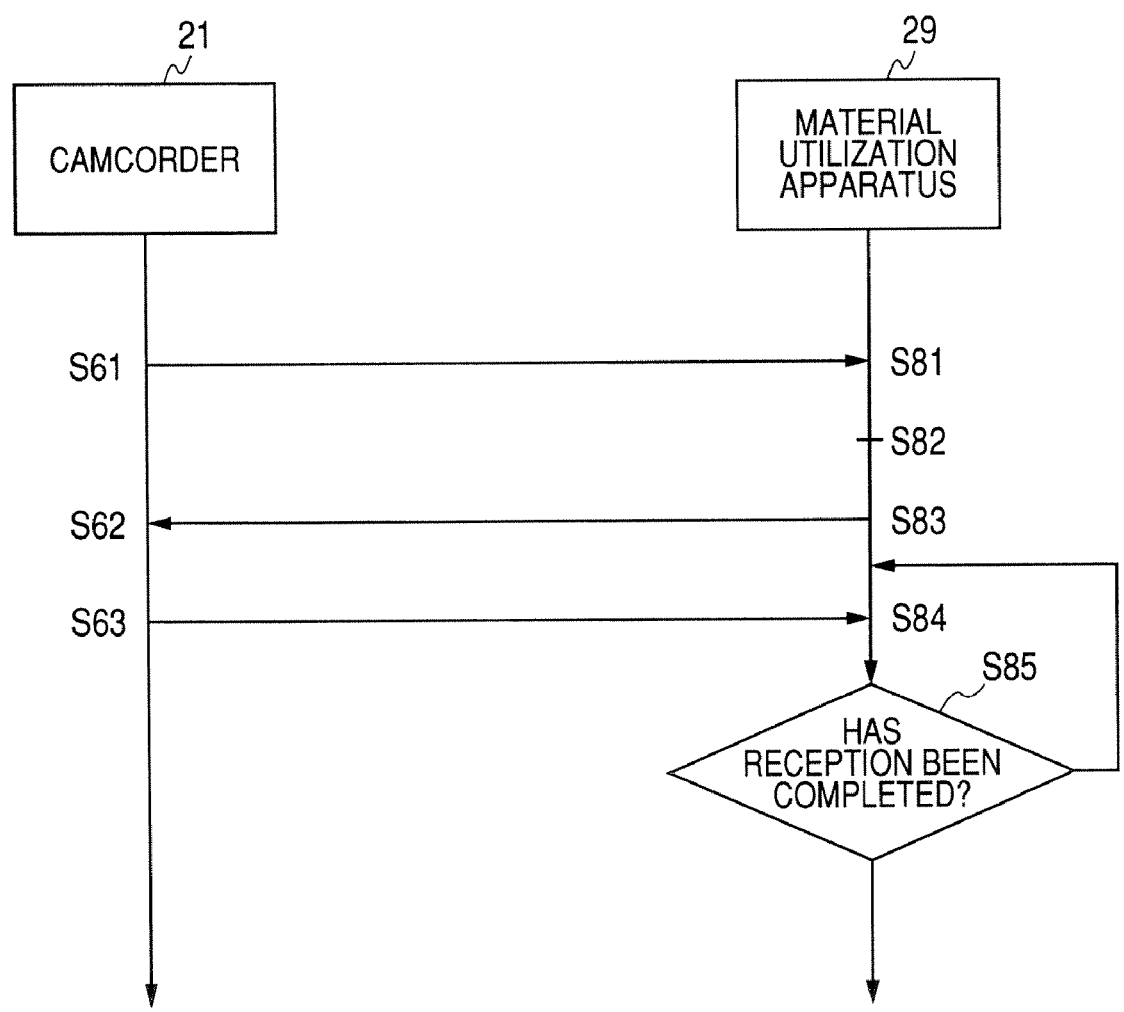
FIG. 18 is a flow chart explaining a file transmission process.

In FIG. 18, it has been described about the case in which a file, which has been transmitted from the camcorder 21 and is recorded in the removable media 33, is recorded in the storage directory 236. Even in a case in which the file is recorded in the temporary storage directory 235, the same processes as described above are performed.

Next, a file transmission process, which is a process at the side of the camcorder 21 shown in FIG. 18, will be described in detail with reference to FIG. 19.

In step S100, the transmission unit 306 transmits apparatus information and record ID to the material utilization apparatus 29 together with a file reception request, proceeding to step S101. In the step S101, the transmission unit 306 transmits directory information to the material utilization apparatus 29, proceeding to step S102.

In the step S102, the receiving unit 307 determines whether or not a transmission has been requested from the data acquisition unit 324 of the material utilization apparatus 29 according to the file reception request. If it is determined that the transmission has not been requested, the receiving unit 307 waits until it is determined that the transmission has been requested.

On the other hand, in the step S102, if it is determined that the transmission has been requested, the process proceeds to step S103 in which the transmission unit 306 transmits to the material utilization apparatus 29 all grouping metadata of clips to be transmitted, which has been supplied from the metadata acquisition unit 303, proceeding to step S104.

In the step S104, the transmission unit 306 sets a count value M of a counter (not shown) to '1', proceeding to step S105. In the step S105, the transmission unit 306 performs a clip transmission process of transmitting data of all clips registered in an M-th transmission list, which is supplied from the list management unit 309. In addition, the clip transmission process will be described in detail later by using a flow chart shown in FIG. 20.

After the step S105, the process proceeds to step S106 in which the transmission unit 306 determines whether or not clips of all transmission lists stored in the list storage unit 310 have been transmitted. If it is determined that clips of all transmission lists have not been transmitted, the process proceeds to step S107.

In the step S107, the count value M is incremented by '1', returning to step S105 so as to repeat the processes described above. On the other hand, in the step S106, if it is determined that the clips of all transmission lists have been transmitted, the process is completed.

Next, the clip transmission process in the step S105 shown in FIG. 19 will be described with reference to FIG. 20.

In step S121, the transmission unit 306 sets a count value N of a counter (not shown) to '1', proceeding to step S122. In the step S122, the transmission unit 306 transmits to the material utilization apparatus 29 clip metadata of an N-th (from the beginning) clip, of an M-th (from the beginning) transmission list stored in the list storage unit 310, among clip metadata supplied from the metadata acquisition unit 303.

In addition, in the case when sampling thumbnail image data supplied from the sampling thumbnail image data acquisition unit 302 includes sampling thumbnail image data of the N-th (from the beginning) clip of the M-th (from the beginning) transmission list, the transmission unit 306 also transmits the sampling thumbnail image data to the material utilization apparatus 29. At this time, the transmission unit 306 may transmit the sampling thumbnail image data before transmitting the clip metadata or the clip metadata before transmitting the sampling thumbnail image data.

After the step S122, the process proceeds to step S123 in which the transmission unit 306 determines whether or not clip metadata (including sampling thumbnail image data) of all clips of the M-th transmission list has been transmitted, that is, the N-th clip is a last clip of the M-th transmission list. If it is determined that clip metadata of all clips of the M-th transmission list has not been transmitted, the process proceeds to step S124.

In the step S124, the transmission unit 306 increments the count value N by '1', returning to step S122 so as to repeat the processes described above. On the other hand, in the step S123, if it is determined that clip metadata of all clips of the M-th transmission list has been transmitted, the process proceeds to step S125.

In the step S125, the transmission unit 306 sets the count value N to 1' again, proceeding to step S126. In the step S126, the transmission unit 306 calculates the transmission time required for transmission of proxy image data of the N-th (from the beginning) clip of the M-th transmission list on the basis of the size of the proxy image data file (C0001S01.MXF) of the proxy image data and the communication speed in the network 31 and the intranet 32.

After the step S126, the process proceeds to step S127 in which the transmission unit 306 determines whether or not the transmission time calculated in the step S126 is within a predetermined set time and then supplies a result of the determination to the creating unit 305.

In step S127, if it is determined that the transmission time is within the predetermined set time, the process proceeds to step S128 in which the transmission unit 306 transmits to the material utilization apparatus 29 proxy image data of an N-th (from the beginning) clip, of the M-th transmission list, among proxy image data supplied from the proxy image data acquisition unit 301, proceeding to step S131.

On the other hand, in the step S127, if it is determined that the transmission time is not within the predetermined set time, the process proceeds to step S129. In the step S129, on the basis of representative image data of an N-th (from the beginning) clip, of the M-th transmission list, among representative image data of material data supplied from the material data acquisition unit 300, the creating unit 305 creates thumbnail image data of the image data and supplies the created thumbnail image data to the transmission unit 306.

After the step S129, the process proceeds to step S130 in which the transmission unit 306 transmits the thumbnail image data, which has been supplied from the creating unit 305, to the material utilization apparatus 29, proceeding to step S131.

In the step S131, the transmission unit 306 determines whether or not image data or thumbnail image data of all clips of the M-th transmission list has been transmitted. If it is determined that image data or thumbnail image data of all clips of the M-th transmission list has not been transmitted, the process proceeds to step S132.

In the step S132, the transmission unit 306 increments the count value N by '1', returning to step S126 so as to repeat the processes described above. On the other hand, in the step S131, if it is determined that image data or thumbnail image data of all clips has been transmitted, the process proceeds to step S133 in which the transmission unit 306 sets the count value N to '1' again.

After the step S133, the process proceeds to step S134 in which the transmission unit 306 transmits material data of an N-th clip of an M-th transmission list, among material data supplied from the material data acquisition unit 300, proceeding to step S135. In the step S135, the transmission unit 306 determines whether or not material data of all clips of the M-th transmission list has been transmitted. If it is determined that the material data of all clips has not been transmitted, the process proceeds to step S136.

In the step S136, the transmission unit 306 increments the count value N by '1', returning to step S134 so as to repeat the processes described above. On the other hand, in the step S135, if it is determined that the material data of all clips has been transmitted, the process proceeds to step S106 shown in FIG. 19.

As described above, the transmission unit 306 transmits to the material utilization apparatus 29 data (for example, metadata or proxy image data), which is related to image data and has an amount of data smaller than the image data, before transmitting the image data. As a result, even if the amount of image data is large, the material utilization apparatus 29 can quickly recognize contents of material data through the related data that is transmitted before the image data is transmitted.

Figure 20:
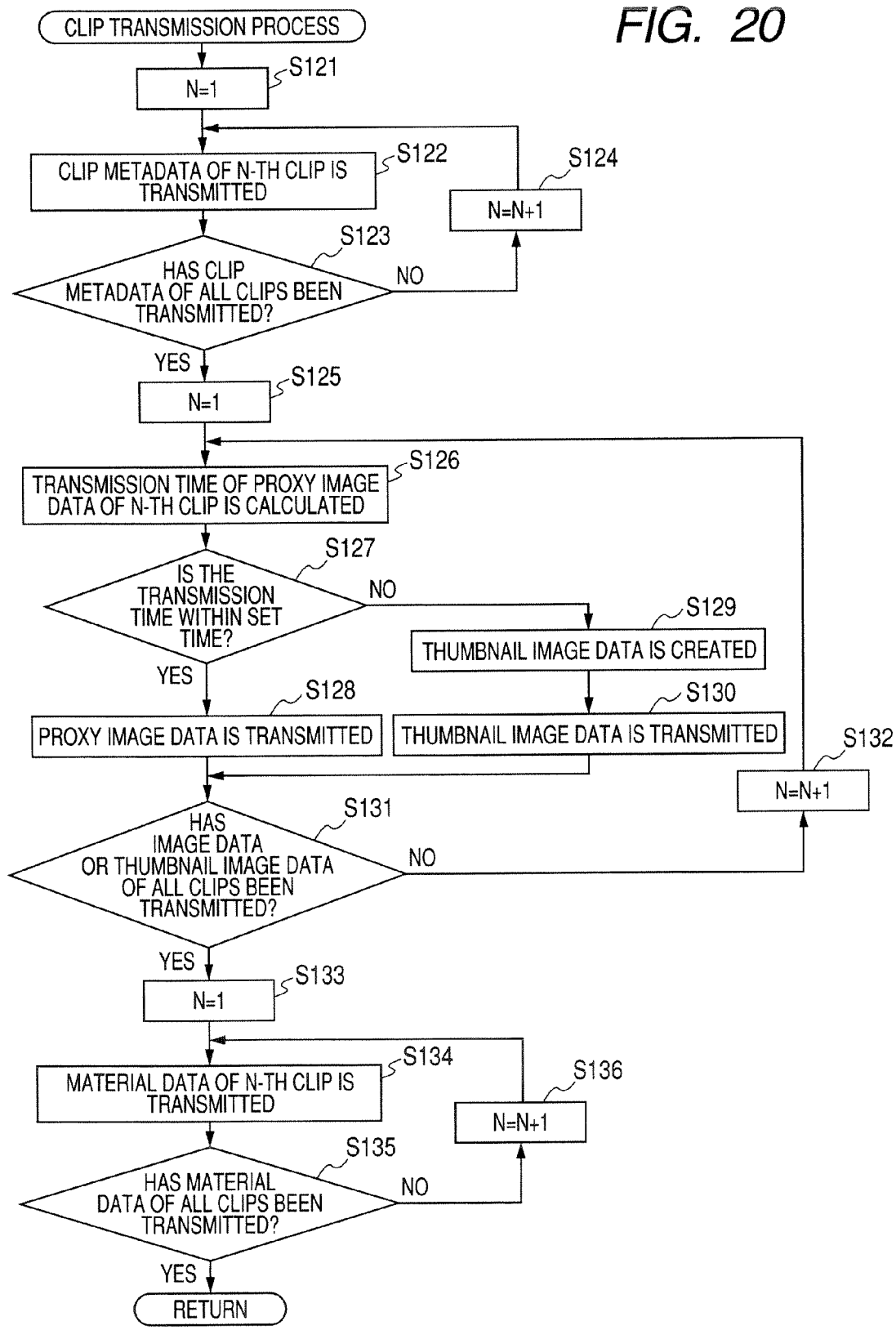
FIG. 20 is a flow chart explaining a clip transmission process.

In addition, even though the set time used for the determination in the step S127 is set beforehand in FIG. 20; however, the set time may not be set beforehand. In this case, the transmission unit 306 does not performs the determination in the step S127, proceeding to step S128 so as to transmit the proxy image data.

Next, a file receiving process, which is a process at the side of the material utilization apparatus 29 shown in FIG. 18, will be described in detail with reference to FIG. 21.

In step S141, the data acquisition unit 324 controls the display control unit 326 such that the screen (refer to FIG. 8) indicating the directory structure is displayed on the output unit 207 shown in FIG. 4. At this time, symbols of all clip group directories 238 on the screen change to a gray color.

After the step S141, the process proceeds to step S142 in which the data acquisition unit 324 determines whether or not the file reception request has been transmitted from the transmission unit 306 of the camcorder 21 in the step S100 shown in FIG. 19. If it is determined that the file reception request has not been transmitted, the data acquisition unit 324 waits until the file reception request is transmitted.

On the other hand, in the step S142, if it is determined that the file reception request has been transmitted, the process proceeds to step S143 in which the apparatus information and the record ID, which have been transmitted together with the file reception request, are received. After the step S143, the process proceeds to step S145 in which the data acquisition unit 324 determines the recording destination of a clip to be transmitted on the basis of the received apparatus information and the record ID that have been received in the step S143, proceeding to step S145.

In the step S145, the data acquisition unit 324 determines whether or not all apparatus information and record IDs transmitted from the transmission unit 306 have been received. If it is determined that all apparatus information and record IDs have not been received, the process returns to the step S143 so as to repeat the processes described above.

On the other hand, in the step S145, if it is determined that all apparatus information and record IDs have been received, the process proceeds to step S146 in which the data acquisition unit 324 controls the display control unit 326 to change the symbol of the clip group directory 238, which is displayed on the output unit 207 and is the recording destination of a clip to be transmitted, to a red color. After the step S146, the process proceeds to step S147 in which the data acquisition unit 324 receives the directory information transmitted from the transmission unit 306, proceeding to step S148.

In the step S148, the data acquisition unit 324 determines whether or not all directory information transmitted from the transmission unit 306 has been received. If it is determined that all directory information has not been received, the process returns to the step S147 so as to repeat the processes described above.

On the other hand, in the step S148, if it is determined that all directory information has been received, the process proceeds to step S149 in which the data acquisition unit 324 requests the camcorder 21 of transmission of data of each clip to be transmitted, proceeding to step S150. In step S150, the data acquisition unit 324 controls the display control unit 326 to change the symbol of the clip group directory 238, which is the recording destination of a clip to be transmitted, to an orange color.

After the step S150, the process proceeds to step S151 in which the data acquisition unit 324 receives grouping metadata transmit from the transmission unit 306 and records the received grouping metadata as the grouping metadata file 239 in the clip group directory 238 which is a recording destination determined in the step S144. After the step S151, the process proceeds to step S152 in which the data acquisition unit 324 determines whether or not all grouping metadata transmitted from the transmission unit 306 has been received. If it is determined that all grouping metadata has not been received, the process returns to the step S151 so as to repeat the processes described above.

On the other hand, in the step S152, if it is determined that all group metadata has been received, the process proceeds to step S153 in which the data acquisition unit 324 controls the display control unit 326 to change the symbol of the clip group directory 238, which is the recording destination of a clip to be transmitted, to a yellow color. After the step S153, the process proceeds to step S154 in which the data acquisition unit 324 performs a clip receiving process of receiving data of clips for each clip. The clip receiving process will be described in detail later with reference to FIG. 22.

After the step S154, the process proceeds to step S155 in which the data acquisition unit 324 determines whether or not data of all clips transmitted from the transmission unit 306 has been received. If it is determined that data of all clips has not been received, the data acquisition unit 324 waits until it is determined that data of all clips has been received.

On the other hand, in the step S155, if it is determined that data of all clips has been received, the process proceeds to step S156 in which the data acquisition unit 324 controls the display control unit 326 to change the symbol of the clip group directory 238, which is the recording destination of a clip to be transmitted, to a green color, completing the process.

Next, the clip receiving process in the step S154 shown in FIG. 21 will be described with reference to FIG. 22. In addition, the clip receiving process is performed for each clip.

Figure 21:
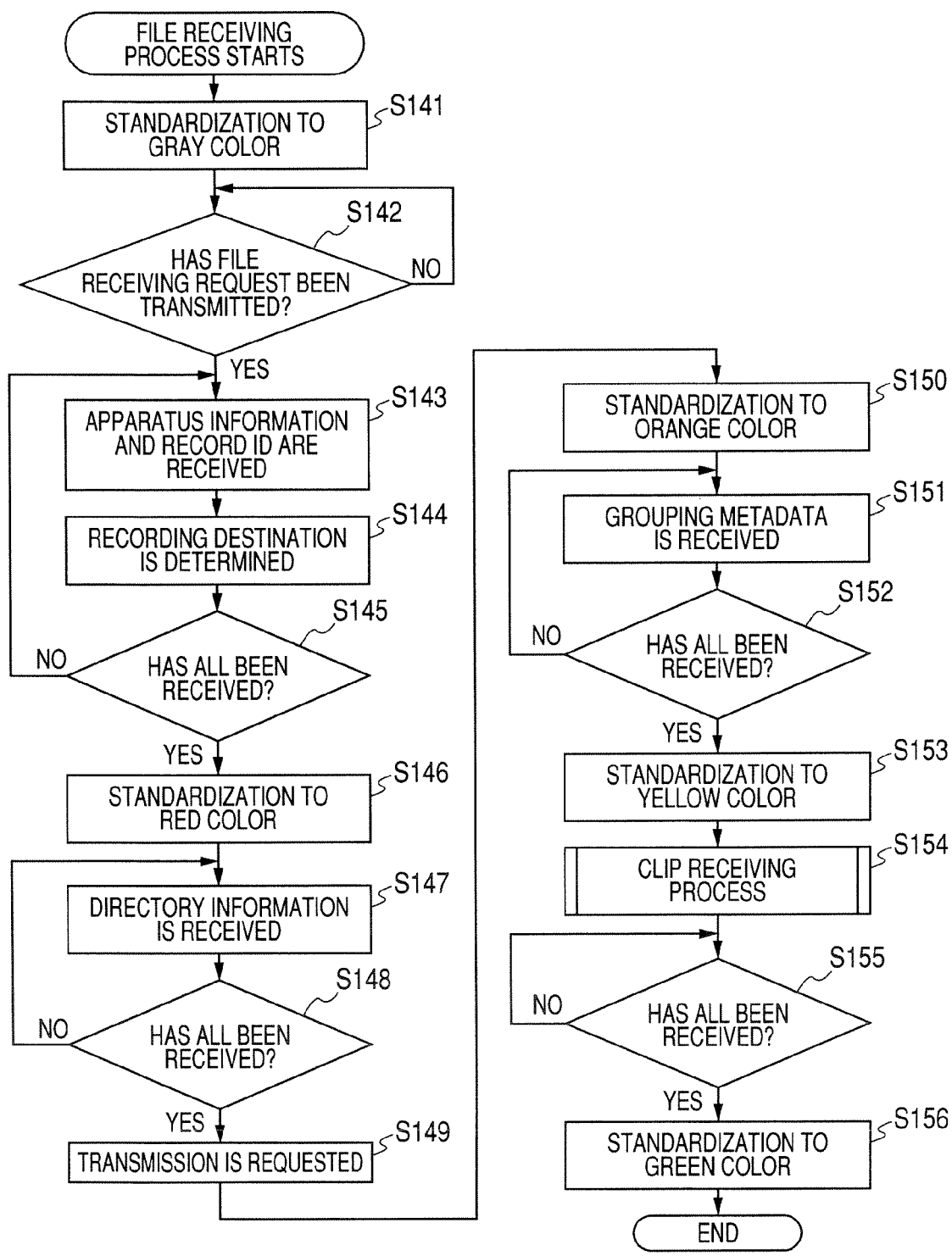
FIG. 21 is a flow chart explaining a file receiving process.

In step S161, the data acquisition unit 324 controls the display control unit 326 on the basis of the grouping metadata received in the step S151 shown in FIG. 21 such that a symbol of the clip directory 240 is displayed to be subordinate to the clip group directory 238. At this time, the symbol of the clip directory 240 changes to a gray color.

After the step S161, the process proceeds to step S162 in which the data acquisition unit 324 determines whether or not clip metadata (including thumbnail image data) transmitted from the transmission unit 306 has been received and waits until the clip metadata is received. On the other hand, in the step S162, if it is determined that the clip metadata has been received, the process proceeds to step S163 in which the data acquisition unit 324 records the clip metadata as a clip metadata file in the clip directory 240, which is the recording destination thereof, and changes the symbol of the clip directory 240 to a red color.

In addition, in the case when the sampling thumbnail image data has been also received, the data acquisition unit 324 records the sampling thumbnail image data as a sampling thumbnail image file in the clip directory 240, which is the recording destination thereof.

After the step S163, the process proceeds to step S164 in which the data acquisition unit 324 determines whether or not the thumbnail image data transmitted from the transmission unit 306 has been received. If it is determined that the thumbnail image data has been received, the process proceeds to step S165 in which the data acquisition unit 324 records the thumbnail image data as a thumbnail image data file in the clip directory 240, which is the recording destination thereof, and changes the symbol of the clip directory 240 to an orange color.

On the other hand, in the step S164, if it is determined that the thumbnail image data has not been received, the process proceeds to step S166 in which the data acquisition unit 324 determines whether or not proxy image data transmitted from the transmission unit 306 has been received. If it is determined that the proxy image data has not been received, the process returns to the step S164 so as to repeat the processes described above.

On the other hand, in the step S166, if it is determined that the proxy image data has been received, the process proceeds to step S167 in which the data acquisition unit 324 records the proxy image data as a proxy image data file in the clip directory 240, which is the recording destination thereof, and changes the symbol of the clip directory 240 to a yellow color.

After the step S165 or step S167, the process proceeds to step S168 in which the data acquisition unit 324 determines whether or not material data transmitted from the transmission unit 306 has been received and waits until the material data is received. On the other hand, in the step S168, if it is determined that the material data has been received, the process proceeds to step S169 in which the data acquisition unit 324 records the material data, as an image file or a music file, in the clip directory 240, which is the recording destination thereof, and changes the symbol of the clip directory 240 to a green color, proceeding to step S155 shown in FIG. 21.

Figure 22:
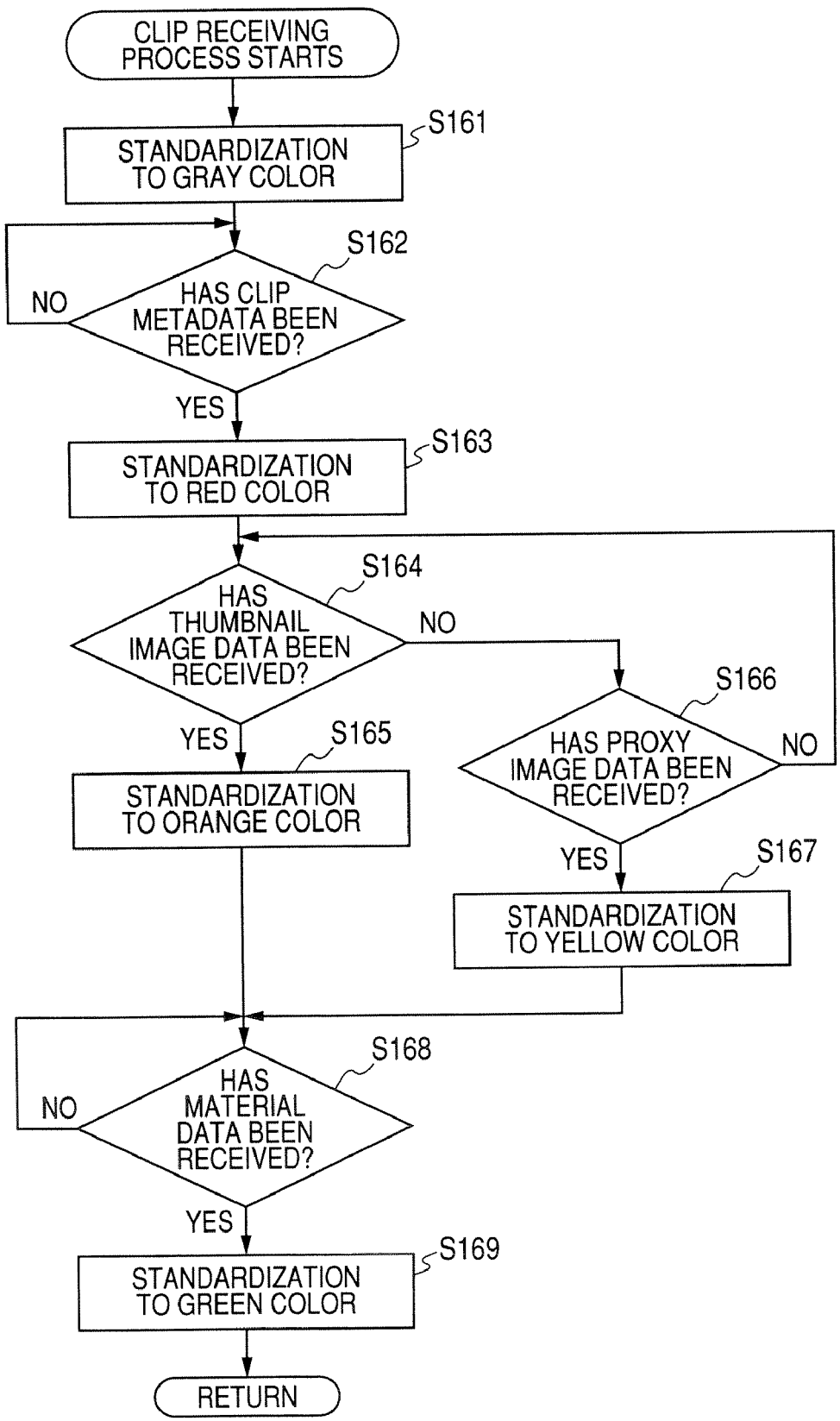
FIG. 22 is a flow chart explaining a clip receiving process.

In addition, in FIGS. 21 and 22, the transmission state of a file of a directory corresponding to a symbol has been indicated by changing the color of the symbol. However, a method of indicating the transmission state is not limited thereto. For example, a message indicating the transmission state of a file of a directory may be displayed around the symbol of the directory.

Figure 23:
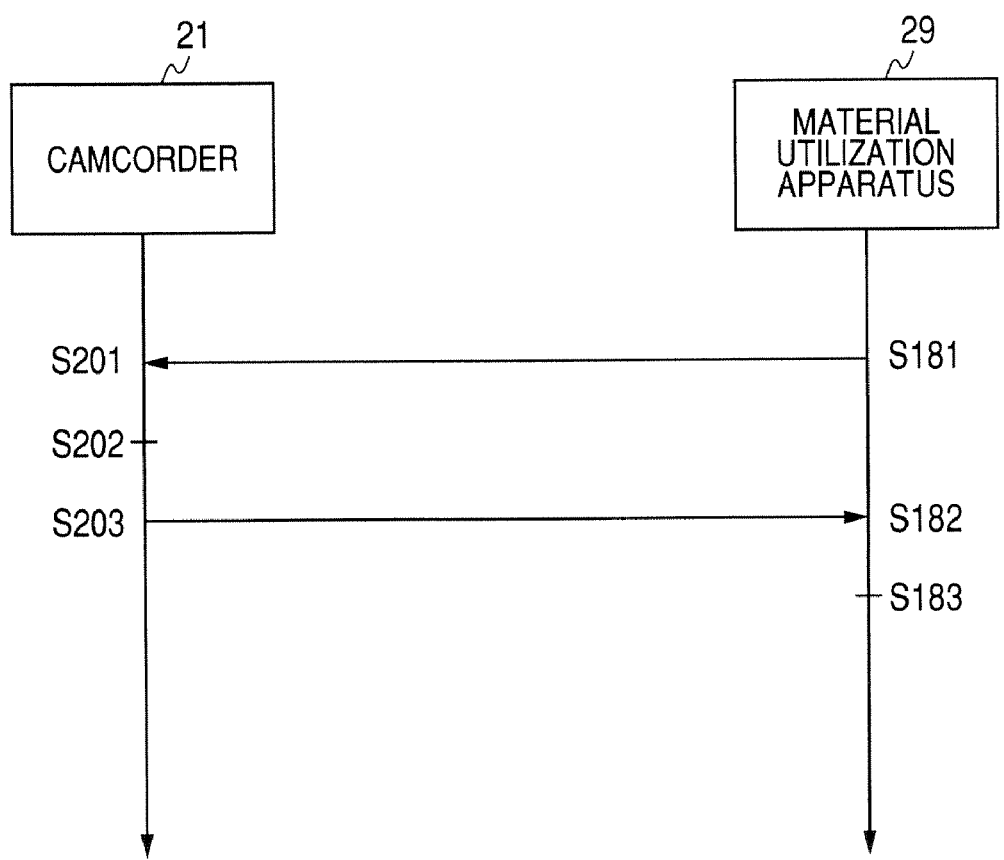
FIG. 23 is a flow chart explaining a deletion process.

Next, FIG. 23 is a view explaining a deletion process in which the material utilization apparatus 29 deletes data of each of the clips recorded in the removable media 33. The deletion process starts when a user operates the input unit 327 (refer to FIG. 15) to designate a clip to be deleted.

In step S181, the control unit 328 of the material utilization apparatus 29 transmits to the camcorder 21 a control signal, which is used to delete the clip designated as an object to be deleted by the user, according to an instruction supplied from the input unit 327, proceeding to step S182.

In step S201, the receiving unit 307 of the camcorder 21 supplies the control signal, which has been supplied from the control unit 328 in the step S181, to the control unit 308, proceeding to step S202. In the step S202, the control unit 308 deletes the clip to be deleted, which is recorded in the removable media 33, on the basis of the control signal, and notifies the transmission unit 306 that the deletion has been completed. After the step S202, the process proceeds to step S203 in which the transmission unit 306 notifies the material utilization apparatus 29 that the deletion has been completed, completing the process.

In step S182, the deleting unit 323 of the material utilization apparatus 29 receives the delete completion notification, proceeding to step S183. In the step S183, the deleting unit 323 deletes data of each clip, which is to be deleted, within the temporary storage directory 235 recorded in the data recording unit 325, completing the process.

Furthermore, in FIG. 23, when the camcorder 21 receives the control signal, which is used to delete the clip to be deleted, from the material utilization apparatus 29, the clip to be deleted is deleted. Alternatively, in order to delete the clip to be deleted, the material utilization apparatus 29 may notify the user of the camcorder 21 that there is an instruction of deletion from a user of the material utilization apparatus 29 and then the user of the camcorder 21 having received the notification may instruct the camcorder 21 to delete the clip. Furthermore, in the camcorder 21, the user may set prohibition of deletion for each clip or group. In this case, the camcorder 21 deletes only an object to be deleted, for which the prohibition of deletion is not set.

Moreover, in FIG. 23, when the user designates a clip to be deleted, the control unit 308 and the deleting unit 323 delete the object to be deleted. However, when a clip recorded in the removable media 33 is copied on the storage directory 236, the control unit 308 and the deleting unit 323 may delete the clip.

As described above, when the clip recorded in the removable media 33 mounted in the camcorder 21 is deleted, a clip recorded in the temporary storage directory 235 of the material utilization apparatus 29 is deleted but a clip recorded in the storage directory 236 is not deleted. In other words, a clip shot (acquired) by the camcorder 21 is still held in the storage directory 236.

Thus, even in the case when the removable media 33 has a small recording capacity, a long-time shoot can be performed by transmitting to the material utilization apparatus 29 a clip, which is obtained as a result of the shoot and recorded in the removable media 33, and by deleting the clip recorded in the removable media 33.

Figure 24:
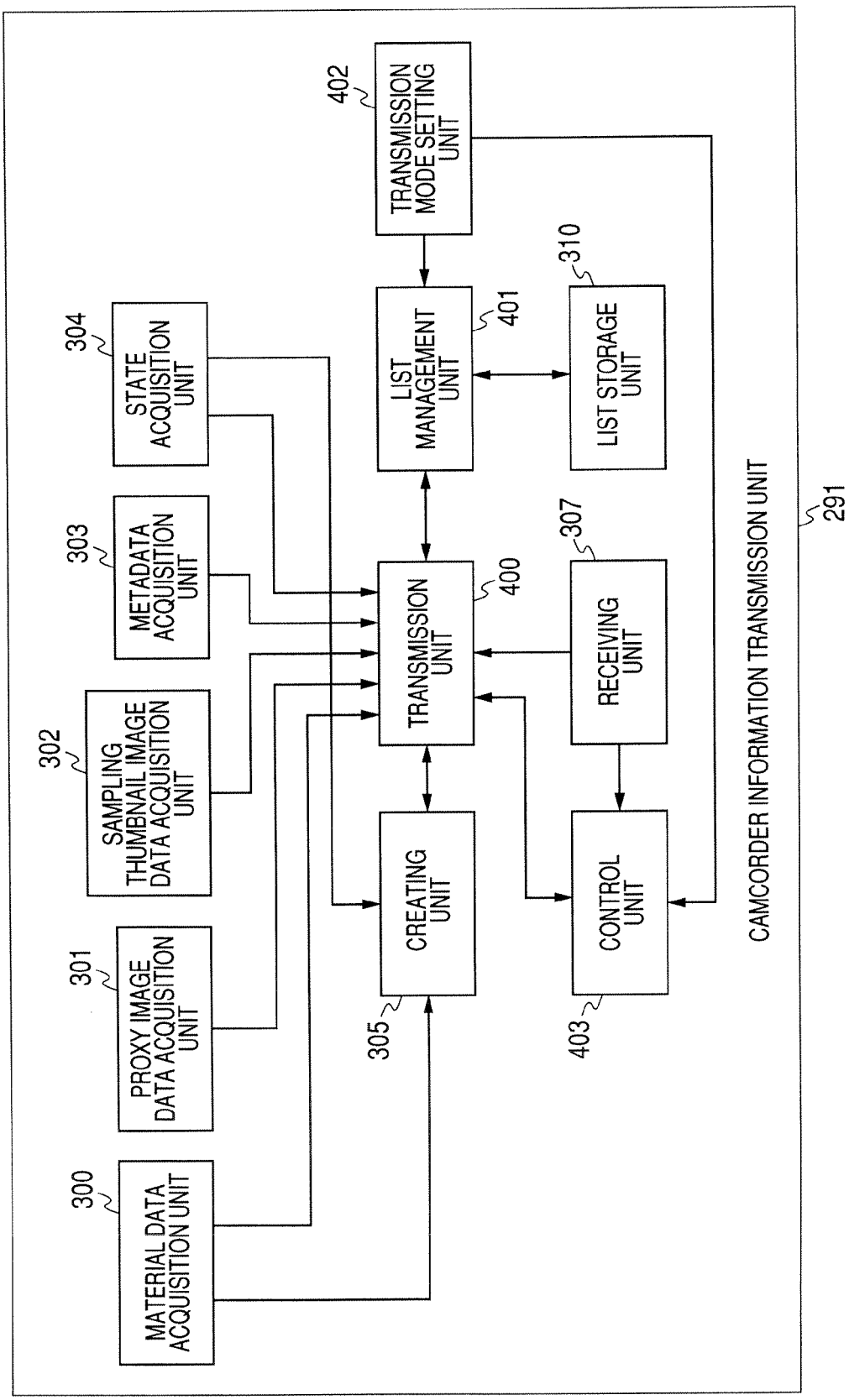
FIG. 24 is a block diagram illustrating another example of the specific configuration of the camcorder information transmission unit.

FIG. 24 is a block diagram illustrating another example of the specific configuration of the camcorder information transmission unit 291 shown in FIG. 13.

The camcorder information transmission unit 291 shown in FIG. 24 includes a transmission unit 400 and a list management unit 401, instead of the transmission unit 306 and the list management unit 309, and a transmission mode setting unit 402. In addition, the same components as in FIG. 13 are denoted by the same reference numerals, and an explanation thereof will be omitted. In addition, the transmission unit 400 corresponds to, for example, the communication block 53 shown in FIG. 3, and the list management unit 401 and the transmission mode setting unit 402 correspond to, for example, the microcomputer 106.

In the same manner as the transmission unit 306 shown in FIG. 13, the transmission unit 400 calculates the transmission time, which is required for transmission of the proxy image data to the material utilization apparatus 29, on the basis of the proxy image data from the proxy image data acquisition unit 301 and determines whether or not the transmission time is equal to or larger than the predetermined time. Then, the transmission unit 400 supplies a result of the determination to the creating unit 305.

Furthermore, in the same manner as the transmission unit 306, the transmission unit 400 extracts apparatus information from the non-real-time metadata of the clip metadata, which is supplied from the metadata acquisition unit 303, and extracts a record ID from the grouping metadata.

Furthermore, in the same manner as the transmission unit 306, the transmission unit 400 transmits to the material utilization apparatus 29 apparatus information, directory information, metadata, proxy image data, and material data of clips to be transmitted in this order on the basis of a transmission list supplied from the list management unit 401. In addition, the transmission unit 400 updates contents, which correspond to a clip that has been completely transmitted, of the item 'transmission history' of grouping metadata of the clip to 'transmitted'. Further, the transmission unit 400 notifies the list management unit 401 that clips to be transmitted has been completely transmitted.

Furthermore, in the same manner as the transmission unit 306, in response to an acquisition request supplied from the receiving unit 307, the transmission unit 400 transmits to the material utilization apparatus 29 a camera set value, operation state data, material data of a clip that is currently being acquired or reproduced, or data of each clip recorded in the removable media 33, as state information. In addition, in response to the acquisition request from the receiving unit 307, the transmission unit 400 requests the creating unit 305 to create thumbnail image data of the clip recorded in the removable media 33 and thumbnail image data of the clip that is currently being acquired or reproduced. In addition, the transmission unit 400 transmits to the material utilization apparatus 29 the thumbnail image data and directory information supplied from the creating unit 305 according to the request.

Moreover, the transmission unit 400 determines whether or not data of the clip recorded in the removable media 33 is being transmitted according to the instruction from the control unit 403. Then, according to a result of the determination, the transmission unit 400 calculates the transmission time required for the transmission of the clip being transmitted. Moreover, the transmission unit 400 controls the transmission at the time when the recording of a clip starts, on the basis of the instruction from the control unit 403 and the transmission time of the clip being transmitted.

In the same manner as the list management unit 309 shown in FIG. 13, the list management unit 401 extracts clips, which have not been transmitted, on the basis of contents of the item 'transmission history' (refer to FIG. 6) of the item 'shoot material' of grouping metadata of clips, and the extracted clips are set as clips to be transmitted. Then, the list management unit 401 acquires clip metadata of the clips, which are be transmitted, from the transmission unit 400, creates a transmission list on the basis of the clip metadata, and supplies the created transmission list to the list storage unit 310. In addition, the list management unit 401 determines the order of priority of clips, which are registered in the transmission list, on the basis of a transmission mode of clips supplied from the transmission mode setting unit 402. Then, the list management unit 401 changes the transmission list on the basis of the order of priority. For example, the list management unit 401 creates a changed transmission list obtained by arranging the transmission list in the order of high priority.

In addition, in the same manner as the list management unit 309 shown in FIG. 13, the list management unit 401 reads out the transmission list from the list storage unit 310 and supplies the read list to the transmission unit 400. In addition, the list management unit 401 deletes the transmission list stored in the list storage unit 310 according to the notification that clips to be transmitted have been completely transmitted from the transmission unit 400.

The transmission mode setting unit 402 causes a screen (refer to FIG. 25 to be described later) for setting a transmission mode to be displayed on the LCD 112 shown in FIG. 3. A user operates the operation unit 131 shown in FIG. 3 while viewing the screen, thereby designating the transmission mode. The transmission mode setting unit 402 sets the transmission mode on the basis of a communication operation signal, which has been supplied from the operation unit 131 and corresponds to the operation, and supplies the transmission mode to the list management unit 401 and the control unit 403.

In the same manner as the control unit 308 shown in FIG. 13, the control unit 403 controls shooting, recording, deleting, or reproduction on the basis of the control signal from the receiving unit 307. Moreover, the control unit 403 deletes clips recorded in the removable media 33 according to the control signal. If necessary, the control unit 403 transmits to the material utilization apparatus 29 through the transmission unit 400 that a process corresponding to the control signal has been completed.

In addition, the control unit 403 supplies an instruction for controlling the transmission to the transmission unit 400 according to the control signal, which is used to record a clip, supplied from the receiving unit 307 and the transmission mode from the transmission mode setting unit 402.

FIG. 25 is a view illustrating an example of a screen for setting a transmission mode displayed on the LCD 112 shown in FIG. 3.

On the screen shown in FIG. 25, items of 'date', 'order of shoot date', 'shoot apparatus', 'preferential condition', 'handling of a file being transmitted when recording starts', and options corresponding the above items are displayed. A user selects details of each item by operating an item selection button 420*a* or 420*b*, a selection change button 421*a* or 421*b*, or a determination button 422 by the use of the operation unit 131 shown in FIG. 3 and instructing a determination obtained by moving a mark ● to the right side of a desired option of each item.

The item selection button 420*a* is operated to move upward an item disposed with the mark e to be moved. The item selection button 420*b* is operated to move downward an item disposed with the mark ● to be moved. The selection change button 421*a* is operated to move upward the mark ● to be moved. The selection change button 421*b* is operated to move downward the mark ● to be moved. The determination button 422 is operated to make an instruction on determination. Specifically, the user moves upward or downward an item disposed with the mark ● to be moved by operating the item selection button 420*a* or 420*b*, moves upward or downward the mark ●, which is an object to be moved due to the movement described above, by operating the selection change button 421*a* or 421*b*, and operates the determination button 422 when the mark ● is disposed on the right side of a desired option.

For example, in order to select details of the item 'date', first, the user selects the item 'date' as an item disposed with the mark ● to be moved by operating the item selection button 420*a* or 420*b*. Then, the user moves the mark ● to a desired option by operating the selection change button 421*a* or 421*b* and then operates the determination button 422.

Here, in the example shown in FIG. 25, options of 'latest day is prioritized' and 'order of shoot date' are displayed corresponding to the item 'date'. The option 'latest day is prioritized' is selected when determining the order of priority such that the order of priority is high in the order of a latest acquisition day (shoot day) of a clip, that is, the order of priority becomes low as the acquisition day goes backward from current (transmission day) to past. The option 'order of shoot date' is selected when determining the order of priority such that the order of priority is high in the order of a past acquisition day (shoot day) of a clip.

In addition, options of 'normal ascending order' and 'reverse order' are displayed corresponding to the item 'order of shoot'. The option 'normal ascending order' is selected when determining the order of priority such that the order of priority is high in the order of an early shoot time in the case when the shoot date is the same. The option 'reverse order' is selected when determining the order of priority such that the order of priority is high in the order of a late shoot time in the case when the shoot date is the same.

In addition, options of 'this camcorder is prioritized' and 'no option' are displayed corresponding to the item 'shoot apparatus'. The option 'this camcorder is prioritized' is selected when determining the order of priority such that the order of priority of a clip obtained as a result of shooting by itself (camcorder 21) is higher than that of a clip acquired from another camcorder 21. The option 'no option' is selected when determining the order of priority such that the order of priority is not changed according to a clip acquisition source.

Furthermore, options of 'automatic' and 'manual' are displayed corresponding to the item 'preferential condition'. The option 'automatic' is selected when determining the order of priority on the basis of options selected in the items 'date', 'shoot date', and 'shoot apparatus'. The option 'manual' is selected when the user operates the operation unit 131 to input the order of priority of each clip.

Furthermore, options of 'adding later', 'transmitting later as a separate file', 'deleting file being transmitted', and 'completion of transmission' are displayed corresponding to the item 'handling of a file being transmitted when recording starts'. The option 'adding later' is selected when transmission of a file to the material utilization apparatus 29 stops at the start of recording, non-transmitted data of the file, the transmission of which has stopped, is transmitted after completion of the recording, and the transmitted data is additionally written (added) in the file, the transmission of which has been completed.

The option 'transmitting later as a separate file' is selected when transmission of a file to the material utilization apparatus 29 stops at the start of recording and data of the file, the transmission of which has stopped, is transmitted from the beginning as another file. The option 'deleting file being transmitted' is selected when transmitted data of a file being transmitted to the material utilization apparatus 29 is deleted from the material utilization apparatus 29 at the start of recording. The option 'completion of transmission' is selected when the recording starts after all data of the file being transmitted to the material utilization apparatus 29 has been transmitted.

FIG. 26 is an explanatory view illustrating an example of clips, which are to be transmitted, registered in a transmission list.

In a table shown in FIG. 26, UMID, shoot time, and apparatus ID are shown in the order from the left side. Here, UMID is a number in actuality; however, in FIG. 26, UMID #1 to UMID #4 are shown instead of a number for the convenience of explanation.

In the example shown in FIG. 26, clips having UMID of UMID #1 to UMID #4 are to be transmitted. The clip corresponding to UMID #1 is a clip obtained as a result of shoot using the camcorder 21 having an apparatus ID of 'CID #2' at 9:50:15 (hour/minute/second) of the day (transmission day). The clip corresponding to UMID #3 is a clip obtained as a result of shoot using the camcorder 21 having an apparatus ID of 'CID #2' at 10:10:24 of the day.

In addition, the clip corresponding to UMID #4 is a clip obtained as a result of shoot using the camcorder 21 having an apparatus ID of 'CID #1' at 10:25:30 of the day. The clip corresponding to UMID #2 is a clip obtained as a result of shoot using the camcorder 21 having an apparatus ID of 'CID #1' at 11:25:5 of the day.

At this time, if the option 'latest day is prioritized' of the item date, the option 'normal ascending order' of the item 'order of shoot', the option 'no option' of the item 'shoot apparatus', and the option 'automatic' of the item 'preferential condition' are selected by a user in the transmission mode, the list management unit 401 creates the transmission list shown in FIG. 27 on the basis of the transmission mode.

Since all of the clips to be transmitted in FIG. 26 can be obtained as a result of shoot on the current day, the list management unit 401 creates the transmission list such that the order of priority becomes low as the shoot time is late, that is, the order of priority becomes high in the order of early shoot time, as shown in FIG. 27. Moreover, in the transmission list shown in FIG. 27, since a value of the priority order becomes small as the priority order is high, the clips to be transmitted are arranged from the beginning in the order of high priority. The same is true for FIGS. 29, 31, and 33 to be described later.

That is, in the transmission list shown in FIG. 27, the order of priority, UMID, shoot time, and apparatus ID of each of the clips to be transmitted are registered in the order from the left side, and information (hereinafter, referred to as 'clip information') including UMID, shoot time, and apparatus ID of each of the clips to be transmitted is arranged in the order of early shoot time, that is, in the order of UMID #1, UMID #3, UMID #4, and UMID #2.

Next, referring to FIG. 28, it will be described about a transmission list creating process in which the list management unit 401 creates a transmission list under the condition in which the option 'latest day is prioritized' of the item 'date', the option 'normal ascending order' of the item 'order of shoot', the option 'no option' of the item 'shoot apparatus', and the option 'automatic' of the item 'preferential condition' are selected in the transmission mode. The transmission list creating process starts, for example, when a clip that has not been transmitted is extracted.

In step S221, the list management unit 401 sets a count value L of a counter (not shown) to '1', proceeding to step S222. In step S222, the list management unit 401 acquires from the transmission unit 400 clip metadata of a clip, which is obtained as a result of shoot (L−1) days ago from a current date, among the extracted non-transmitted clips and registers the clip information on the transmission list on the basis of the clip metadata, the (L−1) indicating a value obtained by subtracting '1' from the count value L. That is, the list management unit 401 registers, as an object to be transmit, a clip, which is obtained as a result of shoot (L−1) days ago from a current date, of the extracted non-transmitted clips in the transmission list.

After the step S222, the process proceeds to step S223 in which the list management unit 401 sorts the clip information, which is registered in the transmission list in the previous step S222, in the order of early shoot time. For example, when the clip information of clips shown in FIG. 26 is registered in the transmission list, the list management unit 401 sorts the clip information in the order of early shoot time, thereby creating the transmission list shown in FIG. 27.

After the step S223, the process proceeds to step S224 in which the list management unit 401 determines whether or not clip information of all clips to be transmitted has been registered in the transmission list. If it is determined that clip information of all clips to be transmitted has not been registered in the transmission list, the process proceeds to step S225. In the step S225, the list management unit 401 increments the count value L by '1', returning to step S222 so as to repeat the processes described above.

On the other hand, in the step S224, if it is determined that the clip information of all clips to be transmitted has been registered in the transmission list, the process is completed.

Figures 28, 29:
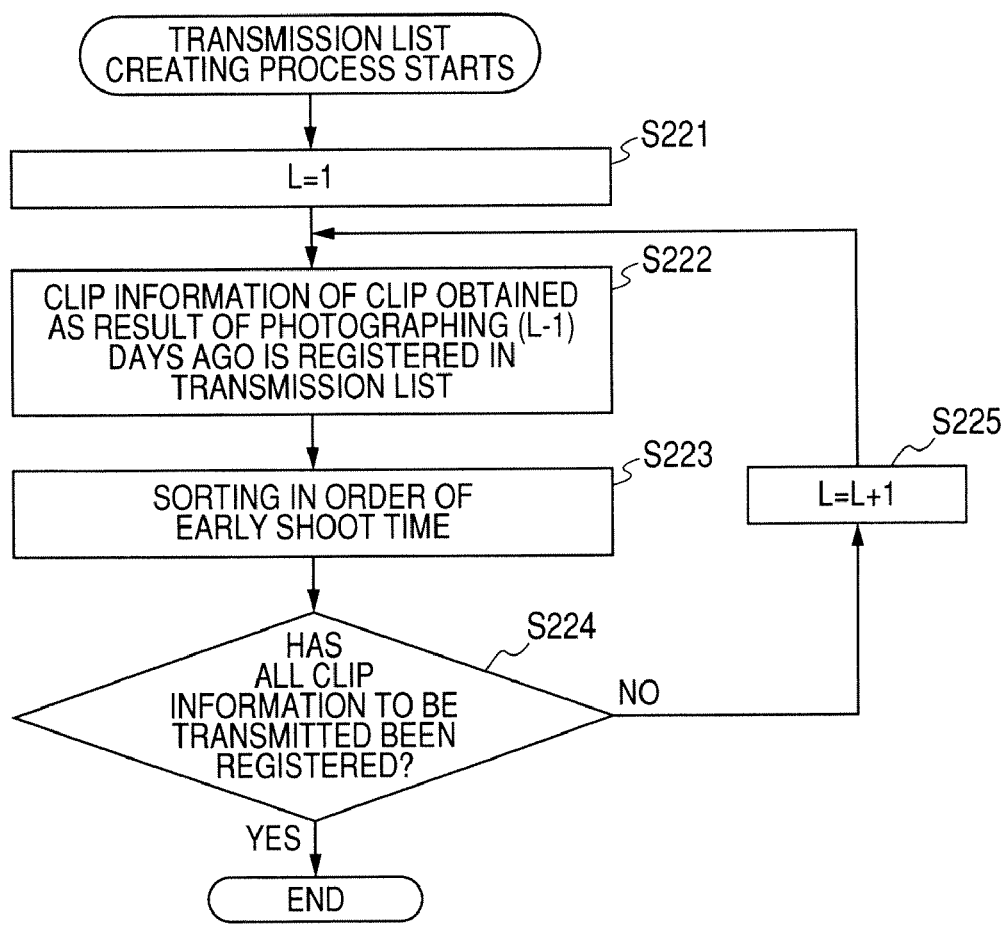
FIG. 28 a flow chart explaining a transmission list creating process.
FIG. 29 is a view illustrating another example of the transmission list.

Further, if the option 'latest day is prioritized' of the item 'date', the option 'reverse order' of the item 'order of shoot', the option 'no option' of the item 'shoot apparatus', and the option 'automatic' of the item 'preferential condition' are selected by a user in the transmission mode, the list management unit 401 creates the transmission list shown in FIG. 29 on the basis of the transmission mode.

Since all of the clips to be transmitted in FIG. 26 can be obtained as a result of shoot on the current day, the list management unit 401 creates the transmission list such that the order of priority becomes low as the shoot time is directed toward the past from current time, that is, the order of priority becomes high in the order of late (new) shoot time, as shown in FIG. 29. That is, in the transmission list shown in FIG. 29, the order of priority, UMID, shoot time, and apparatus ID of each of the clips to be transmitted are registered in the order from the left side, and clip information of clips to be transmitted is arranged in the order of new shoot time, that is, in the order of UMID #2, UMID #4, UMID #3, and UMID #1.

Next, referring to FIG. 30, it will be described about a transmission list creating process in which the list management unit 401 creates a transmission list under the condition in which the option 'latest day is prioritized' of the item 'date', the option 'reverse order' of the item 'order of shoot', the option 'no option' of the item 'shoot apparatus', and the option 'automatic' of the item 'preferential condition' are selected in the transmission mode. The transmission list creating process starts, for example, when a clip that has not been transmitted is extracted.

Steps S241 to S245 except for step S243 are the same as the steps S221 to S225 except for the step S223 in FIG. 28, and an explanation on processes except for the step S243 will be omitted.

In step S243, the list management unit 401 sorts clip information, which is registered in the transmission list in the previous step S242, in the order of late (new) shoot time. For example, when the clip information of the clips shown in FIG. 26 is registered in the transmission list, the list management unit 401 sorts the clip information in the order of late shoot time, thereby creating the transmission list shown in FIG. 29.

Here, in FIGS. 27 to 30, it has been described about a case in which the option 'latest day is prioritized' is selected in the item 'date'. However, in the case when the option 'order of shoot date' is selected, clip information of clips on each shoot day is registered in the order of late shoot date in the step S222 of FIG. 28 or the step S224 of FIG. 30.

Figures 30, 31:
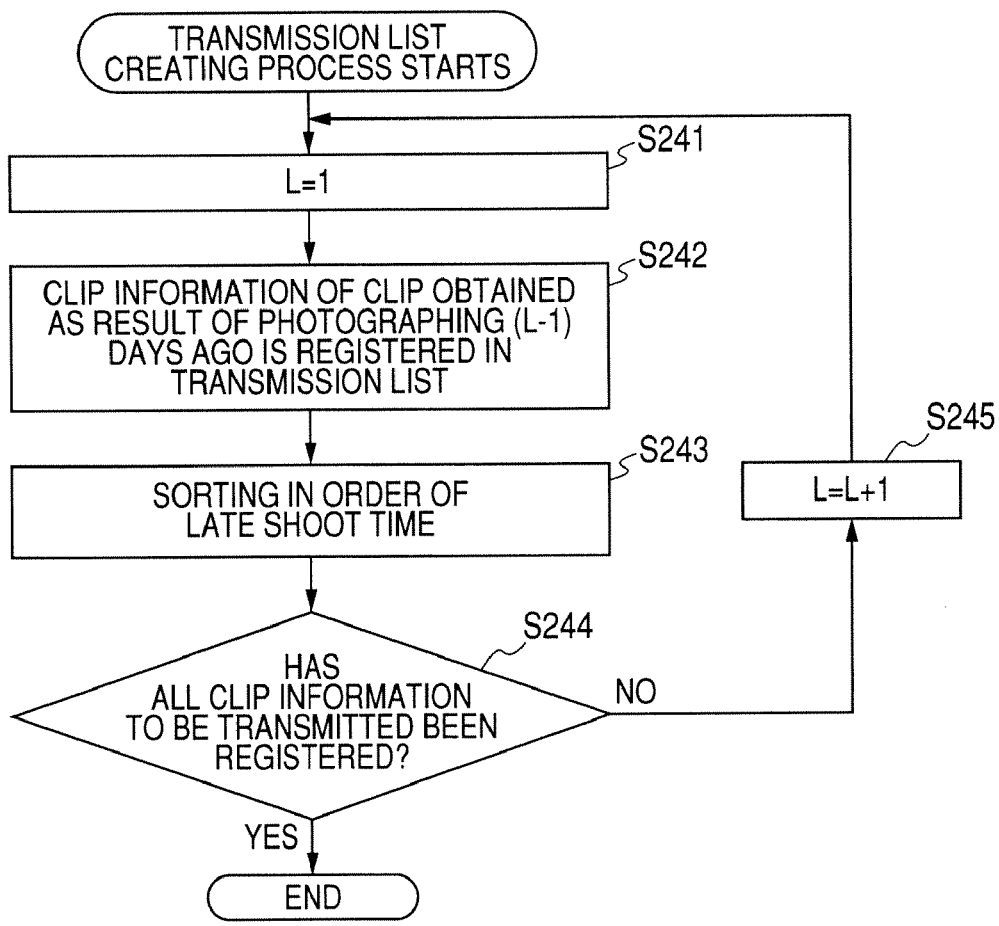
FIG. 30 is a flow chart explaining another transmission list creating process.
FIG. 31 is a view illustrating still another example of the transmission list.

Moreover, if the option 'this camcorder is prioritized' of the item 'shoot apparatus' and the option 'automatic' of the item 'preferential condition' are selected in the transmission mode by a user, the list management unit 401 creates the transmission list shown in FIG. 31 on the basis of the transmission mode. In addition, in FIG. 31, it is assumed that an apparatus ID of the camcorder 21 that creates the transmission list is 'CID #1'.

Since all of the clips to be transmitted in FIG. 26 can be obtained as a result of shoot on the current day, the list management unit 401 creates the transmission list such that the order of priority of a clip corresponding to 'CID #1', which is its own apparatus ID, is high, as shown in FIG. 31. That is, in the transmission list shown in FIG. 31, the order of priority, UMID, shoot time, and apparatus ID of each of the clips to be transmitted are registered in the order from the left side, and clip information of clips to be transmitted is arranged in the order of a clip corresponding to UMID #4 and a clip corresponding to UMID #2, which are clips corresponding to the apparatus ID 'CID #1', and a clip corresponding to UMID #1 and a clip corresponding to UMID #3, which are clips corresponding to the apparatus ID 'CID #2' other than 'CID #1'.

Furthermore, in the case when a plurality of apparatus IDs corresponding to clip to be transmitted exists in addition to the 'CID #1', the transmission list may be arranged in the order, which is set beforehand by a user, with respect to clips corresponding to apparatus IDs other than the 'CID #1'.

Furthermore, in the transmission list shown in FIG. 31, the clips corresponding to the same apparatus ID have been arranged in the early shoot time; however, it may be possible to arrange the clips corresponding to the same apparatus ID in the order of late shoot time. In addition, the order of the clips corresponding to the same apparatus ID may be set beforehand or a user may select the option of the item 'date' of the transmission mode so as to set the order of the clips corresponding to the same apparatus ID.

Next, referring to FIG. 32, it will be described about a transmission list creating process in which the list management unit 401 creates a transmission list under the condition in which the option 'this camcorder is prioritized' of the item 'shoot apparatus' and the option 'automatic' of the item 'preferential condition' are selected in the transmission mode. The transmission list creating process starts, for example, when a clip that has not been transmitted is extracted.

In step S261, the list management unit 401 sets the non-transmitted clips, which have been extracted, as objects to be transmitted, acquires clip metadata of the clips from the transmission unit 400, and registers clip information in the transmission list on the basis of the clip metadata.

After the step S261, the process proceeds to step S262 in which the list management unit 401 sorts the clip information, which is registered in the transmission list in the previous step S261, such that a clip corresponding to its own apparatus ID is prioritized (has high priority order). For example, when the clip information of the clips shown in FIG. 26 is registered in the transmission list, the list management unit 401 sorts the clip information such that a clip corresponding to CID #1', which is its own apparatus ID, is prioritized, thereby creating the transmission list shown in FIG. 31.

Figures 32, 33:
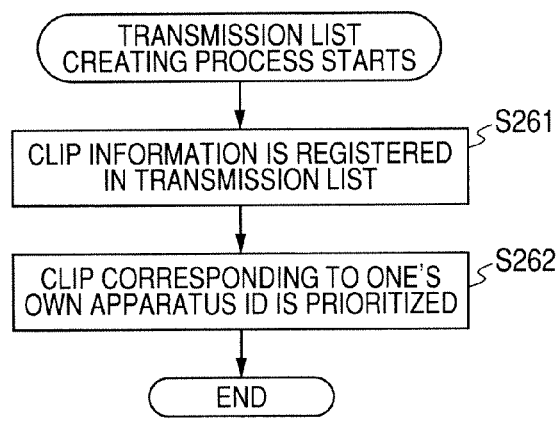
FIG. 32 is a flow chart explaining still another transmission list creating process.
FIG. 33 is a view illustrating still another example of the transmission list.

Moreover, if the option 'manual' of the item 'preferential condition' is selected by a user in the transmission mode, the list management unit 401 creates the transmission list shown in FIG. 33 on the basis of the transmission mode and an input from the user.

That is, the list management unit 401 displays on the LCD 112 (refer to FIG. 3) the transmission list in which the clip information of clips to be transmitted in FIG. 26 is registered. The user operates the operation unit 131 while viewing the transmission list, thereby inputting the order of priority of each of the clips. The list management unit 401 creates the transmission list in FIG. 33 on the basis of a communication operation signal indicating the operation.

In the transmission list shown in FIG. 33, the order of priority, UMID, shoot time, apparatus ID, and the order of priority ('manual input' shown in FIG. 33) input from the user are registered in the order from the left side. In the example shown in FIG. 33, for clips corresponding to UMID#2, UMID#1, UMID#4, and UMID#3, the order of priority 1, 2, 3, and 4 is input by the user. In addition, in the transmission list shown in FIG. 33, clip information of clips is arranged in the order of UMID#2, UMID#1, UMID#4, and UMID#3.

Figure 34:
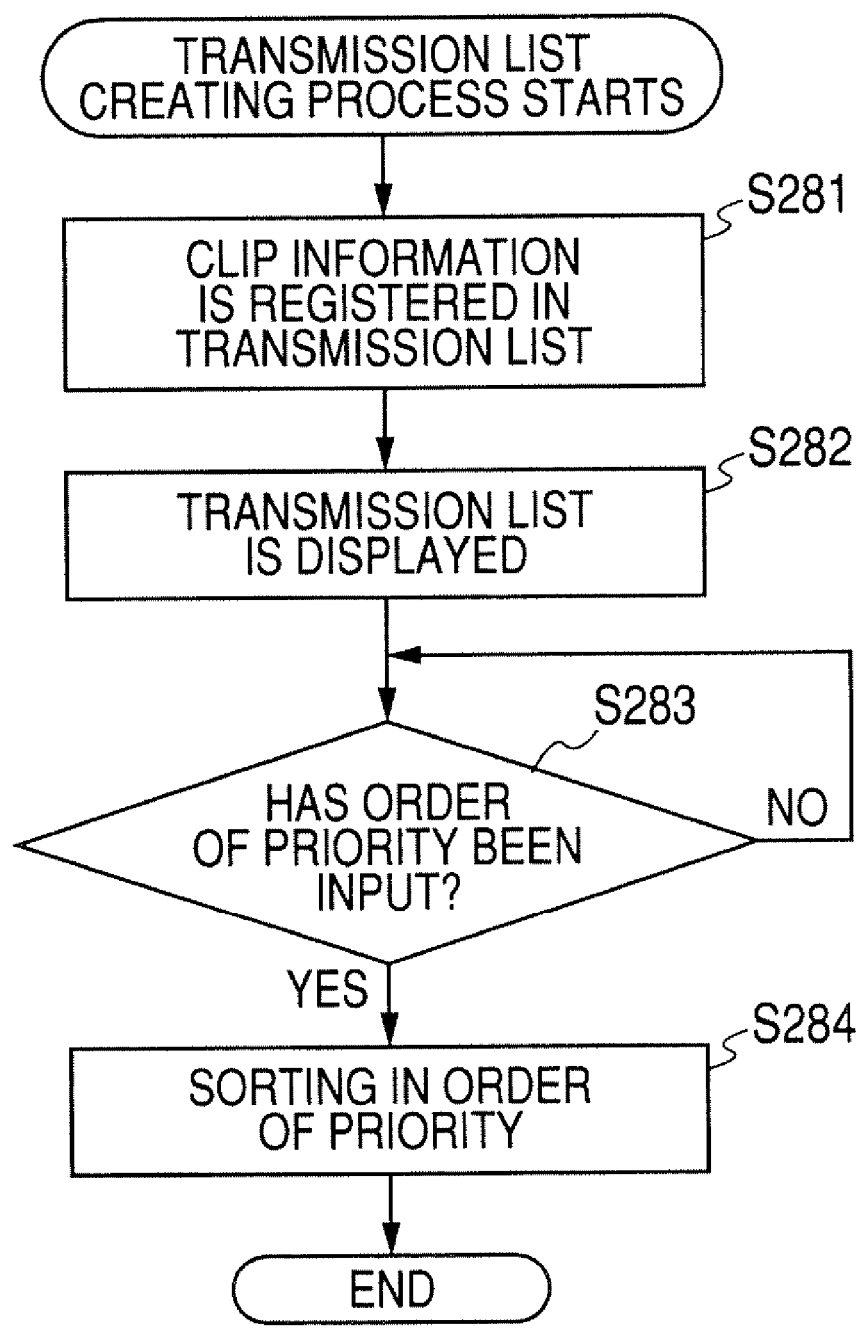
FIG. 34 is a flow chart explaining still another transmission list creating process.

Next, referring to FIG. 34, it will be described about a transmission list creating process in which the list management unit 401 shown in FIG. 24 creates a transmission list under the condition in which the option 'automatic' of the item 'preferential condition' is selected in the transmission mode. The transmission list creating process starts, for example, when a clip that has not been transmitted is extracted.

In step S281, the list management unit 401 sets non-transmitted clips, which have been extracted, as objects to be transmitted, acquires clip metadata of the clips from the transmission unit 400, and registers clip information in the transmission list on the basis of the clip metadata. After the step S281, the process proceeds to step S282 in which the list management unit 401 reads out, from the list storage unit 310, the transmission list in which clip information of clips to be transmitted is registered in the step S281, and displays the read transmission list on the LCD 112.

At this time, the user operates the operation unit 131 while viewing the transmission list displayed on the LCD 122, thereby inputting the priority order with respect to each of the clips included in the clip information registered in the transmission list.

After the step S282, the process proceeds to step S283 in which the list management unit 401 determines whether or not the priority order has been input with respect to all of the clips included in the clip information registered in the transmission list, on the basis of the communication operation signal from the operation unit 131. If it is determined that the priority order has not been input with respect to all of the clips, the list management unit 401 waits until the order of priority is input.

On the other hand, in the step S283, if it is determined that the priority order has been input with respect to all of the clips included in the clip information registered in the transmission list, the process proceeds to step S284. In the step S284, the list management unit 401 sorts the clip information to be transmitted, which is registered in the transmission list in the step S281, in the order of high priority input by the user. At this time, the list management unit 401 adds the priority order, which has been input by the user, in corresponding clip information of the transmission list.

For example, when the clip information of the clips shown in FIG. 26 is registered in the transmission list, the list management unit 401 sorts the clip information in the order of high priority input by the user, thereby creating the transmission list shown in FIG. 33.

Next, referring to FIG. 35, it will be described about a recording process in which the camcorder information transmission unit 291 shown in FIG. 24 records data of each clip, which is obtained as a result of shoot, under the condition in which the option 'adding later' of the item 'handling of a file being transmitted when recording starts' is selected in the transmission mode. The recording process starts, for example, when a control signal that is used to record a clip and is supplied from the material utilization apparatus 29 is supplied to the control unit 403.

In step S301, the transmission unit 400 determines whether or not data of a clip recorded in the removable media 33 is being transmitted according to an instruction from the control unit 403. If it is determined that the data of the clip is being transmitted, the process proceeds to step S302. In the step S302, the transmission unit 400 calculates the transmission time required for the transmission of the data of the clip being transmitted, on the basis of the data size of a clip being transmitted and the communication speed in the network 31 and the intranet 32.

After the step S302, the process proceeds to step S303. In the step S303, the transmission unit 400 determines whether or not remaining transmission time, that is, time obtained by subtracting, from the transmission time calculated in the step S302, time from the start of transmission of the clip being currently transmitted to current time is equal to or larger than the set time (for example, 10 seconds) In the step S303, if it is determined that the remaining transmission time is equal to or larger than the set time, the process proceeds to step S304. In the step S304, the transmission unit 400 stops the transmission to store the position (for example, frame number; hereinafter, referred to as 'stop position') at which the transmission has stopped, grants a new UMID to a file of the clip, the transmission of which has stopped, and then transmits the UMID to the material utilization apparatus 29.

At this time, the data acquisition unit 324 (refer to FIG. 15) of the material utilization apparatus 29 grants the new UMID transmitted from the transmission unit 400 to the file of the clip, the transmission of which has stopped, received from the transmission unit 400 and stored in the data recording unit 325.

On the other hand, in the step S303, if it is determined that the remaining transmission time is not equal to or larger than the set time, the process proceeds to step S305 in which the transmission unit 400 determines whether or not the file of the clip being transmitted has been completely transmitted. In the step S305, if it is determined that the file of the clip being transmitted has not been completely transmitted, the transmission unit 400 waits until it is determined that the transmission has been completed.

If it is determined in the step S301 that the data of the clip is not being transmitted, after the step S304, or if it is determined in the step S305 that the file of the clip being transmitted has been completely transmitted, the process proceeds to step S306. In the step S306, the control unit 403 performs recording the clip, which has been obtained as a result of the shoot, and the file transmission process (refer to FIG. 19) on the clip.

After the step S306, the process proceeds to step S307 in which the transmission unit 400 transmits the new UMID granted in the step S304 and the stop position stored in the step S304 to the material utilization apparatus 29, proceeding to step S308.

In the step S308, the transmission unit 400 transmits to the material utilization apparatus 29 data (non-transmitted data), which is located behind the stop position, of the data of the clip, the transmission of which has stopped, supplied from the material data acquisition unit 300, the proxy image data acquisition unit 301, or the metadata acquisition unit 303 completing the process.

Thereafter, the data acquisition unit 324 of the material utilization apparatus 29 records the data, which is transmitted in the step S308, starting from the stop position of the file to which the UMID is granted, on the basis of the stop position and the new UMID transmitted from the transmission unit 400 in the step S307.

Figure 36:
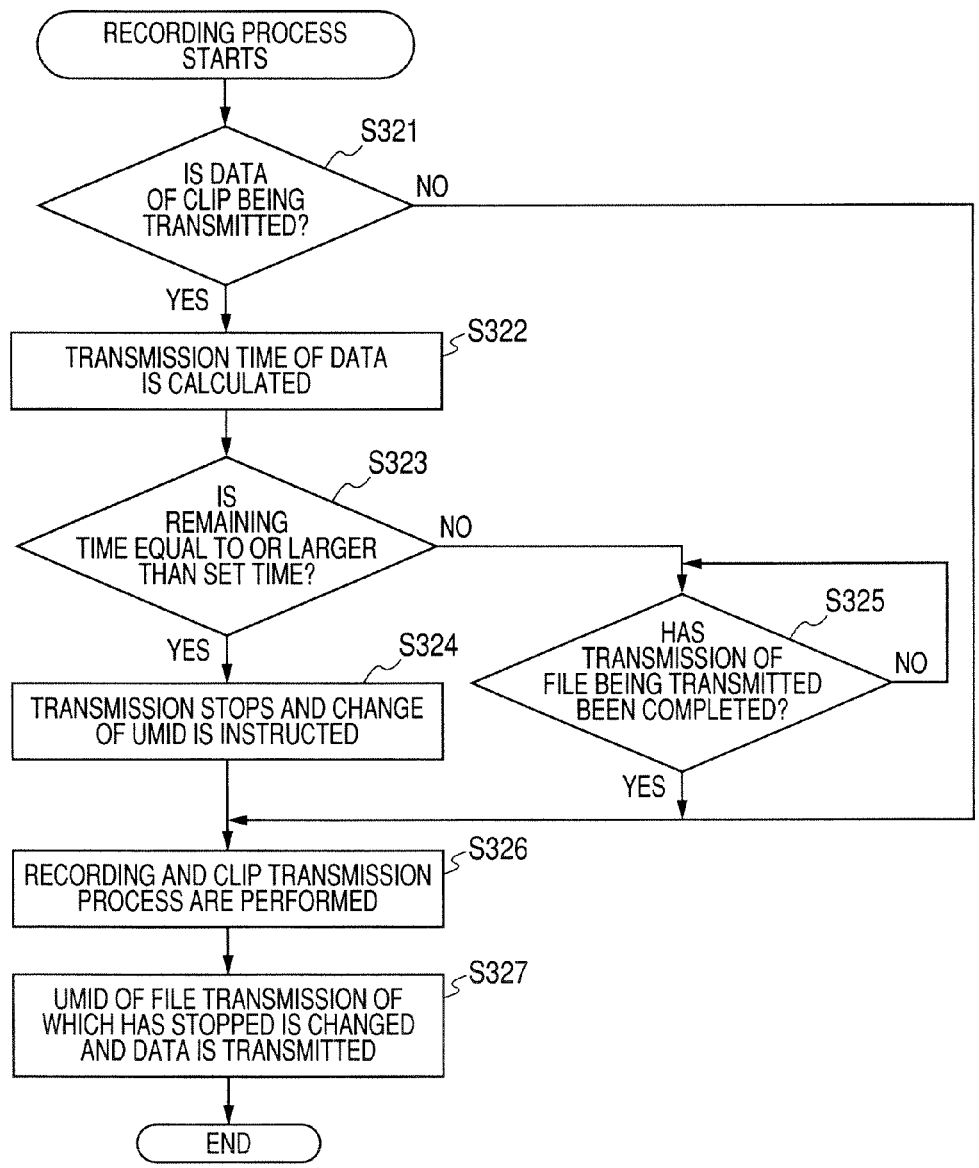
FIG. 36 is a flow chart explaining another recording process.

Next, referring to FIG. 36, it will be described about a recording process in which the camcorder information transmission unit 291 records data of each clip, which is obtained as a result of shoot, under the condition in which 'transmitting later as separate file' of the item 'handling of a file being transmitted when recording starts' is selected in the transmission mode. The recording process starts, for example, when a control signal that is used to record a clip and is supplied from the material utilization apparatus 29 is supplied to the control unit 403.

Figure 35:
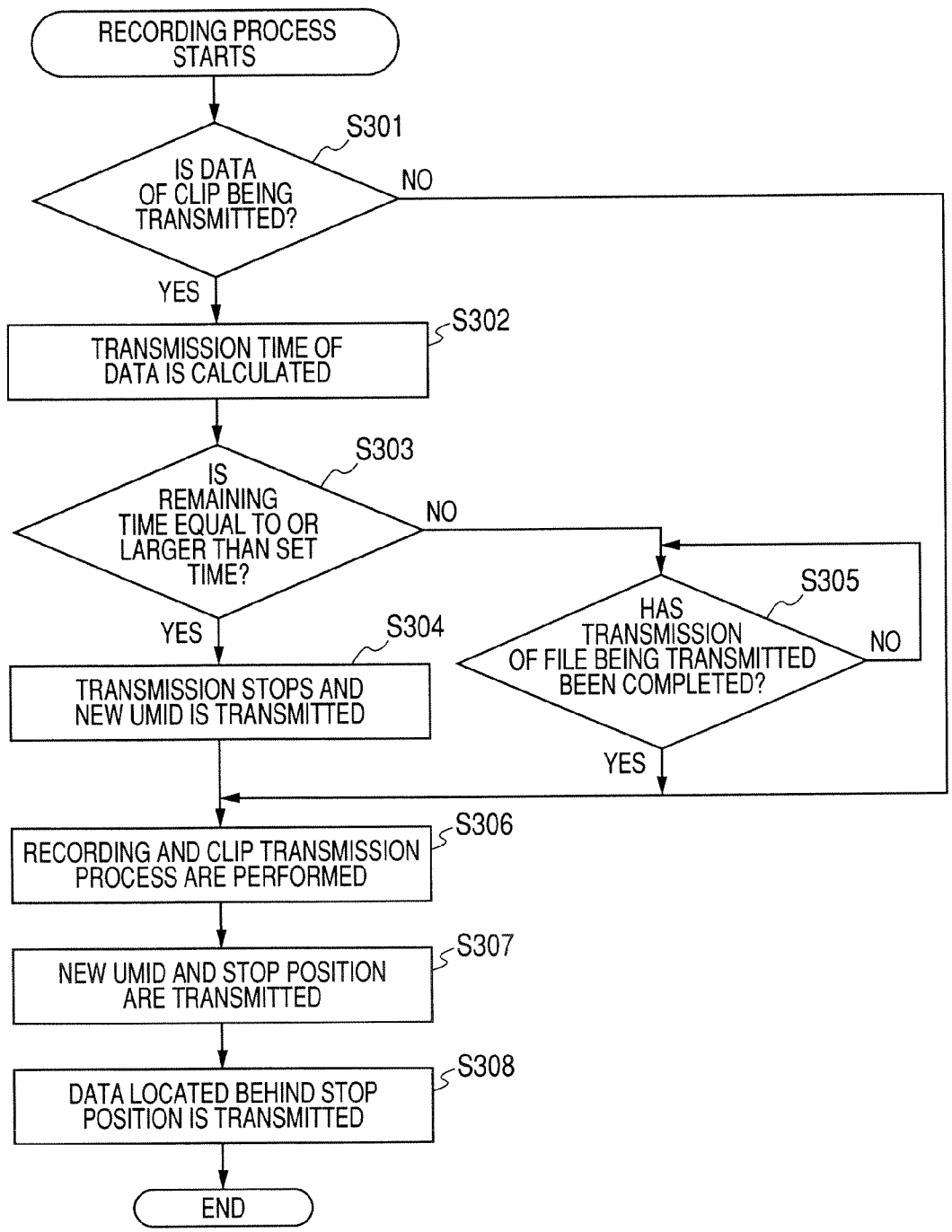
FIG. 35 is a flow chart explaining a recording process.

Processes in steps S321 to S323 and step S325 are the same as those in the steps S301 to S303 and S305 of FIG. 35, and an explanation thereof will be omitted.

In step S324, the transmission unit 400 stops the transmission and stores the stop position, and commands the material utilization apparatus 29 to change an instance number of UMID of the file of the clip, the transmission of which has stopped, to a number indicating the stop. In response to the command, the data acquisition unit 324 of the material utilization apparatus 29 changes the instance number of UMID of the file of the clip the transmission of which has stopped, which is received from the transmission unit 400 and stored in the data recording unit 325, to the number indicating the stop.

After the step S324, the process proceeds to step S326 in which the control unit 403 records the clip obtained as a result of shoot in the removable media 331, controls the transmission unit 400, and performs the file transmission process (refer to FIG. 19) on the clip.

After the step S326, the process proceeds to step S327 in which the transmission unit 400 changes UMID of the file, the transmission of which has stopped, and transmits to the material utilization apparatus 29 data of the file from the beginning, completing the process.

Then, the data acquisition unit 324 of the material utilization apparatus 29 records a file transmitted from the transmission unit 400 in the data recording unit 325, as a file different from the file the transmission of which has stopped.

In addition, in the item 'handling of a file being transmitted when recording starts' of the transmission mode, it may be possible to prepare an option of 'interrupt' in which transmission of the file being transmitted at the start of recording is still performed and the recording starts. If the option 'interrupt' is selected, the transmission unit 400 still performs the transmission of the file being transmitted at the start of recording and the control unit 403 records the clip obtained as a result of the shoot in the removable media 33, but a file transmission process on the clip is not performed. That is, the clip obtained as a result of the shoot is recorded but not transmitted.

Figure 37:
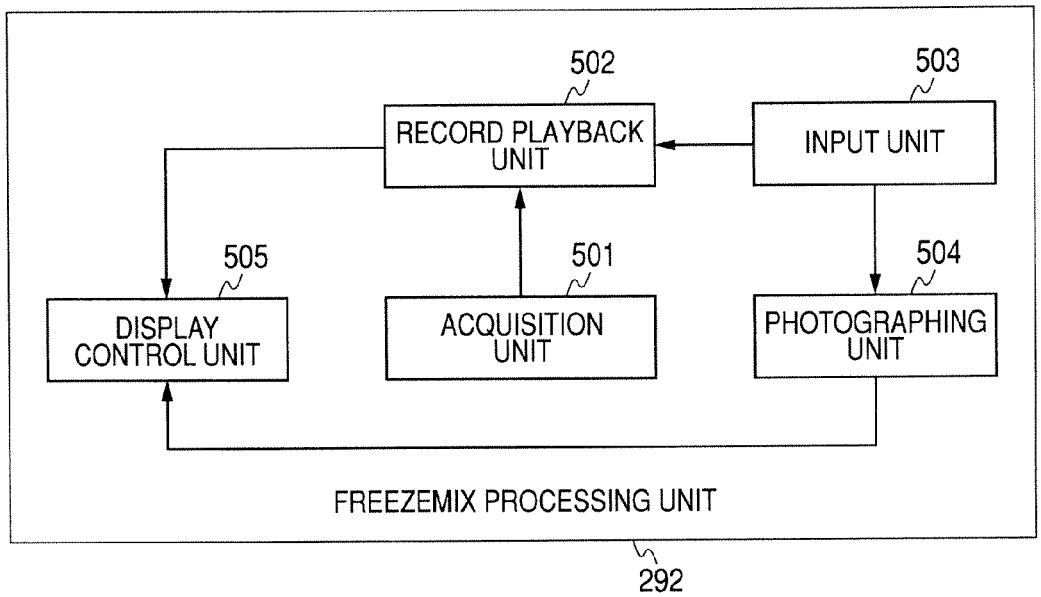
FIG. 37 is a block diagram illustrating an example of the specific configuration of a FreezeMix processing unit.

FIG. 37 is a block diagram illustrating an example of the specific configuration of the FreezeMix processing unit 292 shown in FIG. 12.

The FreezeMix processing unit 292 shown in FIG. 37 is configured to include an acquisition unit 501, a recording and reproduction unit 502, an input unit 503, a photographing unit 504, and a display control unit 505. In addition, the acquisition unit 501 corresponds to, for example, the communication block 53 shown in FIG. 3, and the recording and reproduction unit 502 corresponds to, for example, the recorder block 52 shown in FIG. 3. The input unit 503 corresponds to, for example, the operation unit 81, and the photographing unit 504 and the display control unit 505 correspond to, for example, the microcomputer 83.

The acquisition unit 501 acquires, as information on photographing of a sampling image, data on a FreezeMix image (hereinafter, referred to as 'FreezeMix data'), which has been transmitted from the FreezeMix transmission unit 312 (refer to FIG. 14) of the material utilization apparatus 29, and then supplies the acquired data to the recording and reproduction unit 502. In addition, the FreezeMix data includes grouping metadata of the FreezeMix image, image data, non-real-time metadata, and real-time metadata.

The recording and reproduction unit 502 records the FreezeMix data supplied from the acquisition unit 501 in the removable media 33. Further, on the basis of a designation signal designating a frame (hereinafter, referred to as a 'target frame') of a FreezeMix image, which is supplied from the input unit 503 and designated as an object of the FreezeMix by user, the recording and reproduction unit 502 reproduces image data of the target frame of the FreezeMix image from the removable media 33 and then supplies the data to the display control unit 505.

The input unit 503 receives an operation of designating, for example, a frame of a FreezeMix image that the user wants as a target frame of FreezeMix and then supplies a designation signal to the recording and reproduction unit 502 in correspondence with the operation. In addition, the input unit 503 receives a photographing instruction from the user and supplies the instruction to the photographing unit 504.

The photographing unit 504 acquires an image of a photographic subject and supplies the acquired image to the display control unit 505. Furthermore, the photographing unit 504 records the acquired image in the removable media 33 according the photographing instruction supplied from the input unit 503.

The display control unit 505 controls the display on the basis of the image data of the target frame of the FreezeMix image supplied from the recording and reproduction unit 502, translucently displays the target frame on the viewfinder 80, and displays an image form the photographing unit 504 on the viewfinder 80.

Figure 38:
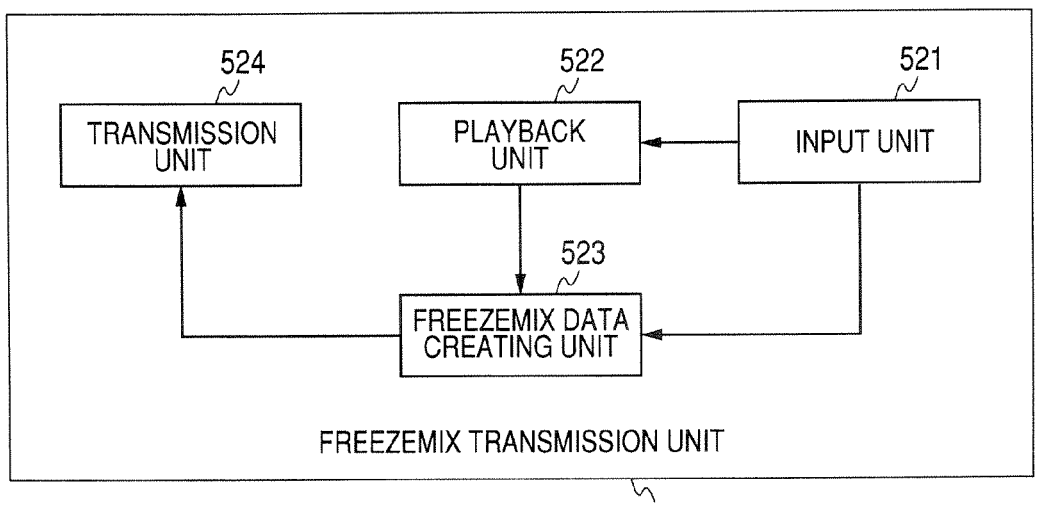
FIG. 38 is a block diagram illustrating an example of the specific configuration of a FreezeMix transmission unit.

FIG. 38 is a block diagram illustrating an example of the specific configuration of the FreezeMix transmission unit 312 shown in FIG. 14.

The FreezeMix transmission unit 312 shown in FIG. 38 is configured to include an input unit 521, a reproduction unit 522, a FreezeMix data creating unit 523, and a transmission unit 524. The input unit 521 corresponds to, for example, the input unit 206 shown in FIG. 4, and the reproduction unit 522 and the FreezeMix data creating unit 523 correspond to, for example, the CPU 201. In addition, the transmission unit 524 corresponds to the communication unit 209, for example.

The input unit 521 receives an operation of selecting a target frame of a FreezeMix image from a user and then supplies a selection signal indicating the selection to the reproduction unit 522 and the FreezeMix data creating unit 523. In addition, the input unit 521 receives an operation from the user and supplies an operation signal indicating the operation to the FreezeMix data creating unit 523.

The reproduction unit 522 reproduces data of each clip, which corresponds to the FreezeMix image indicated by the selection signal, from the recording unit 208 according to the selection signal from the input unit 521, for example, and supplies the data to the FreezeMix data creating unit 523.

The FreezeMix data creating unit 523 creates FreezeMix data on the basis of the data of each clip from the reproduction unit 522 and the selection signal from the input unit 521 and then supplies the created FreezeMix data to the transmission unit 524. The transmission unit 524 transmits to the Freeze Mix processing unit 292 of the camcorder 21 the FreezeMix data supplied from the FreezeMix data creating unit 523.

Next, referring to FIG. 39, it will be described about an example of a screen which is displayed on the LCD 112 shown in FIG. 3 and on which a directory structure of files including a file of the FreezeMix data recorded in the removable media 33 shown in FIG. 1 is displayed. In addition, the same components as in FIG. 5 are denoted by the same reference numerals, and an explanation thereof will be omitted.

Figure 39:
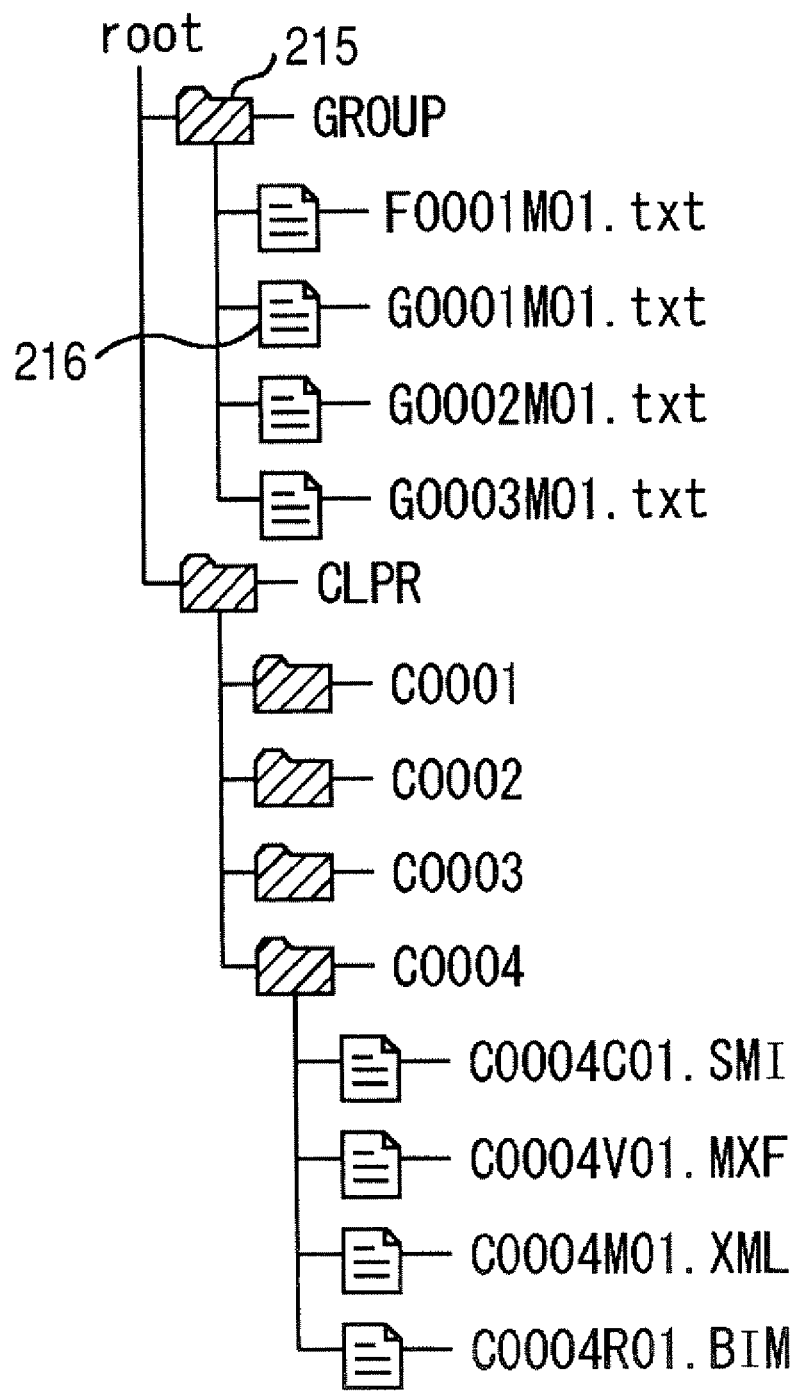
FIG. 39 is a view illustrating an example of a screen on which a directory structure of files including a file of FreezeMix data recorded in a removable media is displayed.

In the example shown in FIG. 39, the removable media 33 includes a group directory 215 and a clip root directory (CLPR) in the same manner as in FIG. 5.

In the GROUP directory 215, a FreezeMix metadata file, which is a file of grouping metadata (hereinafter, referred to as 'FreezeMix metadata') of a FreezeMix image, and grouping metadata files (G0001M01.txt to G0003M01.txt), which is the same as in FIG. 5, are provided.

Specifically, for example, FIG. 39 illustrates an example of a case in which image data of FreezeMix image of one group is recorded in the removable media 33, and FreezeMix metadata of the FreezeMix image is stored as a FreezeMix metadata file (F0001M01.txt).

Furthermore, in the clip root directory (CLPR), one clip directory (C0004) serving to manage data of a clip corresponding to a FreezeMix image is provided in addition to three clip directories (C0001 to C0003), which are the same as in FIG. 5.

In the clip directory (C0004), there are provided a master file (C0004C01.SMI) which is a file that manages the clip, an image file (C0004V01.MXF) which is a file including image data of the clip, a non-real-time metadata file (C0004M01.XML) which is a file including non-real-time metadata for which real time is not requested, for example, information on an electronic mark (essence mark) such as an electronic mark list, apparatus information on an apparatus that has acquired the clip, a camera set value at the time of shooting (acquiring) the clip, and shoot date, and a real-time metadata file (C0004R01.BIM) which is a file including real-time metadata of the clip for which real time is requested.

In addition, the electronic mark is data indicating the characteristic of an image and is used herein to specify a target frame of a FreezeMix image.

Next, it will be described about the FreezeMix data with reference to FIG. 40.

As shown in FIG. 40, the FreezeMix metadata is described in the same manner as grouping metadata.

Specifically, in the example shown in FIG. 40, subsequent to a 'title' indicating an item 'group title', 'Mt. Fuji' that is contents of the item 'group title' is described in the FreezeMix metadata. Subsequently, 'category' indicating an item 'classification', 'FreezeMix' indicating a FreezeMix image that is contents of the item 'classification', 'original' indicating an item 'original', and 'No', which is contents of the item 'original', indicating no original data are sequentially described in this order.

Subsequently, in the same manner, 'date created' indicating an item 'group creating date', '2004/8/16' that is contents of the item 'group creating date', 'date directed' indicating an item 'prearrangement' of an item 'shoot date', '2004/8/31' that is contents of the item 'prearrangement', 'date carried out' indicating an item 'execution' of the item 'shoot date', '2004/8/31' that is contents of the item 'execution', 'place directed' indicating an item 'prearrangement' of an item 'shoot place', 'Lake Yamanaka plain' that is contents of the item 'prearrangement', 'place carried out' indicating an item 'execution' of the item 'shoot place', and 'Lake Yamanaka plain' that is contents of the item 'execution' are sequentially described in this order.

In addition, subsequently, 'person directed' Indicating an item 'prearrangement' of an item 'photographer', 'Koizumi, Okada' that is contents of the item 'prearrangement', 'person carried out' indicating an item 'execution' of the item 'photographer', 'Koizumi, Okada' that is contents of the item 'execution', 'description directed' indicating an item 'instruction' of an item 'details of photographing', 'XXXX' that is contents of the item 'instruction', 'description occurred' indicating an item 'actual (memo)' of the item 'details of photographing', and 'XXXX' that is contents of the item 'actual (memo)' are sequentially described in this order.

In addition, subsequently, 'file title' indicating an item 'title' of an item 'shoot material (file)', 'Mt. Fuji viewed from Lake Yamanaka' that is a title of a first file of a FreezeMix image classified as a group among contents of the item 'title', 'file ID' indicating an item 'UMID' of the item 'shoot material', 'XXXX' that is a UMID of a first file among contents of the item 'UMID', 'memo' indicating an item 'memo' of the item 'shoot material', and 'XXXX' that is contents of the item 'memo' are sequentially described in this order.

In addition, subsequently, in the same manner as for the first file, items 'title', 'UMID', 'memo', and contents thereof corresponding to files subsequent to the first file are described.

Next, referring to FIGS. 41 and 42, it will be described about a screen for designating a target frame of a desired FreezeMix image of FreezeMix images recorded in the removable media 33.

The screen shown in FIG. 41 is a screen for designating a desired FreezeMix image as an object of FreezeMix.

On the basis of FreezeMix metadata of the FreezeMix metadata file (F0001M01.txt) recorded in the removable media 33, contents of an item 'group title' of FreezeMix metadata are displayed as a group name on a first line of the screen. In an example shown in FIG. 41, on the basis of the FreezeMix metadata shown in FIG. 40, 'Mt. Fuji' that is the contents of the item 'group title' is displayed as a group name.

Furthermore, below the group name, a list in which contents of the item 'title' of the item 'shoot material' of the FreezeMix metadata are arranged is displayed as a clip list of FreezeMix images. Specifically, in the example shown in FIG. 41, a clip list arranged with 'Mt. Fuji viewed from Lake Yamanaka', 'Mt. Fuji viewed from Lake Kawaguchi', 'Mt. Fuji viewed from Lake Sai', 'Mt. Fuji viewed from Lake Shoji', 'Mt. Fuji viewed from Lake Motosu', and 'Mt. Fuji viewed from Lake Osezaki', which are contents of the 'title' of the item 'shoot material', is displayed.

Moreover, a mark ● is displayed on a left end of the clip list. A user operates the input unit 503 shown in FIG. 37 to move the mark ● to the position corresponding to a desired title, and thus a FreezeMix image corresponding to the title can be designated as an object of FreezeMix. In the example shown in FIG. 41, a FreezeMix image corresponding to 'Mt. Fuji viewed from Lake Yamanaka' is designated by a user.

Further, on the screen shown in FIG. 41, a clip reproduction button 541 is displayed on a lower right portion. The reproduction button 541 is operated to reproduce the FreezeMix image designated by using the mark ●.

When the user selects the group title 'Mt. Fuji viewed from Lake Yamanaka' and then operates the clip reproduction button 541, an image shown in FIG. 42 is displayed on the viewfinder 80 shown in FIG. 3.

Figure 42:
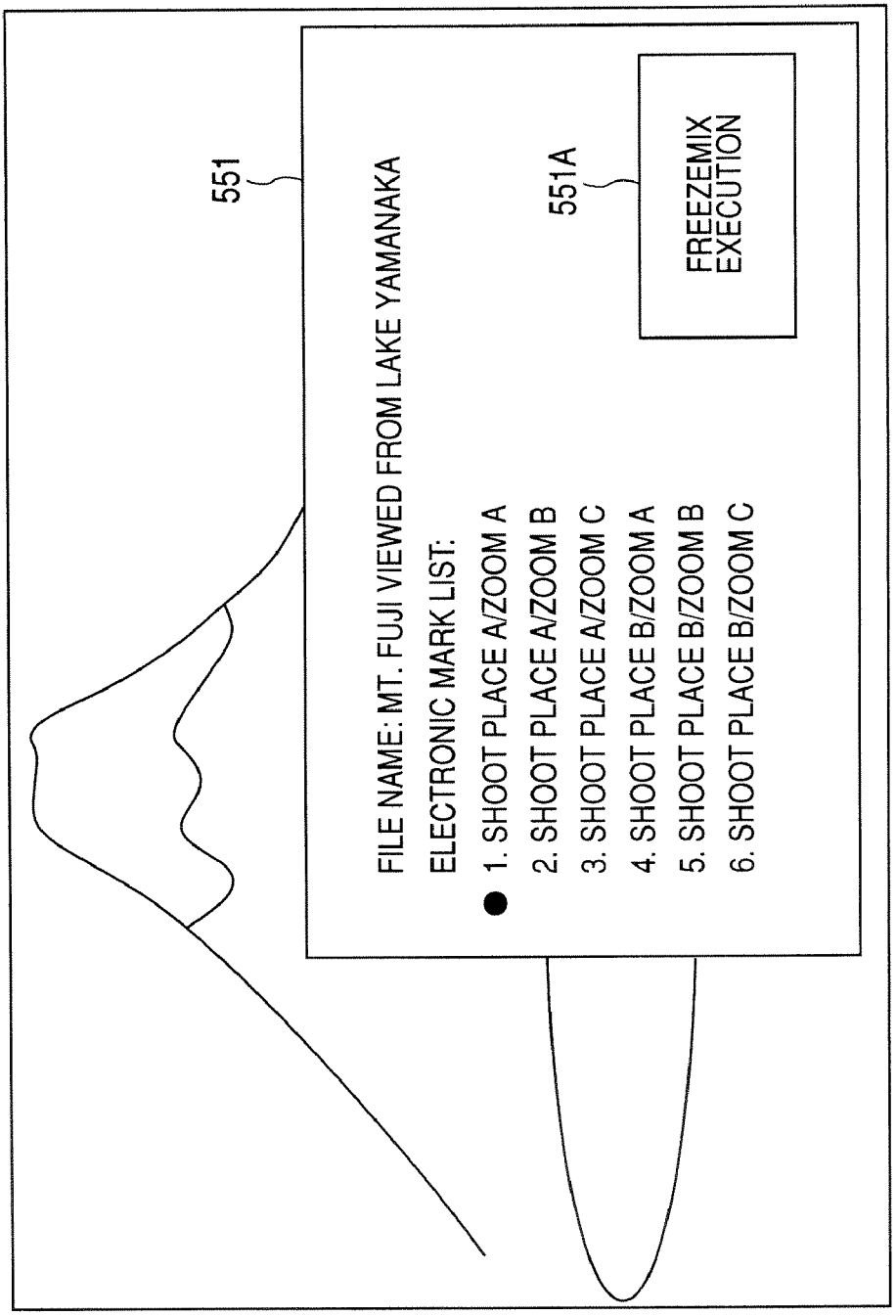
FIG. 42 is a view illustrating another example of a screen for designating a FreezeMix image.

That is, as shown in FIG. 42, a FreezeMix image corresponding to FreezeMix metadata including 'Mt. Fuji viewed from Lake Yamanaka' in the contents of the item 'title' of the item 'shoot material' is displayed on the viewfinder 80.

Thereafter, when the user operates the input unit 503 to instruct the display the electronic mark list, an electronic mark list display unit 551 is displayed on the basis of an electronic mark list included in non-real-time metadata corresponding to a FreezeMix image, as shown in FIG. 42.

Specifically, the recording and reproduction unit 502 reproduces an image file of a clip of the FreezeMix image on the basis of contents of an item 'UMID' of FreezeMix metadata whose contents of the item 'group title' are 'Mt. Fuji viewed from Lake Yamanaka', and then supplies the image file to the display control unit 505. In addition, the recording and reproduction unit 502 extracts an electronic mark list from a non-real-time metadata file corresponding to the image file and the supplies the extracted electronic mark list to the display control unit 505. The display control unit 505 displays an image and the electronic mark list display unit 551 on the basis of the image file and the electronic mark list supplied from the recording and reproduction unit 502.

In the example shown in FIG. 42, on the basis of metadata of a frame specified by an electronic mark registered in the electronic mark list of non-real-time metadata, a list of information (hereinafter, referred to as 'frame information') indicating a mode of zoom and the shoot place of the frame is displayed on the electronic mark list display unit 551 as an electronic mark list. Here, metadata of a frame refers to metadata, included in non-real-time metadata, in a unit of frame. As the metadata of a frame, for example, information indicating the shoot place, a camera set value, or a title of a frame is recorded.

Moreover, a mark ● is displayed on a left end of the electronic mark list. The user operates the input unit 503 shown in FIG. 37 to move the mark ● to the position corresponding to desired frame information, and thus a frame corresponding to the frame information can be designated as a target frame. In the example shown in FIG. 42, a frame corresponding to 'shoot place A/zoom A', which is frame information, is designated by the user.

In addition, on the electronic mark list display unit 551, a FreezeMix execution button 551A is displayed on a lower right portion. The FreezeMix execution button 551A is operated when performing FreezeMix with respect to a target frame designated by using the mark ●.

Moreover, in FIG. 42, the shoot place and the mode of zoom are displayed on the electronic mark list as frame information; however, a title of the frame may be displayed as frame information.

Next, a process of transmitting FreezeMix data will be described with reference to FIG. 43.

First, a workflow of a user that uses the material utilization apparatus 29 will be described.

In step S401, the user selects an image file of a FreezeMix image. Specifically, in step S421, the user operates the input unit 521 shown in FIG. 38 to display the screen (refer to FIG. 8) on which the directory structure of files recorded in the recording unit 208, which is shown in FIG. 4, is displayed. Then, the user selects a desired image file within the clip directory 240 on the screen and then causes the selected file to be reproduced (displayed) as an image file of a FreezeMix image.

After the step S401, the process proceeds to step S402 in which the user operates the input unit 521 while viewing the FreezeMix image that is currently displayed, such that a desired frame is selected as a target frame.

After the step S402, the process proceeds to step S403 in which the user operates the input unit 521 to input a title or an instruction with respect to the frame selected in the step S402.

After the step S403, the process proceeds to step S404 in which the user selects the camcorder 21 that performs FreezeMix and transmits FreezeMix data. Specifically, in step S422 the user operates the input unit 521 to display the screen (refer to FIG. 8) on which the directory structure of files recorded in the recording unit 208 is displayed. Then, the user selects the camcorder directory 233 of the desired camcorder 21 and arranges a clip directory of a FreezeMix image and a FreezeMix metadata file in the record image directory 252.

Next, a process of the material utilization apparatus 29 will be described.

In step S441, the reproduction unit 522 reproduces the clip directory 240 and the grouping metadata file 239 corresponding to the image, which is selected as a FreezeMix image by the user on the basis of the selection signal corresponding to a user's operation on the input unit 521 in the step S421, and supplies the clip directory 240 and the grouping metadata file 239 to the FreezeMix data creating unit 523.

After the step S441, the process proceeds to step S442 in which the reproduction unit 522 reproduces an image file of the FreezeMix image on the basis of a selection signal supplied from the input unit 521 and then displays the image file on the output unit 207 shown in FIG. 4, proceeding to step S443.

In the step S443, on the basis of the selection signal corresponding to a user's operation on the input unit 521 in the step S402, the FreezeMix data creating unit 523 records an electronic mark list of an electronic mark, which specifies the frame selected by the user as a target frame, in the non-real-time metadata file of the clip directory 237 supplied from the reproduction unit 522.

After the step S443, the process proceeds to step S444 in which the FreezeMix data creating unit 523 records data indicating a title or an instruction of the target frame in the non-real-time metadata file on the basis of an operation signal indicating the user's operation on the input unit 521 in the step S403.

After the step S444, the process proceeds to step S445 in which the FreezeMix data creating unit 523 creates a FreezeMix metadata file and a clip directory of the FreezeMix image in the record image directory 252 of the camcorder directory 233 of the camcorder 21 selected by the user on the basis of an operation signal indicating the user's operation on the input unit 521 in the step S422. Specifically, the FreezeMix data creating unit 523 creates the FreezeMix metadata file in the group directory 253 of the record image directory 252 and creates the clip directory of the FreezeMix image in the clip root directory 254.

In addition, the FreezeMix data creating unit 523 creates the FreezeMix metadata file on the basis of the grouping metadata file 239 supplied from the reproduction unit 522 and then transmits to the camcorder 21, as FreezeMix data, the FreezeMix metadata file, an image file, a master file, a non-real-time metadata file, and a real-time metadata file of the FreezeMix image.

Figure 44:
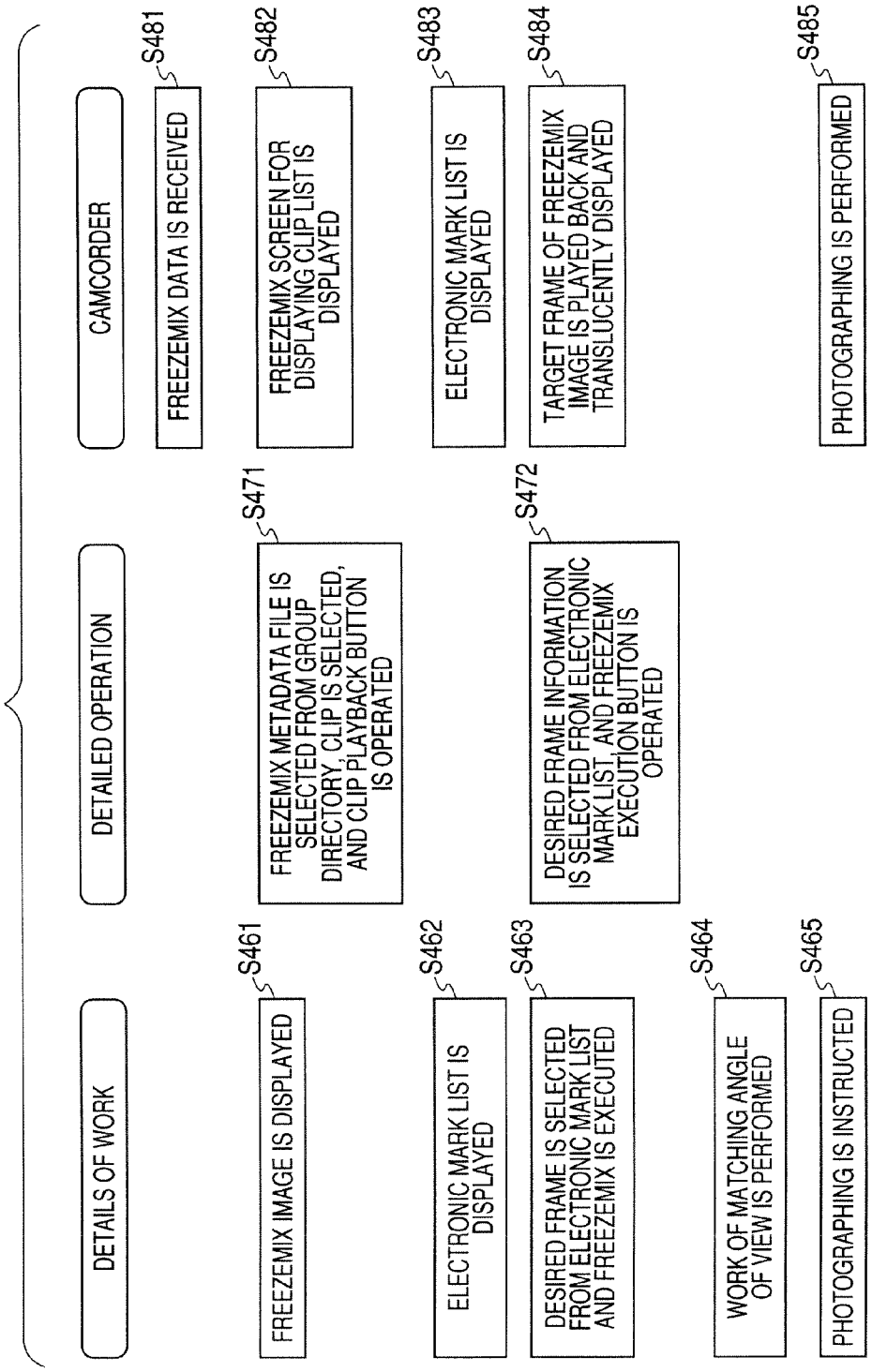
FIG. 44 is a view explaining a process of performing FreezeMix.

Next, a process of performing FreezeMix will be described with reference to FIG. 44.

First, a workflow of a user that uses the camcorder 21 will be described.

In step S461, the user displays a FreezeMix image on the viewfinder 80 shown in FIG. 3. Specifically, in step S471, the user operates the input unit 503 shown in FIG. 37 to display the screen (refer to FIG. 39) on which the directory structure of files recorded in the removable media 33 is displayed. Then, the user selects the desired FreezeMix metadata file (F0001M01.txt) from the group directory 215 displayed on the screen. Then, the user operates the input unit 503 while viewing the screen (refer to FIG. 41), which is displayed on the viewfinder 80 as a result of the selection, so as to select a desired clip of the clip list and then operates the clip reproduction button 541.

After the step S461, the process proceeds to step S462 in which the user operates the input unit 503 and displays the electronic mark list display unit 551. As a result, the screen shown in FIG. 42 is displayed on the viewfinder 80.

After the step S462, the process proceeds to step S463 in which the user selects, as a target frame, a desired frame from the electronic mark list displayed in the step S462 and causes FreezeMix to be executed. Specifically, in step S472, the user operates the input unit 503, selects frame information corresponding to a desired frame from the electronic mark list shown in FIG. 42, and operates the FreezeMix execution button 551A.

After the step S463, the process proceeds to step S464 in which the user performs a work of matching an angle of view (composition) of a FreezeMix image with an angle of view of an image currently being acquired (shot) by the photographing unit 504 while viewing the FreezeMix image displayed on the viewfinder 80 due to execution of FreezeMix. At this time, if necessary, the user sets a camera set value, which is included in metadata of a target frame to a camera set value in the current shoot. Thus, it is possible to photograph an image whose mood is considerably suitable for the target frame of the FreezeMix image.

After the step S464, the process proceeds to step S465 in which the user operates the input unit 503 to make a shoot instruction, thereby performing the shoot.

Next, a process of the camcorder 21 will be described.

Figure 43:
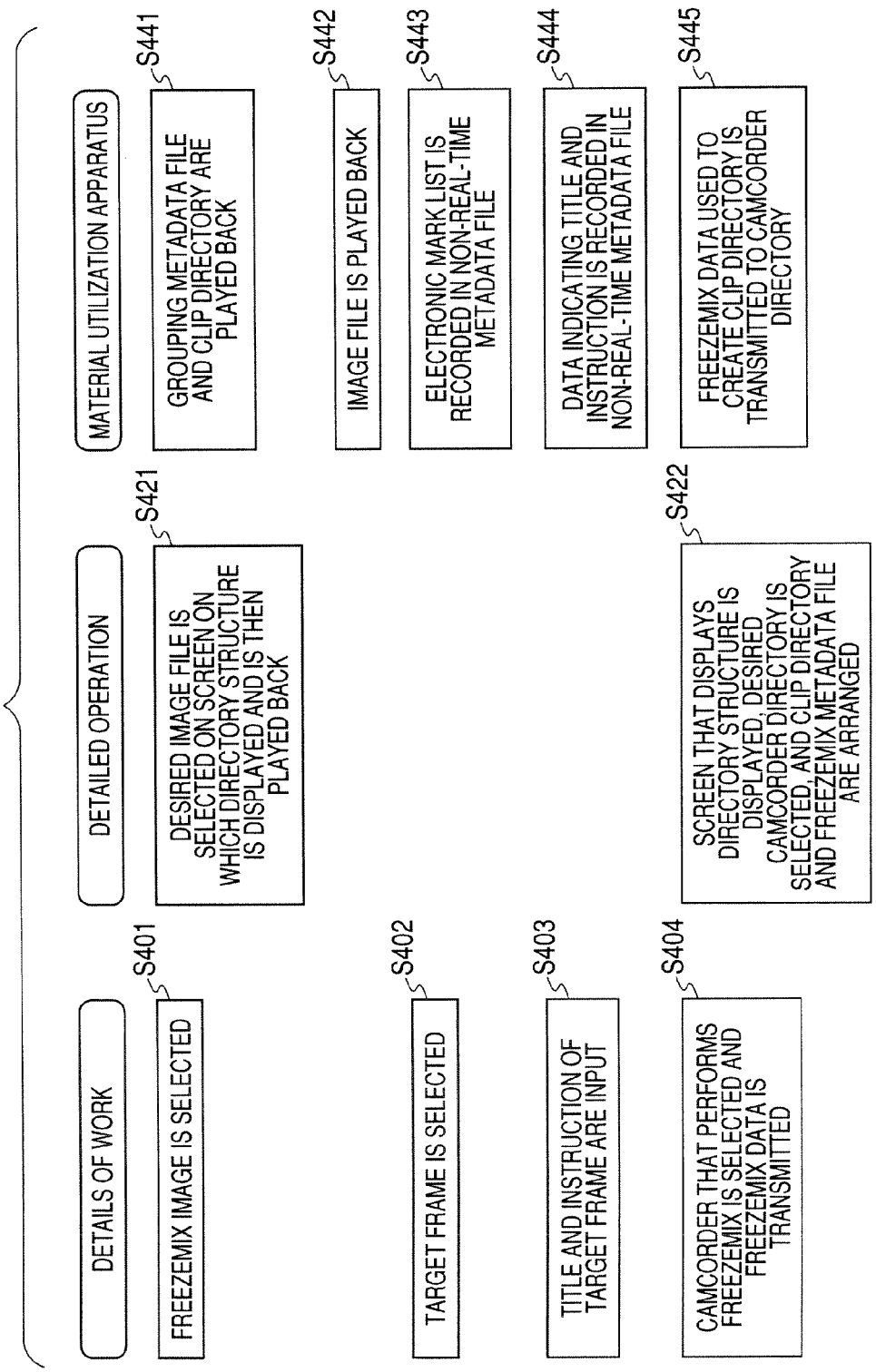
FIG. 43 is a view explaining a process of transmitting FreezeMix data.

In step S481, the acquisition unit 501 receives the FreezeMix data transmitted from the material utilization apparatus 29 in the step S445, which is shown in FIG. 43, and supplies the FreezeMix data to the recording and reproduction unit 502. The recording and reproduction unit 502 records the FreezeMix metadata file (F0001M01.txt) of the FreezeMix data, which has been supplied from the acquisition unit 501, in the group directory 215 (refer to FIG. 39) and records other files in the clip directory (C0004).

After the step S481, the process proceeds to step S482 in which the recording and reproduction unit 502 reproduces the FreezeMix metadata file of the FreezeMix image designated by the user on the basis of a designation signal corresponding to the user's operation on the input unit 503 in the step S471, controls the display control unit 505 on the basis of the FreezeMix metadata file, and displays the clip list on the viewfinder 80. That is, the recording and reproduction unit 502 displays the screen shown in FIG. 41.

Further, the recording and reproduction unit 502 displays the image file (C0004V01.MXF) of the clip directory (C0004) of the FreezeMix image designated by the user on the basis of the designation signal supplied from the input unit 503.

After the step S482, the process proceeds to step S483 in which the recording and reproduction unit 502 reproduces the non-real-time metadata file (C0004M01.XML) of the clip directory (C0004) of the FreezeMix image designated by the user on the basis of the designation signal supplied from the input unit 503, controls the display control unit 505 on the basis of the electronic mark list described in the non-real-time metadata file, and displays the electronic mark list display unit 551 on the viewfinder 80. As a result, the screen shown in FIG. 42 is displayed on the viewfinder 80.

After the step S483, the process proceeds to step S484 in which the recording and reproduction unit 502 reproduces image data of the target frame from the image file of the FreezeMix image on the basis of a designation signal corresponding to the user's operation on the input unit 521 in the step S472, controls the display control unit 505, and translucently displays the target frame of the FreezeMix image corresponding to the image data on the viewfinder 80.

After the step S484, the process proceeds to step S485 in which the photographing unit 504 performs the shoot according to a user's shoot instruction supplied from the input unit 503.

In addition, in the description made with reference to FIGS. 37 to 44, the user matches the angle of view of a FreezeMix image with the angle of view of an image currently being acquired. However, the color temperature of the image currently being acquired may be matched with that of a sample image and then an image having color tone close to that of the sample image may be acquired. In this case, for example, the sample image and the image currently being acquired are displayed as different screens on the viewfinder 80 and the user compares the sample image and the image currently being acquired so as to adjust the color temperature.

At this time, the display control unit 505 may display even a camera set value on the viewfinder 80 and the user may adjust the color temperature by referring to the camera set value displayed on the viewfinder 80.

As described above, since the FreezeMix image is translucently displayed on the viewfinder 80, the user may instruct the shoot, such that the angle of view of the image currently being acquired matches that of the FreezeMix image thereof, while viewing the FreezeMix image. As a result, it is possible to acquire (photograph) an image whose mood is similar to that of a sample image by using the FreezeMix image as the sample image.

Figure 45:
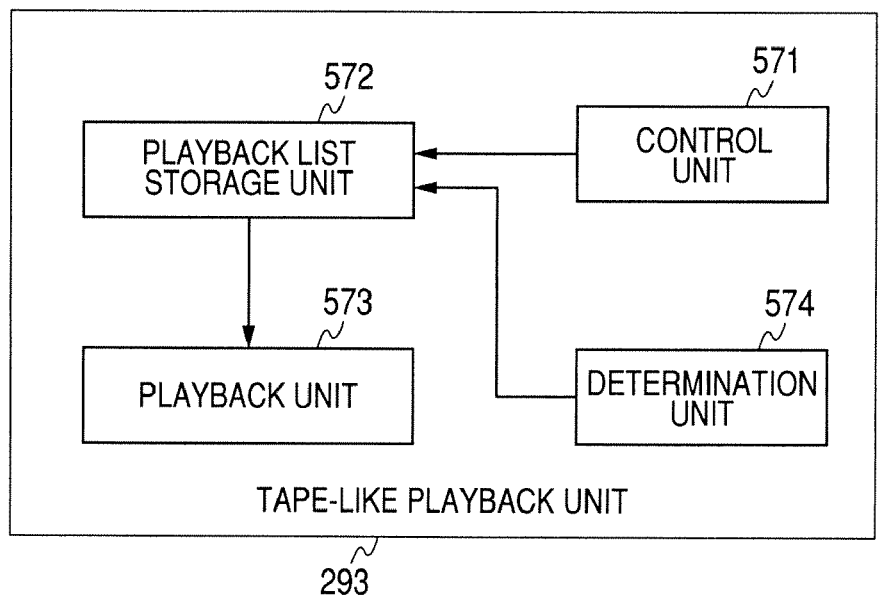
FIG. 45 is a view illustrating an example of the specific configuration of a tape-like reproduction unit.

FIG. 45 is a block diagram illustrating an example of the specific configuration of the tape-like reproduction unit 293 shown in FIG. 12.

The tape-like reproduction unit 293 shown in FIG. 45 is configured to include a control unit 571, a reproduction list storage unit 572, a reproduction unit 573, and a determination unit 574. In addition, the control unit 571, the reproduction list storage unit 572, the reproduction unit 573, and the determination unit 574 correspond to the microcomputer 106 shown in FIG. 3, for example.

The control unit 571 detects (determines) whether or not a new clip has been recorded in the removable media 33 and reads out a UMID of the newly recorded clip from the removable media 33. The control unit 571 supplies the UMID to the reproduction list storage unit 572. The reproduction list storage unit 572 stores a reproduction list that is a list of clip to be reproduced In addition, the reproduction list storage unit 572 registers the UMID supplied from the control unit 571 in the reproduction list.

The reproduction unit 573 reads out the reproduction list from the reproduction list storage unit 572. In addition, the reproduction unit 573 reproduces a clip from the removable media 33 in a tape-like manner on the basis of the reproduction list and supplies an image or sound corresponding to the clip.

The determination unit 574 determines whether or not the UMID registered in the reproduction list of the reproduction list storage unit 572 is a UMID of a clip of a FreezeMix image on the basis of the FreezeMix metadata file (F0001M01.txt) recorded in the removable media 33 and deletes the UMID of the clip of the FreezeMix image.

Next, the deletion of a UMID performed by the determination unit 574 will be described with reference to FIGS. 46A and 46B.

Figure 46A:
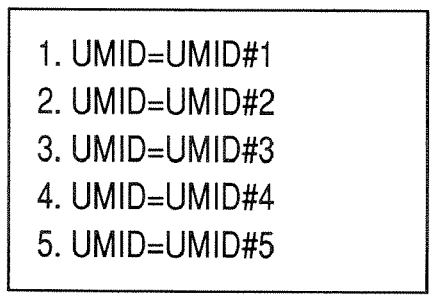
FIG. 46A is a view illustrating an example of a reproduction list.
Figure 46B:
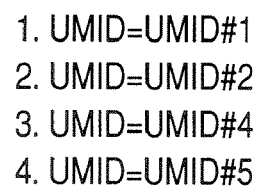
FIG. 46B is a view illustrating an example of a reproduction list.

First, it is assumed that a reproduction list shown in FIG. 46A is stored in the reproduction list storage unit 572. That is, UMID #1 to UMID #5 are registered in the reproduction list stored in the reproduction list storage unit 572.

Here, if the determination unit 574 determines that the UMID of the clip of the FreezeMix image is the UMID #3 on the basis of the FreezeMix metadata file (F0001M01.txt) recorded in the removable media 33, the determination unit 574 deletes the UMID #3 of the reproduction list shown in FIG. 46A. As a result, the reproduction list stored in the reproduction list storage unit 572 becomes a reproduction list shown in FIG. 46B.

Figure 47:
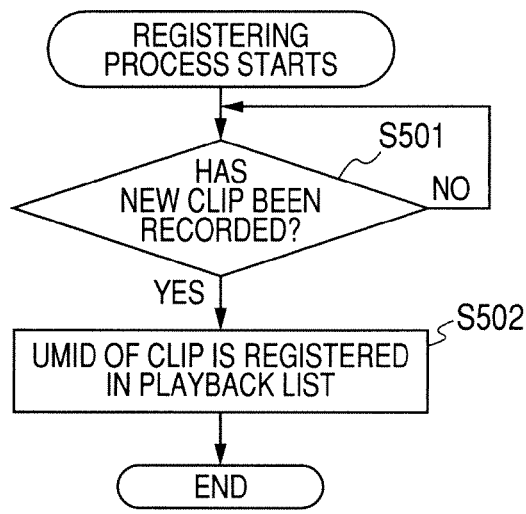
FIG. 47 is a flow chart explaining a registration process.

Next, referring to FIG. 47, it will be described about a registration process in which the tape-like reproduction unit 293 registers an UMID in the reproduction list.

In step S501, the control unit 571 determines whether or not a new clip has been recorded in the removable media 33. If it is determined that the new clip has not been recorded, the control unit 571 waits until it is determined that the new clip has been recorded.

On the other hand, in the step S501, if it is determined that the new clip has been recorded, the control unit 571 supplies a UMID of the clip to the reproduction list storage unit 572, proceeding to step S502. In the step S502, the reproduction list storage unit 572 registers the UMID of the clip supplied from the control unit 571 in the reproduction list, completing the process.

Figure 48:
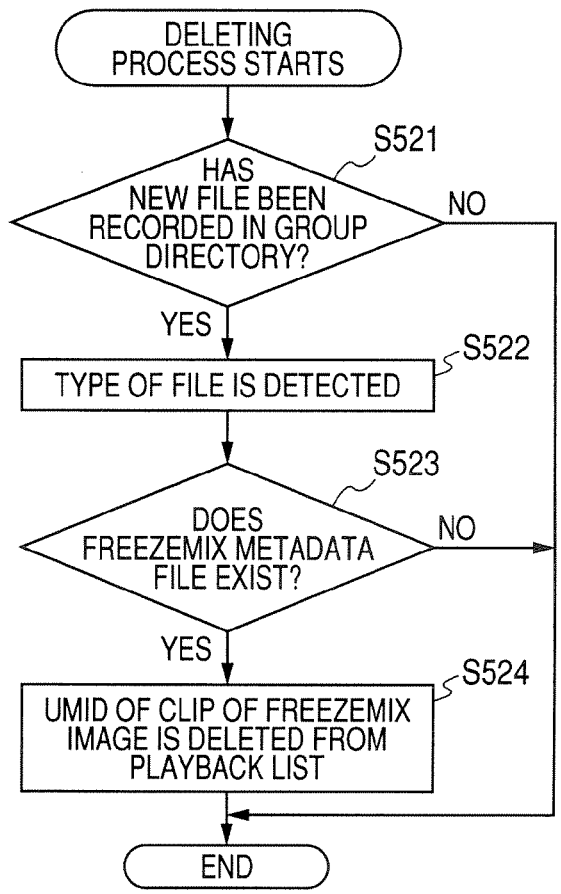
FIG. 48 is a flow chart explaining a deletion process.

Next, referring to FIG. 48, it will be described about a flow chart explaining a deletion process in which the tape-like reproduction unit 293 shown in FIG. 45 deletes a UMID from the reproduction list. For example, the deletion process starts when a new UMID is registered in the reproduction list in the step S502 shown in FIG. 47.

In step S521, the determination unit 574 determines whether or not a new file has been recorded in the group directory 215 (refer to FIG. 39) of the removable media 33. If it is determined that the new file has not been recorded, the process is completed.

On the other hand, in the step S521, if it is determined that the new file has been recorded in the group directory 215 of the removable media 33, the process proceeds to step S522. In the step S522, the determination unit 574 detects the type (FreezeMix metadata file, grouping metadata file) of the file, proceeding to step S523.

In the step S523, the determination unit 574 determines whether or not a FreezeMix metadata file exists in files which have been newly recorded in the group directory 215. If it is determined that there is no FreezeMix metadata file, the process is completed.

On the other hand, in the step S523, if it is determined that the FreezeMix metadata file exist, the process proceeds to step S524. In the step S524, the determination unit 574 detects a UMID of a clip of the FreezeMix image on the basis of the FreezeMix metadata file and deletes the UMID from the reproduction list of the reproduction list storage unit 572.

Next, the communication between the camcorder 21 and the material utilization apparatus 29 will be described with reference to FIGS. 49 to 51.

FIG. 49 is a block diagram illustrating an example of the configuration of a function of the camcorder 21 that performs communication with the material utilization apparatus 29. In other words, FIG. 49 illustrates the transmission unit 306 (400) and the receiving unit 307 of the camcorder information transmission unit 291 shown in FIG. 12 and all or part of the acquisition unit 501 shown in FIG. 37.

The camcorder 21 shown in FIG. 49 is configured to include a detection unit 601, a transmission determining unit 602, a reception determining unit 603, and a power control unit 604. In addition, the detection unit 601, a transmission determining unit 602, a reception determining unit 603, and a power control unit 604 correspond to the microcomputer 134 shown in FIG. 3, for example.

The detection unit 601 detects the access point 23 and supplies a result of the detection to the transmission determining unit 602. The transmission determining unit 602 transmits to the material utilization apparatus 29 data (for example, state information or data of each clip) to be transmitted, according to the detection result from the detection unit 601. The transmission determining unit 602 notifies the power control unit 604 that there is data to be transmitted and notifies the reception determining unit 603 that transmission has been completed or there is no data to be transmitted.

The reception determining unit 603 receives data (for example, FreezeMix data) transmitted from the material utilization apparatus 29 according to the notification from the transmission determining unit 602. The reception determining unit 603 notifies the power control unit 604 that there is data transmitted from the material utilization apparatus 29 and the reception has been completed or there is no data transmitted from the material utilization apparatus 29.

The power control unit 604 creates a power control signal, which is used to control the supply of power to the recorder block 52, according to the detection result from the detection unit 601 or the notification from the transmission determining unit 602 or the reception determining unit 603 and then supplies the created power control signal to the power block 54.

Next, referring to FIG. 50, it will be described about a power control process in which the camcorder 21 controls the supply of power to the recorder block 52. The power control process starts, for example, when power of the camcorder 21 is turned on, that is, power is supplied to the power unit 151.

In step S601, the detection unit 601 detects the access point 23 shown in FIG. 1 and supplies a result of the detection to the transmission determining unit 602, proceeding to step S602. In the step S602, the detection unit 601 determines whether or not it has been possible to detect the access point 23 and then supplies a result of the determination to the transmission determining unit 602. In the step S601, if it is determined that it has not been possible to detect the access point 23, the detection unit 601 waits until it is possible to detect the access point 23.

On the other hand, in the step S602, if it is determined that it has been possible to detect the access point 23, the process proceeds to step S603. In the step S603, the transmission determining unit 602 starts the connection to the network 31 through the access point 23, proceeding to step S604.

In the step S604, the transmission determining unit 602 requests the start of communication of the material utilization apparatus 29, proceeding to step S605.

In the step S605, the transmission determining unit 602 determines whether or not data to be transmitted exists. If it is determined that data to be transmitted exists, the process proceeds to step S606.

In the step S606, the power control unit 604 creates a power control signal for turning on the power of the recorder block 52 and then supply the created power control signal to the power block 54. As a result, the power of the recorder block 52 is turned on, proceeding to step S607. In the step S607, the transmission determining unit 602 notifies the material utilization apparatus 29 that there is data to be transmitted, proceeding to step S608.

In the step S608, the transmission determining unit 602 transmits notifies the data to be transmitted to the material utilization apparatus 29, proceeding to step S609. In the step S609, the transmission determining unit 602 determines whether or not all data to be transmitted has been completely transmitted. If it is determined that all data to be transmitted has not been completely transmitted, the process returns to the step S608 so as to repeat the processes described above.

In the step S609, if it is determined that all data to be transmitted has been completely transmitted, the process proceeds to step S610. In the step S610, the reception determining unit 603 determines whether or not there is data being received, that is, data being transmitted from the material utilization apparatus 29. In step S610, if it is determined that there is no data being received, the process proceeds to step S611. In the step S611, the power control unit 604 creates a power control signal for turning off the power of the recorder block 52 and then supply the created power control signal to the power block 54. As a result, the power of the recorder block 52 is turned off, completing the process.

On the other hand, in the step S605, if it is determined that there is no data to be transmitted, the process proceeds to step S612. In the step S612, the transmission determining unit 602 notifies the material utilization apparatus 29 that there is no data to be transmitted, proceeding to step S613.

In the step S613, the reception determining unit 603 determines whether or not there is data being received, that is, data being transmitted from the material utilization apparatus 29. If it is determined that there is data being received, the process proceeds to step S614.

In the step S614, the power control unit 604 turns on the power of the recorder block 52, proceeding to step S615. In the step S615, the reception determining unit 603 receives the data transmitted from the material utilization apparatus 29, proceeding to step S616.

In the step S616, the reception determining unit 603 determines whether or not all data transmitted from the material utilization apparatus 29 has been completely received. If it is determined that all data has not been completely received, the process returns to the step S615 so as to repeat the processes described above.

On the other hand, in the step S616, if it is determined that all data transmitted from the material utilization apparatus 29 has been completely received, the process proceeds to step S611. In the step S611, as described above, the power control unit 604 turns off the power of the recorder block 52, completing the process.

In addition, in the step S610, if it is determined that there is data being received, the process proceeds to step S615 in which the above process is performed.

In addition, in the step S613, if it is determined that there is no data being received, the process proceeds to the step S611 in which the above process is performed, while skipping the steps S614 to S616.

As described above, in the camcorder 21, in the case when the access point 23 is detected, the power of the recorder block 52 is turned on while data is being transmitted or received.

Further, in the camcorder 21, in the case when the access point 23 is not detected, that is, if it is difficult to perform the communication through the network 31, the power of the recorder block 52 that reproduces or records data, such as a clip, to be transmitted is turned off. As a result, it is possible to reduce the power consumption of the camcorder 21.

Furthermore, in the case when it is possible to detect an access point, the camcorder 21 automatically start connection to the network 31. Accordingly, a user does not need to instruct the start of connection to the network 31. As a result, it is possible to save user's time.

In addition, in the above description, the power of the recorder block 52, that is, power supplied to all units included in the recorder block 52 is turned on. However, only power supplied to a unit, which is used for recording or reproduction, of the recorder block 52 may be turned on. In this case, the power supplied to a unit used for reproduction is turned on when there is data to be transmitted, and the power supplied to a unit used for recording is turned on when there is data being received.

Next, referring to FIG. 51, it will be described about a communication process in which the material utilization apparatus 29 performs communication with the camcorder 21. In addition, the communication process is performed in the state acquisition unit 321, the data acquisition unit 324, and the control unit 328 of the camcorder information management unit 311 and the transmission unit 524 of the FreezeMix transmission unit 312, which are shown in FIG. 14. However, in FIG. 51, it is assumed that the communication process is performed in the state acquisition unit 321 for the convenience of explanation.

In step S651, the state acquisition unit 321 determines whether or not start of communication has been requested of the transmission determining unit 602 in the step S604 shown in FIG. 50. If it is determined that the start of communication has not been requested, the state acquisition unit 321 waits until the start of communication is requested.

On the other hand, in the step S651, if it is determined that the start of communication has been requested, the process proceeds to step S652. In the step S652, the state acquisition unit 321 starts the communication with the camcorder 21, proceeding to step S653.

In the step S653, the state acquisition unit 321 determines whether or not there is data being received, that is, it has been notified by the transmission determining unit 602 that there is data to be transmitted in the step S607 shown in FIG. 50. In the step S653, if it is determined that there is data being received, the process proceeds to step S654 in which the state acquisition unit 321 receives data transmitted from the transmission determining unit 602.

After the step S654, the process proceeds to step S655 in which the state acquisition unit 321 determines whether or not all data transmitted from the transmission determining unit 602 has been completely received. If it is determined that all data has not been completely received, the process returns to the step S654 so as to repeat the processes described above.

On the other hand, in the step S655, if it is determined that all data has been completely received, the process proceeds to step S656. In the step S656, the state acquisition unit 321 determines whether or not there is data to be transmitted to the camcorder 21. If it is determined that there is no data to be transmitted, the process proceeds to step S657.

In the step S657, the state acquisition unit 321 notifies the camcorder 21 that there is no data to be transmitted, completing the process.

On the other hand, if it is determined that there is no data being received in the step S653, the state acquisition unit 321 determines whether or not there is data to be transmitted to the camcorder 21 in the step S658, in the same manner as the step S656. If it is determined that there is data to be transmitted, the process proceeds to step S659.

In the step S659, the state acquisition unit 321 notifies the camcorder 21 that there is data to be transmitted. Thus, if it is notified to the camcorder 21 that there is data to be transmitted, it is determined that there is data being received in the step S610 or S613 shown in FIG. 50. After the step S659, the process proceeds to step S660 in which the state acquisition unit 321 transmits the data to be transmitted to the camcorder 21, proceeding to step S661. In the step S661, the state acquisition unit 321 determines whether or not all data to be transmitted has been completely transmitted. If it is determined that all data to be transmitted has not been completely transmitted, the process returns to the step S660 so as to repeat the processes described above.

On the other hand, in the step S661, if it is determined that all data to be transmitted has been completely transmitted, the process is completed. In addition, in the step S658, if it is determined that there is no data to be transmitted, the process proceeds to step S662. In the step S662, the state acquisition unit 321 notifies that there is no data to be transmitted, in the same manner as the step S657. Thus, if it is notified that there is no data to be transmitted in the step S657 or step S662, it is determined that there is no data being received in the step S610 or S613 shown in FIG. 50.

In addition, in the step S656, if it is determined that there is data to be transmitted, the process proceeds to step S659 in which the above process is performed.

Figure 51:
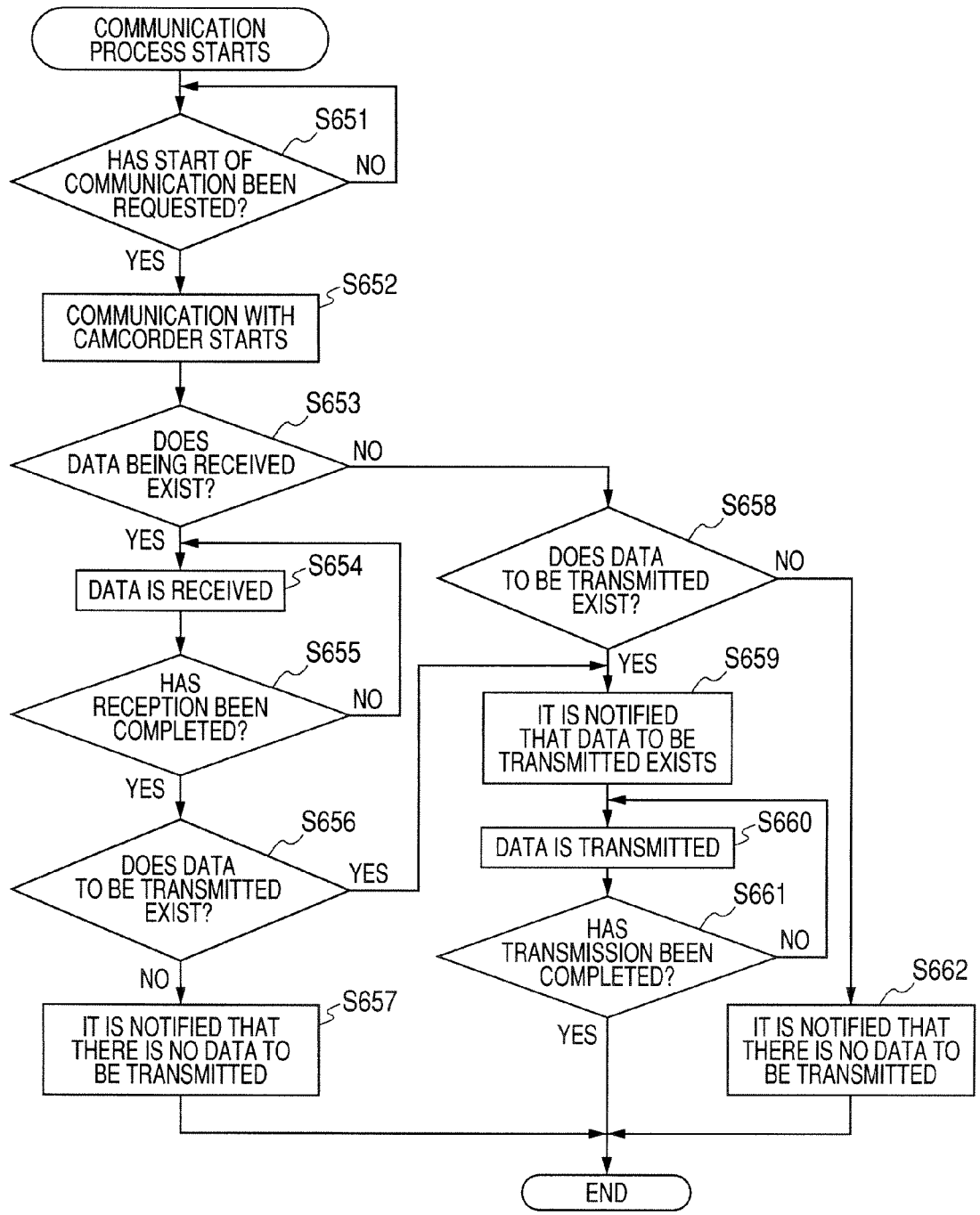
FIG. 51 is a flow chart explaining a communication process.

In the above description made with reference to FIGS. 49 to 51, when the detection unit 601 detects the access point 23, the transmission determining unit 602 automatically starts the connection to the network 31. However, the connection to the network 31 may start manually. That is, when the access point 23 is detected, the camcorder 21 notifies the user that an access point has been detected by the use of the LCD 122 shown in FIG. 3, and then when the user that has been notified instructs the start of connection to the network 31, the connection to the network 31 may start.

Further, the user may select whether to start the connection to the network 31 automatically or manually.

Furthermore, in the description described above, the item 'transmission history' is prepared in the grouping metadata shown in FIG. 6. However, the item 'transmission history' may not be prepared. In this case, for example, the transmission unit 306 (400) records data, which indicates that transmission has been completed, in the non-real-time metadata file (C0001M01.XML) of a clip the transmission of which has been completed or changes an instance number of a UMID of the clip the transmission of which has been completed.

Furthermore, on the item 'destination' (refer to FIG. 6) of the contents of the grouping metadata, an item 'FTP site URL' on which a URL of an FTP site is described may be prepared instead of the item 'website URL'.

As described above, in the camcorder 21, the detection unit 601 detects the access point 23 and when the access point 23 is detected by the detection unit 601, the power control unit 604 controls the supply of power such that power is supplied to the recorder block 52 that reproduces data, which is transmitted to the material utilization apparatus 29 through the access point 23, from the removable media 33, and in other cases, the power control unit 604 controls the supply of power such that the power is not supplied to the recorder block 52. Accordingly, in the case of reproducing data recorded in a recording medium and transmitting the data to another apparatus, it is possible to reduce the power consumption.

Further, in the present specification, a step of describing a program stored in a program recording medium includes a process of being performed in a time-sequential manner according to the described order. In addition, even if not necessarily performed in the time-sequential manner, the step also includes a process of being performed in parallel or independently.

Furthermore, in the present specification, the system refers to the entire apparatus including a plurality of apparatuses.

In addition, an embodiment of the present invention is not limited to those embodiments described above, but various modifications of the embodiment may be made without departing from the spirit or scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that transmits transmission data to another first information processing apparatus through an access point, comprising:
   a detection unit configured to detect the access point;
   a reproduction unit configured to reproduce the transmission data from a recording medium in which the transmission data is recorded;
   a transmission unit configured to transmit to the another first information processing apparatus the transmission data reproduced by the reproduction unit when the access point is detected by the detection unit; and
   a power control unit configured to control supply of power to the reproduction unit, wherein the power control unit controls the supply of power such that power is supplied to the reproduction unit when the access point is detected by the detection unit and power is not supplied to the reproduction unit in other cases.

2. The information processing apparatus according to claim 1, wherein, when the access point is detected by the detection unit, the power control unit makes a control such that power is supplied to the reproduction unit while the transmission unit is transmitting the transmission data.

3. The information processing apparatus according to claim 1, further comprising:
   a receiving unit configured to receive reception data from another second information processing apparatus when the access point is detected by the detection unit; and
   a recording control unit configured to cause the reception data received by the receiving unit to be recorded, wherein the power control unit also controls supply of power to the recording control unit, and when the access point is detected by the detection unit, the power control unit makes a control such that power is supplied to the recording control unit while the receiving unit is receiving the reception data.

4. An information processing method of an information processing apparatus including a reproduction unit configured to reproduce transmission data from a recording medium in which the transmission data transmitted to another information processing apparatus through an access point is recorded, comprising the steps of:
   detecting the access point;
   transmitting to the another information processing apparatus the transmission data reproduced by the reproduction unit when the access point is detected; and
   controlling supply of power such that power is supplied to the reproduction unit when the access point is detected and power is not supplied to the reproduction unit in other cases.

5. A computer readable medium including computer executable instructions which, when loaded by a computer, cause the computer, which controls an information processing apparatus including a reproduction unit configured to reproduce transmission data from a recording medium in which the transmission data transmitted to another information processing apparatus through an access point is recorded, to execute a method comprising:
  detecting the access point;
  transmitting to the another information processing apparatus the transmission data reproduced by the reproduction unit when the access point is detected; and
  controlling supply of power such that power is supplied to the reproduction unit when the access point is detected and power is not supplied to the reproduction unit in other cases.

* * * * *